US012673489B2

(12) United States Patent
Nishimura

(10) Patent No.: US 12,673,489 B2
(45) Date of Patent: Jul. 7, 2026

(54) DRIVER CIRCUIT FOR A PRINTHEAD

(71) Applicant: Hiroshi Nishimura, West Hills, CA (US)

(72) Inventor: Hiroshi Nishimura, West Hills, CA (US)

(73) Assignee: Ricoh Company, Ltd., Tokyo (JP)

( * ) Notice: Subject to any disclaimer, the term of this patent is extended or adjusted under 35 U.S.C. 154(b) by 251 days.

(21) Appl. No.: 18/211,731

(22) Filed: Jun. 20, 2023

(65) Prior Publication Data

US 2023/0330986 A1 Oct. 19, 2023

Related U.S. Application Data

(63) Continuation of application No. 17/196,671, filed on Mar. 9, 2021, now Pat. No. 11,712,888.

(51) Int. Cl.
*B41J 2/045* (2006.01)
*B41J 2/21* (2006.01)

(52) U.S. Cl.
CPC ....... *B41J 2/04581* (2013.01); *B41J 2/04573* (2013.01); *B41J 2/04588* (2013.01); *B41J 2/21* (2013.01); *B41J 2/04598* (2013.01)

(58) Field of Classification Search
CPC .................................................... B41J 2/04588
See application file for complete search history.

(56) References Cited

U.S. PATENT DOCUMENTS 6,334,665 B1 * 1/2002 Yoshida ................. B41J 2/5056 347/43
6,357,856 B1 * 3/2002 Otsuki ....................... B41J 2/15 347/41
2007/0182783 A1 * 8/2007 Hoshiyama .......... B41J 2/04551 347/7
2007/0182974 A1 * 8/2007 Hoshiyama .......... B41J 2/04508 358/3.12
2010/0026745 A1 * 2/2010 Kayahara ............. B41J 2/04588 347/10
2019/0061368 A1 * 2/2019 Iida ...................... B41J 2/16511

* cited by examiner

*Primary Examiner* — Shelby L Fidler
(74) *Attorney, Agent, or Firm* — Duft & Bornsen, PC

(57) ABSTRACT

Printheads and methods of operation. In one embodiment, a printhead includes a plurality of jetting channels comprising first jetting channels configured to jet a first print fluid and second jetting channels configured to jet a second print fluid, and a driver circuit communicatively coupled to actuators of the jetting channels. The driver circuit receives a drive waveform comprising first jetting pulses provisioned for the first print fluid and second jetting pulses provisioned for the second print fluid, and gating signals comprising a first active gating signal designated for jetting the first print fluid and a second active gating signal designated for jetting the second print fluid. The driver circuit selectively applies the first jetting pulses to actuators of the first jetting channels based on the first active gating signal, and selectively applies the second jetting pulses to actuators of the second jetting channels based on the second active gating signal.

22 Claims, 32 Drawing Sheets

DRIVER CIRCUIT FOR A PRINTHEAD

RELATED APPLICATIONS

This non-provisional patent application is a continuation of U.S. patent application Ser. No. 17/196,671 filed on Mar. 9, 2021, which is incorporated herein by reference.

TECHNICAL FIELD

The following disclosure relates to the field of image formation, and in particular, to printheads and the use of printheads.

BACKGROUND

Image formation is a procedure whereby a digital image is recreated by propelling droplets of ink or another type of print fluid onto a medium, such as paper, plastic, a substrate for 3D printing, etc. Image formation is commonly employed in apparatuses, such as printers (e.g., inkjet printer), facsimile machines, copying machines, plotting machines, multifunction peripherals, etc. The core of a typical jetting apparatus or image forming apparatus is one or more liquid-droplet ejection heads (referred to generally herein as "printheads") having nozzles that discharge liquid droplets, a mechanism for moving the printhead and/or the medium in relation to one another, and a controller that controls how liquid is discharged from the individual nozzles of the printhead onto the medium in the form of pixels.

A typical printhead includes a plurality of nozzles aligned in one or more rows along a discharge surface of the printhead. Each nozzle is part of a "jetting channel", which includes the nozzle, a pressure chamber, and a diaphragm that vibrates in response to an actuator, such as a piezoelectric actuator. A printhead also includes a driver circuit that controls when each individual jetting channel fires based on image or print data. To jet from a jetting channel, the driver circuit provides a jetting pulse to the actuator, which causes the actuator to deform a wall of the pressure chamber (i.e., the diaphragm). The deformation of the pressure chamber creates pressure waves within the pressure chamber that eject a droplet of print fluid (e.g., ink) out of the nozzle.

SUMMARY

Embodiments described herein provide enhanced driver circuits for printheads, and associated systems and methods. A conventional driver circuit for a printhead controls jetting of a single print fluid from jetting channels. For example, if a printhead was configured to jet two colors of ink, then two driver circuits would be implemented in the printhead. If a printhead was configured to jet four colors of ink, then four driver circuits would be implemented in the printhead. In the embodiments described herein, a single driver circuit is configured to control jetting of multiple print fluids. One technical benefit is that less electronics are needed in a printhead to jet multiple print fluids.

One embodiment comprises a printhead that includes a plurality of jetting channels comprising first jetting channels configured to jet a first print fluid, and second jetting channels configured to jet a second print fluid. The printhead further includes a driver circuit communicatively coupled to actuators of the jetting channels. The driver circuit is configured to receive a drive waveform comprising first jetting pulses provisioned for the first print fluid, and second jetting pulses provisioned for the second print fluid. The driver circuit is configured to receive gating signals comprising a first active gating signal designated for jetting the first print fluid, and a second active gating signal designated for jetting the second print fluid. The driver circuit is configured to selectively apply the first jetting pulses from the drive waveform to the actuators of the first jetting channels based on the first active gating signal to jet the first print fluid, and to selectively apply the second jetting pulses from the drive waveform to the actuators of the second jetting channels based on the second active gating signal to jet the second print fluid.

In another embodiment, a jetting period of the drive waveform includes a first jetting pulse provisioned for the first print fluid, and a second jetting pulse provisioned for the second print fluid. For the jetting period, the driver circuit is configured to obtain print data for the first jetting channels and the second jetting channels, and select a gating signal from the gating signals for each of the first jetting channels and the second jetting channels based on the print data. When the gating signal selected for a first jetting channel of the first jetting channels comprises the first active gating signal, the driver circuit is configured to output the first jetting pulse from the drive waveform as a first driver output signal to the actuator of the first jetting channel, where the second jetting pulse is blocked from the first driver output signal based on the first active gating signal. When the gating signal selected for a second jetting channel of the second jetting channels comprises the second active gating signal, the driver circuit is configured to output the second jetting pulse from the drive waveform as a second driver output signal to the actuator of the second jetting channel, where the first jetting pulse is blocked from the second driver output signal based on the second active gating signal.

In another embodiment, the first active gating signal includes an active time window that corresponds with the first jetting pulse, and the second active gating signal includes an active time window that corresponds with the second jetting pulse.

In another embodiment, the first jetting pulse leads the second jetting pulse in the jetting period of the drive waveform. The driver circuit is configured to delay the first jetting pulse on the first driver output signal to the actuator of the first jetting channel.

In another embodiment, the actuators comprise piezoelectric actuators.

In another embodiment, the printhead further comprises a first manifold configured to supply the first print fluid to the first jetting channels, and a second manifold configured to supply the second print fluid to the second jetting channels.

In another embodiment, the first jetting pulses provisioned for the first print fluid have a different amplitude than the second jetting pulses provisioned for the second print fluid.

In another embodiment, the first print fluid comprises a first color of ink, and the second print fluid comprises a second color of ink.

In another embodiment, the first jetting channels and the second jetting channels form a single row of nozzles.

In another embodiment, the first jetting channels form a first row of nozzles, and the second jetting channels form a second row of nozzles.

Another embodiment comprises a jetting apparatus comprising the printhead described above, and a jetting controller configured to provide the drive waveform and the gating signals to the printhead.

Another embodiment comprises a method for driving a printhead comprising a plurality of jetting channels including first jetting channels configured to jet a first print fluid, and second jetting channels configured to jet a second print fluid. The method comprises receiving a drive waveform comprising first jetting pulses provisioned for the first print fluid, and second jetting pulses provisioned for the second print fluid. The method further comprises receiving gating signals comprising a first active gating signal designated for jetting the first print fluid, and a second active gating signal designated for jetting the second print fluid. The method further comprises selectively applying the drive waveform to the jetting channels by selectively applying the first jetting pulses from the drive waveform to the actuators of the first jetting channels based on the first active gating signal to jet the first print fluid, and selectively applying the second jetting pulses from the drive waveform to the actuators of the second jetting channels based on the second active gating signal to jet the second print fluid.

In another embodiment, a jetting period of the drive waveform includes a first jetting pulse provisioned for the first print fluid, and a second jetting pulse provisioned for the second print fluid. For the jetting period, selectively applying comprises obtaining print data for the first jetting channels and the second jetting channels, and selecting a gating signal from the gating signals for each of the first jetting channels and the second jetting channels based on the print data. When the gating signal selected for a first jetting channel of the first jetting channels comprises the first active gating signal, outputting the first jetting pulse from the drive waveform as a first driver output signal to the actuator of the first jetting channel, where the second jetting pulse is blocked from the first driver output signal based on the first active gating signal. When the gating signal selected for a second jetting channel of the second jetting channels comprises the second active gating signal, outputting the second jetting pulse from the drive waveform as a second driver output signal to the actuator of the second jetting channel, where the first jetting pulse is blocked from the second driver output signal based on the second active gating signal.

In another embodiment, the first active gating signal includes an active time window that corresponds with the first jetting pulse, and the second active gating signal includes an active time window that corresponds with the second jetting pulse.

In another embodiment, the first jetting pulse leads the second jetting pulse in the jetting period of the drive waveform, and the method further comprises delaying the first jetting pulse on the first driver output signal to the actuator of the first jetting channel.

Another embodiment comprises a jetting control system for controlling a printhead comprising a plurality of jetting channels. The jetting control system comprises a jetting controller that includes at least one processor configured to generate a drive waveform comprising first jetting pulses provisioned for a first print fluid, and second jetting pulses provisioned for a second print fluid, designate a first active gating signal for jetting the first print fluid, and designate a second active gating signal for jetting the second print fluid. The jetting control system further comprises a driver circuit communicatively coupled to the jetting controller, and to actuators of the jetting channels. The driver circuit is configured to receive the drive waveform and gating signals from the jetting controller, where the gating signals include the first active gating signal and the second active gating signal. The driver circuit is configured to selectively apply the first jetting pulses from the drive waveform to the actuators of a first subset of the jetting channels based on the first active gating signal to jet the first print fluid, and to selectively apply the second jetting pulses from the drive waveform to the actuators of a second subset of the jetting channels based on the second active gating signal to jet the second print fluid.

In another embodiment, the first jetting pulses provisioned for the first print fluid have a different amplitude than the second jetting pulses provisioned for the second print fluid.

In another embodiment, the first active gating signal includes active time windows that correspond with the first jetting pulses of the drive waveform, and the second active gating signal includes active time windows that correspond with the second jetting pulses of the drive waveform.

In another embodiment, a first jetting pulse leads a second jetting pulse in a jetting period of the drive waveform, and the driver circuit is configured to delay the first jetting pulses applied to the first subset of the jetting channels so that jetting of the first print fluid from the first subset of the jetting channels is concurrent with jetting of the second print fluid from the second subset of the jetting channels.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
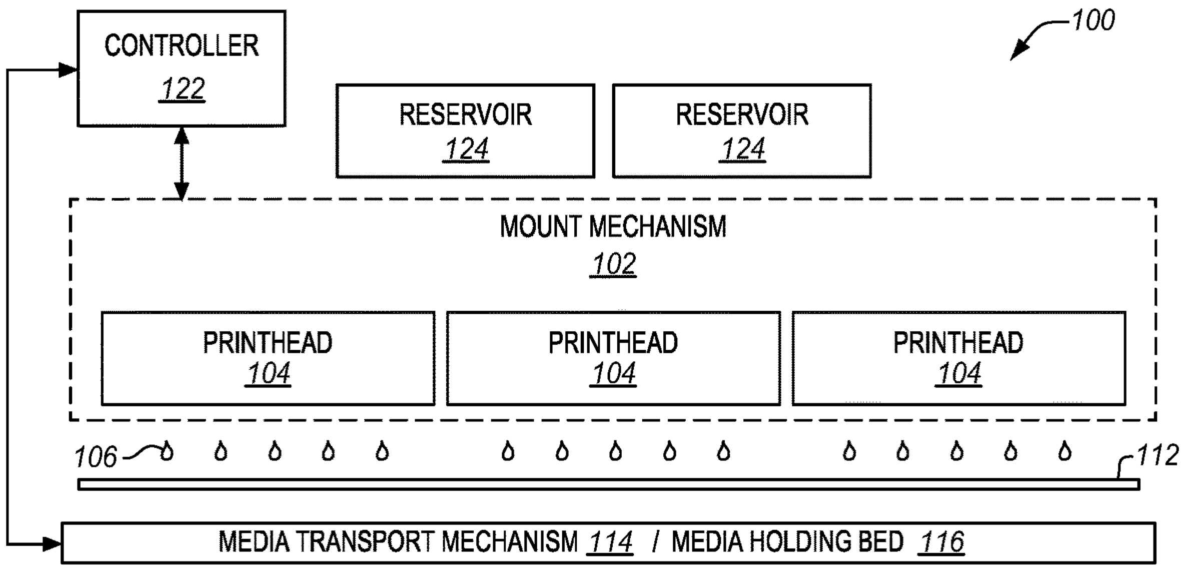
FIG. 1 is a schematic diagram of a jetting apparatus in an illustrative embodiment.

FIG. 1 is a schematic diagram of a jetting apparatus 100 in an illustrative embodiment. A jetting apparatus 100 is a device or system that uses one or more printheads to eject a print fluid or marking material onto a medium. One example of jetting apparatus 100 is an inkjet printer (e.g., a cut-sheet or continuous-feed printer) that performs single-pass printing. Other examples of jetting apparatus 100 include a scan pass inkjet printer (e.g., a wide format printer), a multifunction printer, a desktop printer, an industrial printer, a 3D printer, etc. Generally, jetting apparatus 100 includes a mount mechanism 102 that supports one or more printheads 104 in relation to a medium 112. Mount mechanism 102 may be fixed within jetting apparatus 100 for single-pass printing. Alternatively, mount mechanism 102 may be disposed on a carriage assembly that reciprocates back and forth along a scan line or sub-scan direction for multi-pass printing. Printheads 104 are a device, apparatus, or component configured to eject droplets 106 of a print fluid, such as ink (e.g., water, solvent, oil, or UV-curable), through a plurality of nozzles (not visible in FIG. 1). The droplets 106 ejected from the nozzles of printheads 104 are directed toward medium 112. Medium 112 comprises any type of material upon which ink or another marking material is applied by a printhead, such as paper, plastic, card stock, transparent sheets, a substrate for 3D printing, cloth, etc. Typically, nozzles of printheads 104 are arranged in one or more rows so that ejection of a print fluid from the nozzles causes formation of characters, symbols, images, layers of an object, etc., on medium 112 as printhead 104 and/or medium 112 are moved relative to one another. Jetting apparatus 100 may include a media transport mechanism 114 or a media holding bed 116. Media transport mechanism 114 is configured to move medium 112 relative to printheads 104. Media holding bed 116 is configured to support medium 112 in a stationary position while the printheads 104 move in relation to medium 112.

Jetting apparatus 100 also includes a jetting apparatus controller 122 that controls the overall operation of jetting apparatus 100. Jetting apparatus controller 122 may connect to a data source to receive print data, image data, or the like, and control each printhead 104 to discharge the print fluid on medium 112. Jetting apparatus 100 also includes reservoirs 124 for multiple print fluids. Although not shown in FIG. 1, reservoirs 124 are fluidly coupled to printheads 104, such as with hoses or the like.

Figure 2:
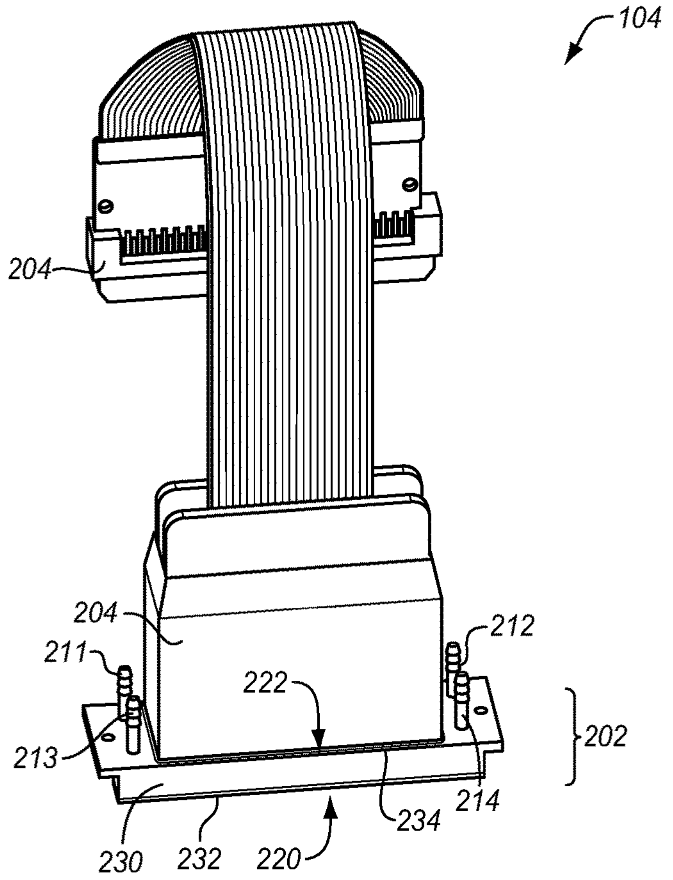
FIG. 2 is a perspective view of a printhead in an illustrative embodiment.

FIG. 2 is a perspective view of a printhead 104 in an illustrative embodiment. In this embodiment, printhead 104 includes a head member 202 and electronics 204. Head member 202 is an elongated component that forms the jetting channels of printhead 104. A typical jetting channel includes a nozzle, a pressure chamber, and a diaphragm that is driven by an actuator, such as a piezoelectric actuator. Electronics 204 control how the nozzles of printhead 104 jet droplets in response to data signals and control signals. Although not visible in FIG. 2, electronics 204 may include one or more driver circuits configured to drive actuators (e.g., piezoelectric actuators) that contact the diaphragms of the jetting channels. Electronics 204 connect to a controller (e.g., jetting apparatus controller 122) to receive the data signals and control signals. The controller is configured to provide the data signals and control signals to printhead 104 to control jetting of the individual jetting channels, to control the temperature of printhead 104, etc.

The bottom surface of head member 202 in FIG. 2 includes the nozzles of the jetting channels, and represents the discharge surface 220 of printhead 104. The top surface of head member 202 in FIG. 2 (referred to as I/O surface 222) represents the Input/Output (I/O) portion for receiving one or more print fluids into printhead 104, and/or conveying print fluids (e.g., fluids that are not jetted) out of printhead 104. I/O surface 222 includes a plurality of I/O ports 211-214. An I/O port 211-214 may comprise an inlet I/O port, which is an opening in head member 202 that acts as an entry point for a print fluid. An I/O port 211-214 may comprise an outlet I/O port, which is an opening in head member 202 that acts as an exit point for a print fluid. I/O ports 211-214 may include a hose coupling, hose barb, etc., for coupling with a hose of a reservoir, a cartridge, or the like. The number of I/O ports 211-214 is provided as an example, as printhead 104 may include other numbers of I/O ports.

Head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with (i.e., come into contact with) diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack. Plate stack 232 may include the following plates: one or more nozzle plates, one or more chamber plates, one or more restrictor plates, and a diaphragm plate. A nozzle plate includes a plurality of nozzles that are arranged in one or more rows (e.g., two rows, four rows, etc.). A chamber plate includes a plurality of openings that form the pressure chambers of the jetting channels. A restrictor plate includes a plurality of restrictors that fluidly connect the pressure chambers of the jetting channels with a manifold. A diaphragm plate is a sheet of a semi-flexible material that vibrates in response to actuation by an actuator (e.g., piezoelectric actuator).

The embodiment in FIG. 2 illustrates one particular configuration of a printhead 104, and it is understood that other printhead configurations are considered herein that have a plurality of jetting channels.

Figure 3:
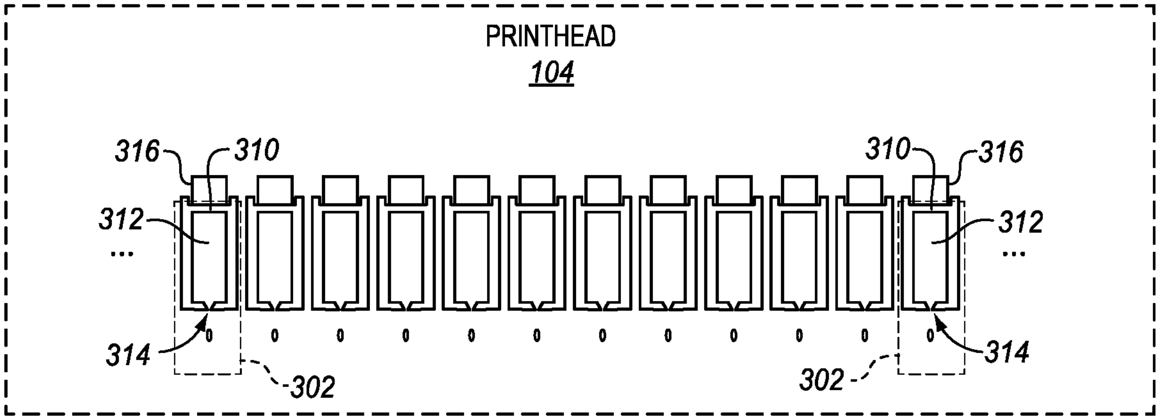
FIGS. 3-6 are schematic diagrams of a jetting channel within a printhead in an illustrative embodiment.

FIG. 3 is a schematic diagram of jetting channels 302 within a printhead 104 in an illustrative embodiment. This diagram represents a view along a length of printhead 104. A jetting channel 302 is a structural element within printhead 104 that jets or ejects a print fluid. Each jetting channel 302 includes a diaphragm 310, a pressure chamber 312, and a nozzle 314. An actuator 316 contacts diaphragm 310 to control jetting from a jetting channel 302. Jetting channels 302 may be formed in one or more rows along a length of printhead 104, and each jetting channel 302 may have a similar configuration as shown in FIG. 3.

Figure 4:
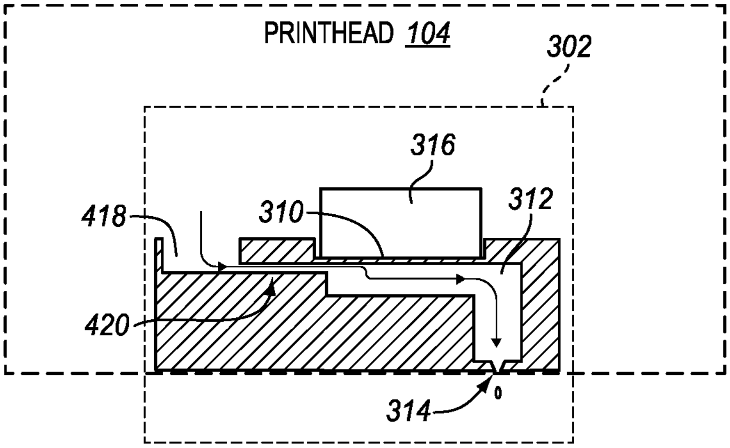

FIG. 4 is another schematic diagram of a jetting channel 302 within a printhead 104 in an illustrative embodiment. The view in FIG. 4 is of a cross-section of a jetting channel 302 across a width of a portion of printhead 104. Pressure chamber 312 is fluidly coupled to a manifold 418 through a restrictor 420. Restrictor 420 controls the flow of the print fluid from manifold 418 to pressure chamber 312. One wall of pressure chamber 312 is formed with diaphragm 310 that physically interfaces with actuator 316. Diaphragm 310 may comprise a sheet of semi-flexible material that vibrates in response to actuation by actuator 316. The print fluid flows through pressure chamber 312 and out of nozzle 314 in the form of a droplet in response to actuation by actuator 316. Actuator 316 is configured to receive a jetting pulse, and to actuate or "fire" in response to the jetting pulse. Firing of actuator 316 in jetting channel 302 creates pressure waves in pressure chamber 312 that cause jetting of a droplet from nozzle 314.

Figure 5:
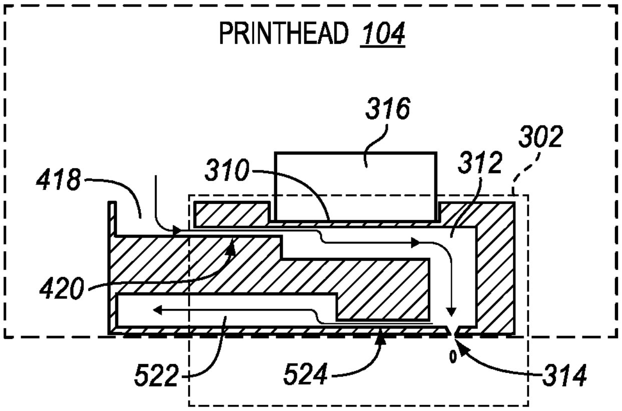
Figure 6:
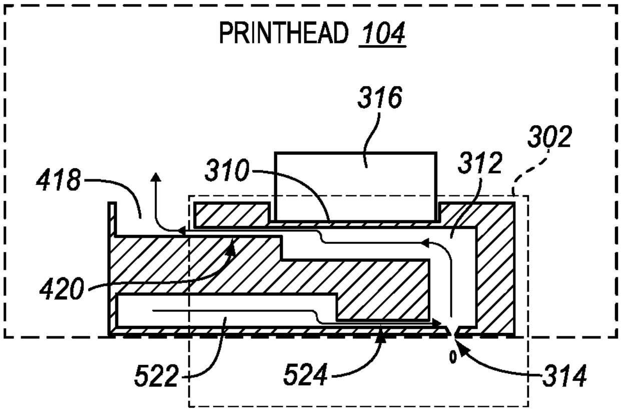

In another embodiment, printhead 104 may comprise a flow-through type of printhead. FIGS. 5-6 are schematic diagrams of a jetting channel 302 within a flow-through printhead 104 in another illustrative embodiment. The view in FIGS. 5-6 is of a cross-section of a jetting channel 302 across a width of a portion of printhead 104. Pressure chamber 312 is fluidly coupled to a supply manifold 418 through a first restrictor 420, and is fluidly coupled to a return manifold 522 through a second restrictor 524. Restrictor 420 fluidly couples pressure chamber 312 with supply manifold 418, and controls the flow of the print fluid into pressure chamber 312. Restrictor 524 fluidly couples pressure chamber 312 to return manifold 522, and controls the flow of the print fluid out of pressure chamber 312. When printhead 104 is a "flow-through" printhead or re-circulating printhead, the print fluid may be re-circulated through printhead 104 past each nozzle 314.

The arrow in FIG. 5 illustrates a flow path of a print fluid through jetting channel 302 in one direction. The print fluid flows from supply manifold 418 and into pressure chamber 312 through restrictor 420. One wall of pressure chamber 312 is formed with diaphragm 310 that physically interfaces with actuator 316, and vibrates in response to actuation by actuator 316. The print fluid flows through pressure chamber 312 and out of nozzle 314 in the form of a droplet in response to actuation by actuator 316. The print fluid, which is not jetted from nozzle 314, flows from pressure chamber 312 into return manifold 522 through restrictor 524.

The arrow in FIG. 6 illustrates a flow path of a print fluid within jetting channel 302 in a reverse direction. The print fluid flows from return manifold 522 and into pressure chamber 312 through restrictor 524. The print fluid flows through pressure chamber 312 and out of nozzle 314 in the form of a droplet in response to actuation by actuator 316. The print fluid, which is not jetted from nozzle 314, flows from pressure chamber 312 into supply manifold 418 through restrictor 420. The length of restrictors 420 and 524 may be the same to allow for a reversal of flow in this manner.

A jetting channel 302 as shown in FIGS. 3-6 are examples to illustrate a basic structure of a jetting channel, such as the diaphragm, pressure chamber, and nozzle. Other types of jetting channels are also considered herein. For example, some jetting channels may have a pressure chamber having a different shape than is illustrated in FIGS. 3-6. Also, the position of a manifold 418, a restrictor 420, a diaphragm 310, etc., may differ in other embodiments.

In one embodiment, a printhead 104 is configured to jet multiple print fluids. Print fluids may differ based on color or pigment, viscosity, density, polymers, etc. In a two-color printhead, for example, the printhead is configured to jet two different colors of print fluid (e.g., ink). In a four-color printhead, for example, the printhead is configured to jet four different colors of print fluid (e.g., ink). Thus, in a multi-fluid printhead, different subsets of jetting channels are configured to jet different print fluids.

Figure 7:
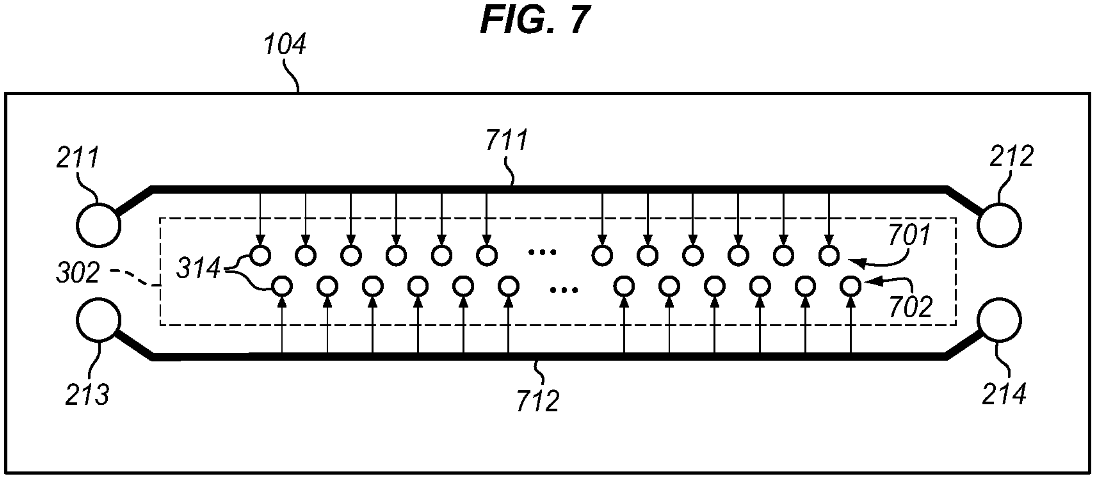
FIGS. 7-8 are schematic diagrams of a printhead in an illustrative embodiment.

To jet multiple print fluids, printhead 104 includes a plurality of manifolds each fluidly coupled to a subset of the jetting channels. FIG. 7 is a schematic diagram of a printhead 104 in an illustrative embodiment. The jetting channels 302 of printhead 104 are schematically illustrated in FIG. 7 as nozzles in two nozzle rows 701-702. Although the nozzles are shown as staggered in FIG. 7, the nozzles in the two nozzle rows 701-702 may be aligned in other embodiments. In this embodiment, printhead 104 is configured to jet one print fluid (e.g., one color) from nozzle row 701, and to jet another print fluid (e.g., another color) from nozzle row 702. Thus, printhead 104 may be considered a two-fluid printhead, or two-color printhead when jetting different colors of ink. Printhead 104 includes a plurality of manifolds 711-712. A manifold 711-712 is a common fluid path in a printhead 104 for a plurality of jetting channels 302. A manifold 711-712 that conveys a print fluid to a plurality of jetting channels 302 may also be referred to as a "supply" manifold. A manifold 711-712 that conveys a print fluid from a plurality of jetting channels 302 may be referred to as a "return" manifold, such as for a flow-through type of head. Manifold 711 comprises a fluid path between I/O ports 211-212 that is fluidly coupled to the jetting channels 302 in nozzle row 701. Thus, a first print fluid supplied at I/O port 211 and/or I/O port 212 is conveyed through manifold 711 to the jetting channels 302 in nozzle row 701. Manifold 712 comprises a fluid path between I/O ports 213-214 that is fluidly coupled to the jetting channels 302 in nozzle row 702. Thus, a second print fluid supplied at I/O port 213 and/or I/O port 214 is conveyed through manifold 712 to jetting channels 302 in nozzle row 702. Although two manifolds 711-712 are illustrated in FIG. 7, a printhead 104 may include more or less manifolds as desired.

There may be multiple variations of a two-fluid printhead that are considered herein. As shown in FIG. 7, manifold 711 is fluidly coupled to the jetting channels 302 in nozzle row 701, and manifold 712 is fluidly coupled to the jetting channels 302 in nozzle row 702. In other embodiments, manifold 711 may be fluidly coupled to a subset of jetting channels 302 in nozzle row 701 and nozzle row 702, and manifold 712 may be fluidly coupled to a subset of jetting channels 302 in nozzle row 702 and nozzle row 701.

Figure 8:
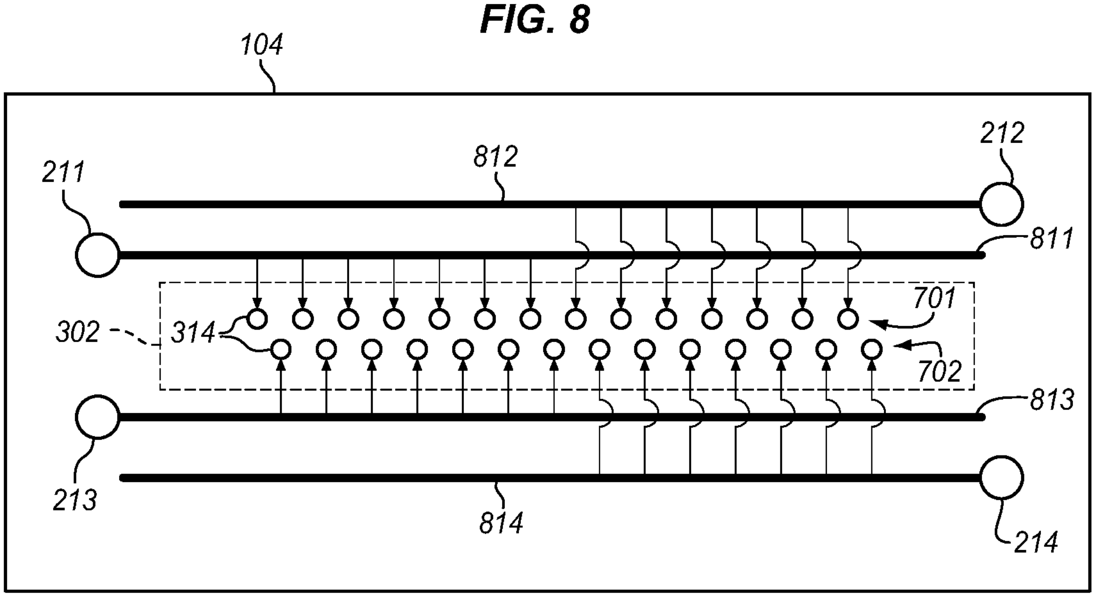

FIG. 8 is a schematic diagram of a printhead 104 in another illustrative embodiment. The jetting channels 302 of printhead 104 are again schematically illustrated in FIG. 8 as nozzles in two nozzle rows 701-702. In this embodiment, printhead 104 is configured to jet two different print fluids from nozzle row 701, and to jet two different print fluids from nozzle row 702. Thus, printhead 104 may be considered a two-fluid printhead or a four-fluid printhead. Printhead 104 includes a plurality of manifolds 811-814. Manifold 811 comprises a fluid path from I/O port 211 to a first subset of jetting channels 302 in nozzle row 701. Manifold 812 comprises a fluid path from I/O port 212 to a second subset of jetting channels 302 in nozzle row 701. Manifold 813 comprises a fluid path from I/O port 213 to a first subset of jetting channels 302 in nozzle row 702. Manifold 814 comprises a fluid path from I/O port 214 to a second subset of jetting channels 302 in nozzle row 702.

There may be multiple variations of a four-fluid printhead that are considered herein. For example, jetting channels 302 in nozzle row 701 may alternate between a print fluid supplied by manifold 811, and a print fluid supplied by manifold 812 in one embodiment. Likewise, jetting channels 302 in nozzle row 702 may alternate between a print fluid supplied by manifold 813, and a print fluid supplied by manifold 814.

Printhead 104 may also comprise an eight-fluid printhead or more in other embodiments. Printheads configured to jet four, eight, or more different print fluids are described in U.S. Pat. Nos. 10,857,797 and 11,007,781, which are incorporated by reference as if fully included herein.

Figure 9:
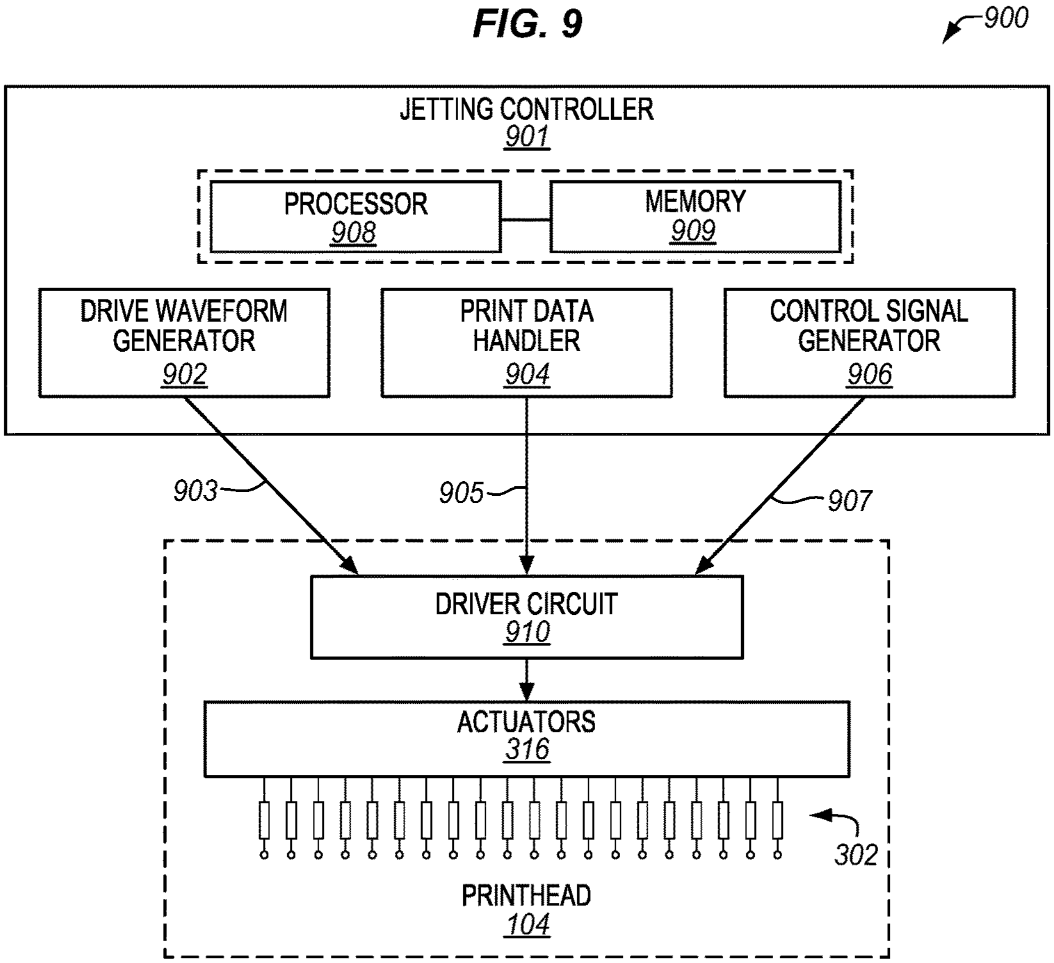
FIG. 9 is a block diagram of a jetting control system in an illustrative embodiment.

FIG. 9 is a block diagram of a jetting control system 900 in an illustrative embodiment. Jetting control system 900 is an apparatus or collection of circuits, devices, controllers, etc., configured to control one or more printheads. In this embodiment, jetting control system 900 includes a jetting controller 901 that is communicatively coupled to one or more printheads 104. One example of jetting controller 901 is jetting apparatus controller 122 as shown in FIG. 1. Jetting controller 901 may be referred to as a print controller when implemented in a printer (e.g., continuous-feed printer, cut-sheet printer, 3D printer, etc.). Jetting control system 900 further includes one or more driver circuits 910 for a printhead 104. A driver circuit 910 is communicatively coupled to a set of actuators (e.g., piezoelectric actuators) in a printhead 104, and is configured to drive the set of actuators.

In this embodiment, jetting controller 901 includes a drive waveform generator 902, a print data handler 904, and a control signal generator 906. Drive waveform generator 902 (also referred to as a pulse generator) comprises circuitry, logic, hardware, means, etc., configured to generate a drive waveform 903 for a driver circuit 910 in a printhead 104. A drive waveform 903 comprises a series or train of jetting pulses (and possibly other pulses, such as non-jetting pulses) that are selectively applied as driver output signals to actuators 316. Although not illustrated, drive waveform generator 902 may also include an amplifier circuit that amplifies the current of drive waveform 903. Print data handler 904 comprises circuitry, logic, hardware, means, etc., configured to provide print data 905 to a driver circuit 910. Print data handler 904 may include a spool, queue, buffer, or the like that stores print data, such as rasterized data, bitmaps, etc., for a print job. Print data handler 904 determines which print data applies to the jetting channels 302 controlled by driver circuit 910, and provides that print data to driver circuit 910. Control signal generator 906 comprises circuitry, logic, hardware, means, etc., configured to provide control signals 907 to driver circuit 910. The control signals 907 may include gating or masking signals, a latch signal, a serial clock, etc.

One or more of the subsystems of jetting controller 901 may be implemented on a hardware platform comprised of analog and/or digital circuitry. One or more of the subsystems of jetting controller 901 may be implemented on a processor 908 that executes instructions stored in memory 909. Processor 908 comprises an integrated hardware circuit configured to execute instructions, and memory 909 is a non-transitory computer readable storage medium for data, instructions, applications, etc., and is accessible by processor 908.

Driver circuit 910 and actuators 316 may be an example of electronics 204 of printhead 104 as shown in FIG. 2. Driver circuit 910 controls jetting for a set of jetting channels 302 of printhead 104. More particularly, driver circuit 910 controls which jetting channels 302 fire during a jetting cycle based on the print data. Driver circuit 910 may comprise an integrated circuit that is fabricated on printhead 104.

Actuators 316 are the actuating devices for jetting channels 302 that act to jet a droplet out of a nozzle 314 in response to a jetting pulse. A piezoelectric actuator, for example, converts electrical energy directly into linear motion. To jet from a jetting channel 302, one or more jetting pulses of the drive waveform 903 are provided to an actuator 316. A jetting pulse causes a deformation, physical displacement, or stroke of an actuator 316, which in turn acts to deform a wall of pressure chamber 312 (e.g., diaphragm 310) as shown in FIG. 3. Deformation of the chamber wall generates pressure waves inside pressure chamber 312 that force a droplet from jetting channel 302 (when specific conditions are met). A jetting pulse is therefore able to cause a droplet to be jetted from a jetting channel 302 with the desired properties when the jetting channel 302 is at rest.

Figure 10:
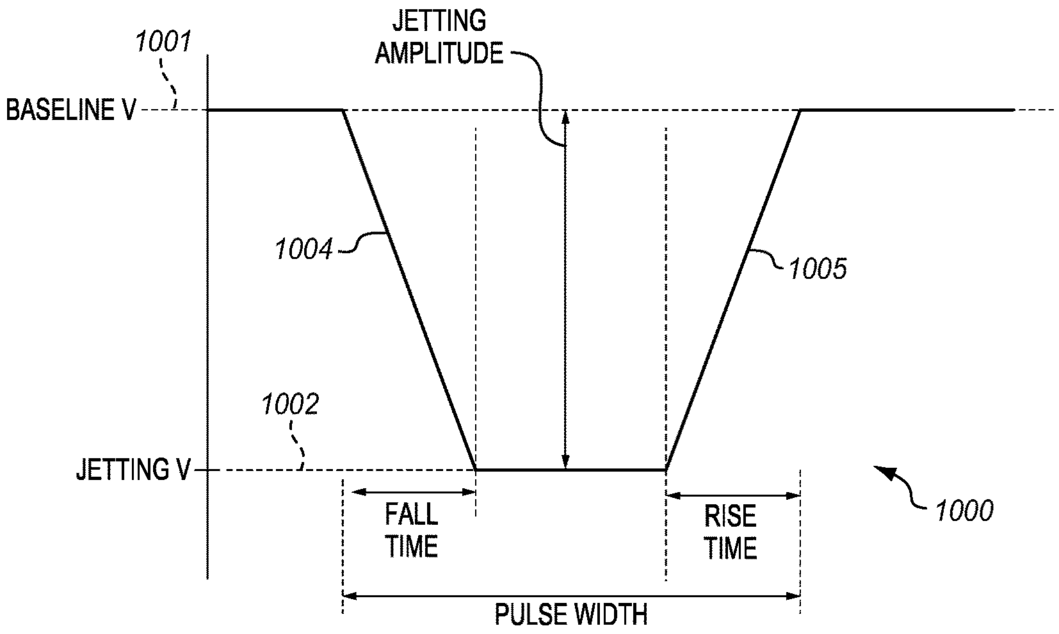
FIG. 10 illustrates a jetting pulse of a drive waveform for a printhead.

FIG. 10 illustrates a jetting pulse 1000 of a drive waveform 903 for a printhead. The drive waveform in FIG. 10 is shown as an active-low signal, but may be an active-high signal in other embodiments. Jetting pulse 1000 has a trapezoidal shape, and may be characterized by the following parameters: fall time, rise time, pulse width, and jetting amplitude. Jetting pulse 1000 transitions from a baseline (high) voltage 1001 to a jetting (low) voltage 1002 along a leading edge 1004. The potential difference between the baseline voltage 1001 and the jetting voltage 1002 represents the amplitude of jetting pulse 1000. Jetting pulse 1000 then transitions from jetting (low) voltage 1002 to baseline (high) voltage 1001 along a trailing edge 1005. These parameters of jetting pulse 1000 can impact the jetting characteristics of the droplets from jetting channel 302 (e.g., droplet velocity and mass). For example, when the amplitude of jetting pulse 1000 equals a target jetting amplitude (i.e., the jetting voltage) for a target pulse width, a droplet of a desired velocity and mass is jetted from a jetting channel 302. A standard jetting pulse 1000 may be selected for different types of printheads to produce droplets having a desired shape (e.g., spherical), size, velocity, etc.

The following provides an example of jetting a droplet from a jetting channel 302 using jetting pulse 1000, such as from jetting channel 302 in FIGS. 3-6. Jetting pulse 1000 is initially at the baseline voltage 1001, and transitions from the baseline voltage 1001 to the jetting voltage 1002. The leading edge 1004 (i.e., the first slope) of jetting pulse 1000 causes an actuator 316 to displace in a first direction, which enlarges pressure chamber 312 and generates negative pressure waves within pressure chamber 312. The negative pressure waves propagate within pressure chamber 312 and are reflected by structural changes in pressure chamber 312 as positive pressure waves. The trailing edge 1005 (i.e., the second slope) of jetting pulse 1000 causes the actuator 316 to displace in an opposite direction, which reduces pressure chamber 312 to its original size and generates another positive pressure wave. When the timing of the trailing edge 1005 of jetting pulse 1000 is appropriate, the positive pressure waves created by actuator 316 displacing to reduce the size of pressure chamber 312 will combine with the reflected positive pressure waves to form a combined wave that is large enough to cause a droplet to be jetted from nozzle 314 of jetting channel 302. Therefore, the positive pressure waves generated by the trailing edge 1005 of jetting pulse 1000 acts to amplify the positive pressure waves that reflect within pressure chamber 312 due to the leading edge 1004 of jetting pulse 1000. The geometry of pressure chamber 312 and jetting pulse 1000 are designed to generate a large positive pressure peak at nozzle 314, which drives the print fluid through nozzle 314.

Figure 11:
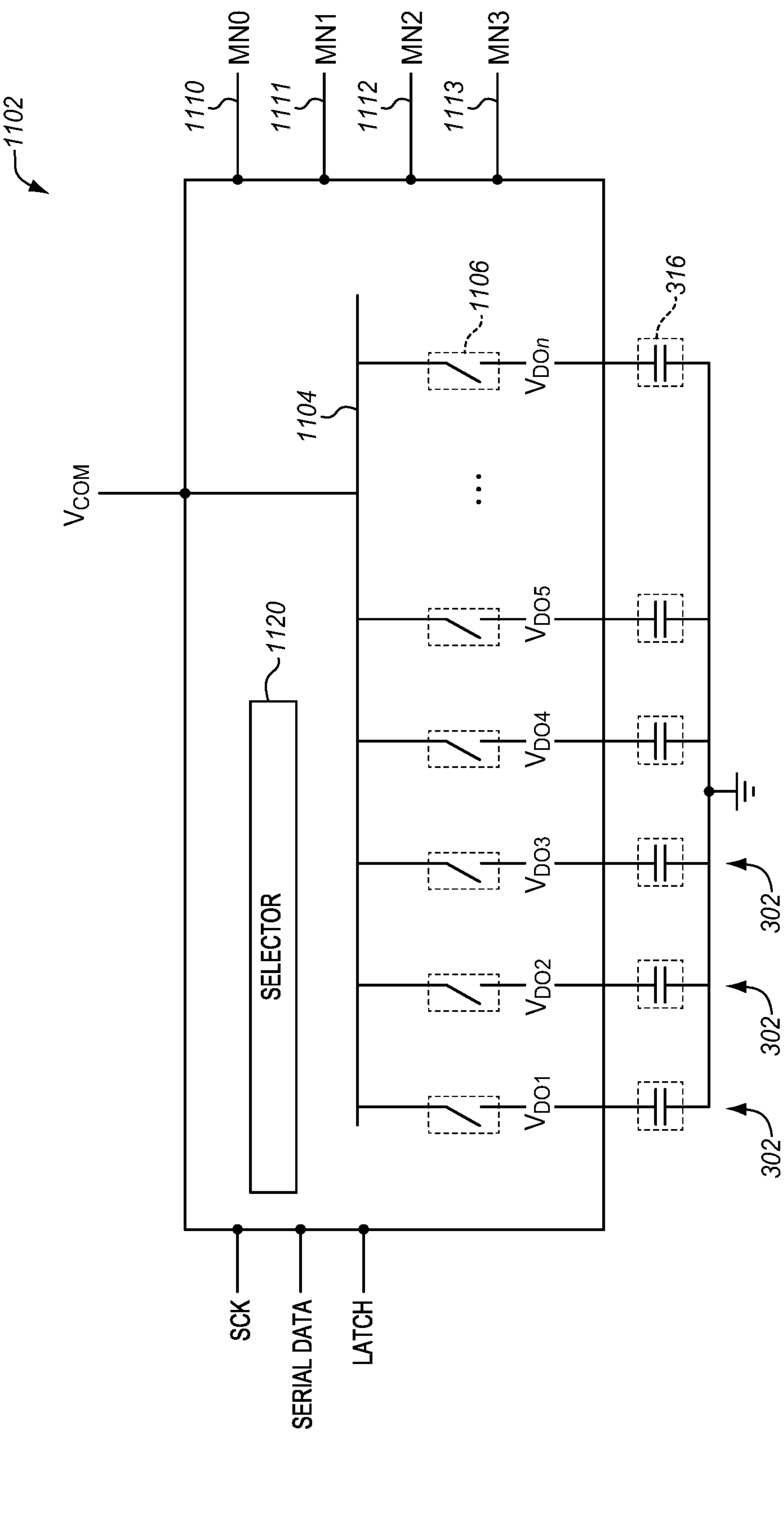
FIG. 11 is a schematic diagram of a switch driver of a driver circuit in an illustrative embodiment.

In FIG. 9, driver circuit 910 may include various subsystems to perform its operations that are not shown. For example, driver circuit 910 may include shift registers (e.g., upper and lower shift registers), and registers (e.g., upper and lower registers) that store the print data. Driver circuit 910 may also include a switch driver that controls whether the drive waveform 903 is output to each individual jetting channel 302 based on the print data and gating signals. FIG. 11 is a schematic diagram of a switch driver 1102 of driver circuit 910 in an illustrative embodiment. Switch driver 1102 includes a plurality of switching elements 1106, which may also be referred to as transmission gates. A switching element 1106 is associated with an individual jetting channel 302, which means that an individual switching element 1106 is electrically coupled to an actuator 316 (e.g., piezoelectric actuator) of a jetting channel 302 (which is illustrated as a capacitor). Each switching element 1106 is also coupled to an electrical bus 1104 that conducts the drive waveform 903 ($V_{com}$). Each switching element 1106 is configured to selectively apply the drive waveform 903 to its associated actuator 316 based on the print data and a selected gating signal. When a switching element 1106 is "ON", the switching element 1106 closes to form or enable a conductive path between electrical bus 1104 and its associated actuator 316, and outputs the drive waveform 903 to its associated actuator 316. When a switching element 1106 is "OFF", the switching element 1106 opens to break or disable the conductive path. A switching element 1106 may comprise transistor, a logic switch, a gate or gate array, etc., that receives input and control signals, and outputs a drive output signal ($V_{DO}$) when the switch is closed.

In one embodiment, switch driver 1102 is configured to receive a clock signal (SCK), serial data (i.e., print data), and a latch signal from jetting controller 901. Switch driver 1102 is further configured to receive a plurality of gating signals 1110-1113 (MN0-MN3) from jetting controller 901. A gating signal 1110-1113 (also referred to as a mask signal) is a digital signal that triggers passage of another signal (i.e., a drive waveform) or blocks the other signal. Switch driver 1102 further includes a selector 1120, which is a logic device or processing device that selects a gating signal 1110-1113 for each switching element 1106 based on the print data. The switching elements 1106 turn "ON" and "OFF" based on the selected gating signal 1110-1113. For example, a switching element 1106 may turn "ON" when the selected gating signal 1110-1113 is "LOW", and may turn "OFF" when the selected gating signal 1110-1113 is "HIGH".

The timing of when a switching element 1106 is "ON" or "OFF" defines a time window where the drive waveform 903 is allowed to pass to an actuator 316. For instance, when a switching element 1106 is "ON" for a jetting channel 302, the driver signal output ($V_{DO}$) of the switch driver 1102 to the actuator 316 of the jetting channel 302 is the drive waveform 903 ($V_{com}$). Any drive pulses of the drive waveform 903 will therefore cause jetting from this jetting channel. When the switching element 1106 is "OFF" for the jetting channel 302, the driver signal output ($V_{DO}$) of the switch driver 1102 to the actuator 316 of the jetting channel 302 is a constant high or low voltage that does not cause jetting.

Switch driver 1102 as illustrated in FIG. 11 is configured for two-bit print data with four gating signals 1110-1113. However, switch driver 1102 may be configured for three-bit print data with eight gating signals, or more in other embodiments.

Figure 12:
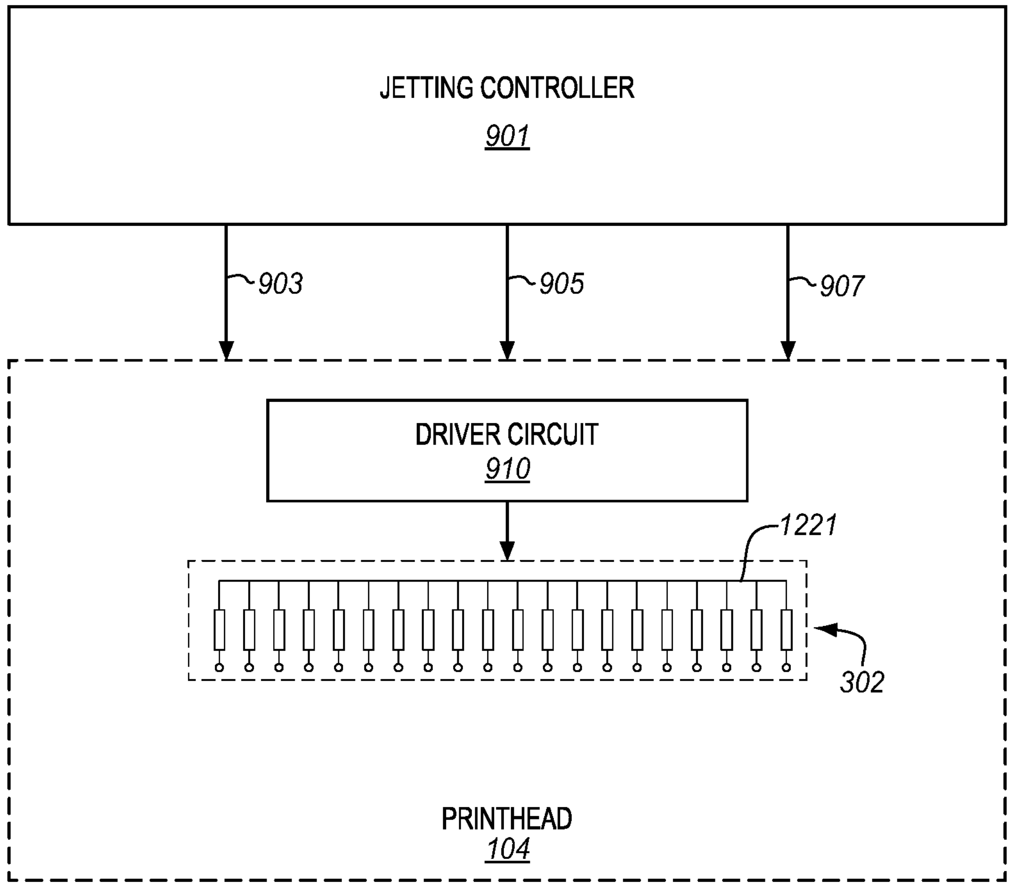
FIG. 12 is a schematic diagram of a printhead having a driver circuit for a single print fluid.

Driver circuit 910 may be implemented in a printhead 104 to control jetting of a single print fluid (e.g., single color) from jetting channels 302. FIG. 12 is a schematic diagram of a printhead 104 having a driver circuit 910 for a single print fluid. Driver circuit 910 controls a plurality of jetting channels 302 that are fluidly coupled to a common manifold 1221. Thus, each of the jetting channels 302 is configured to jet the same print fluid (e.g., same color of ink).

Figure 13:
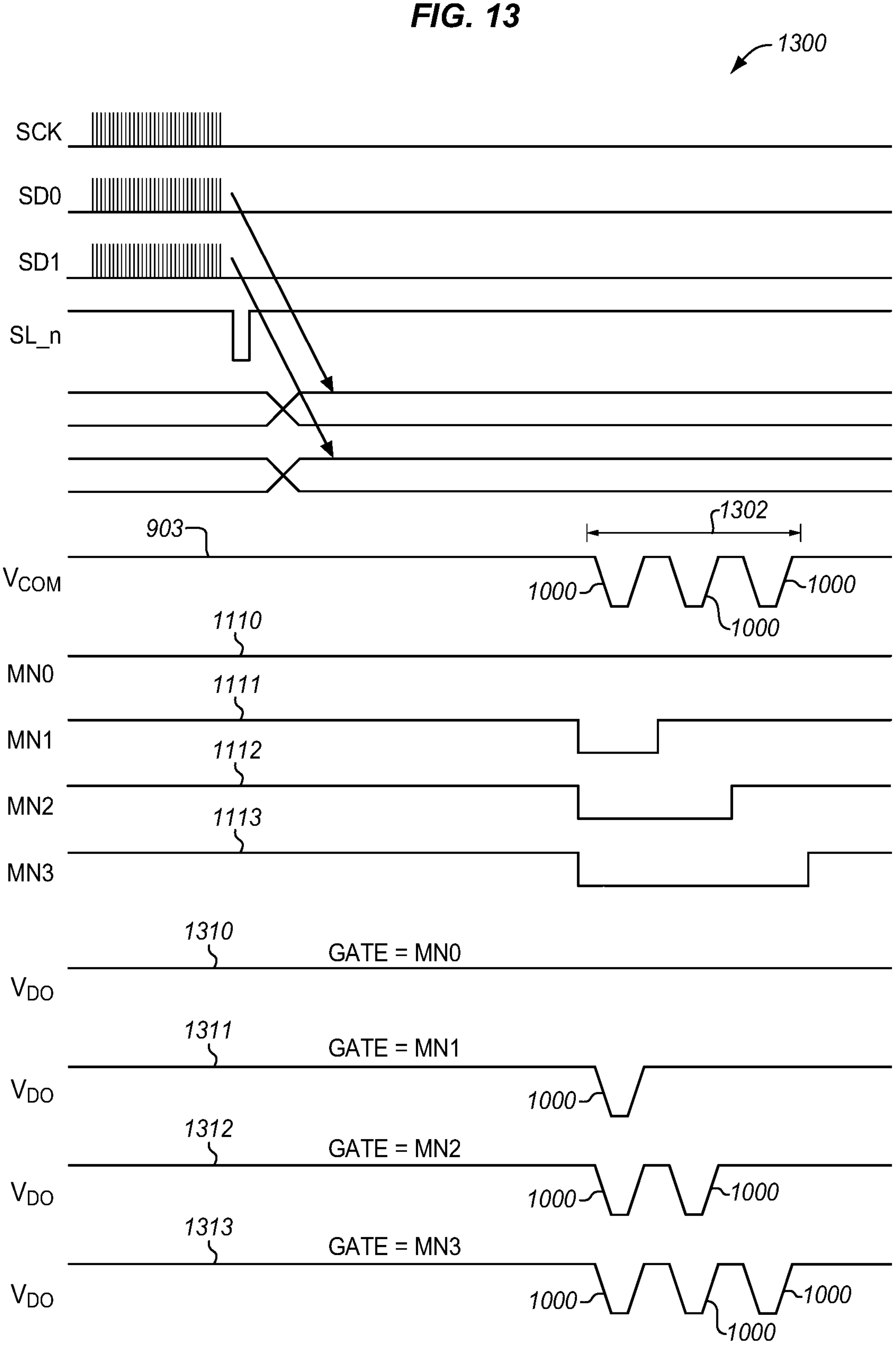
FIG. 13 is a signal diagram for a driver circuit driving jetting channels for a single print fluid.

FIG. 13 is a signal diagram 1300 for driver circuit 910 driving jetting channels for a single print fluid. Signal diagram 1300 shows a serial data clock (SCK), the serial data (DS0 and DS1), and latch signal (SL_n). The serial data is loaded into upper and lower shift registers of driver circuit 910 based on the serial data clock, and then latched into the upper and lower registers at the rising edge of the latch signal.

Signal diagram 1300 also shows drive waveform 903 (i.e., $V_{com}$) that includes a series or train of three jetting pulses 1000 for a jetting period 1302 or jetting cycle. A jetting period 1302 comprises a time period designated for jetting by a jetting channel 302 for a pixel. For example, when a jetting channel 302 jets for an individual pixel, the jetting channel 302 will jet during the jetting period 1302. Each of the jetting pulses 1000 on drive waveform 903 is configured to cause jetting at a jetting channel 302, which means that the pulse width and amplitude of each pulse is configured to activate an actuator 316 to cause jetting of a droplet from a jetting channel 302. Although three jetting pulses are used for jetting at a single pixel in this example, more or less jetting pulses may be used within a jetting period 1302 in other examples.

Signal diagram 1300 also shows gating signals 1110-1113 (MN0-MN3) that may be applied to switching elements 1106 based on selection by selector 1120. When driver circuit 910 controls a single print fluid, each of the gating signals 1110-1113 are designated for that single print fluid. When a gating signal 1110-1113 is "HIGH", a switching element 1106 is "OFF" meaning that drive waveform 903 is blocked from an actuator 316. When a gating signal 1110-1113 is "LOW", a switching element 1106 is "ON" meaning that drive waveform 903 is allowed to pass to an actuator 316. Signal diagram 1300 also shows the driver output signals 1310-1313 ($V_{DO}$) that are provided or applied to an actuator 316 in response to the respective gating signals 1110-1113.

Gating signal 1110 (MN0) is always "HIGH", and acts to keep a switching element 1106 off during a jetting period 1302. Thus, the corresponding driver output signal 1310 to an actuator 316 of a jetting channel 302 is a constant high voltage when gating signal 1110 (MN0) is selected. Because there is no jetting pulse 1000 on the driver output signal 1310, there will be no jetting from the jetting channel. Gating signal 1111 (MN1) is "LOW" for a time window that allows one jetting pulse 1000 from drive waveform 903 to pass on driver output signal 1311 to an actuator 316 of a jetting channel 302. The single jetting pulse 1000 will actuate the actuator 316 of the jetting channel 302 once, resulting in jetting of one droplet from the jetting channel 302. Gating signal 1112 (MN2) is "LOW" for a time window that allows two jetting pulses 1000 from drive waveform 903 to pass on driver output signal 1312 to an actuator 316 of a jetting channel 302. The two jetting pulses 1000 will actuate the actuator 316 of the jetting channel 302 twice, resulting in jetting of two droplets from the jetting channel 302. Gating signal 1113 (MN3) is "LOW" for a time window that allows three jetting pulses 1000 from drive waveform 903 to pass on driver output signal 1313 to an actuator 316 of a jetting channel 302. The three jetting pulses 1000 will actuate the actuator 316 of the jetting channel 302 three times, resulting in jetting of three droplets from the jetting channel 302.

As is evident in FIG. 13, gating signals 1110-1113 control how switch driver 1102 selectively opens and closes a switching element 1106 to control how jetting pulses 1000 are or are not applied to jetting channels 302. Based on the print data, selector 1120 selects one of the gating signals 1110-1113 for each jetting channel 302. For example, when the print data (SD0 and SD1) for a jetting channel 302 has a value of "00", selector 1120 may select gating signal 1110 (MN0) so that no jetting occurs from the jetting channel 302. When the print data has a value of "01", selector 1120 may select gating signal 1111 (MN1) so that one droplet is jetted from the jetting channel 302. When the print data has a value of "10", selector 1120 may select gating signal 1112 (MN2) so that two droplets are jetted from the jetting channel 302. When the print data has a value of "11", selector 1120 may select gating signal 1113 (MN3) so that three droplets are jetted from the jetting channel 302. This allows for grayscale jetting from each of the jetting channels 302 for the single print fluid.

In one embodiment, driver circuit 910 may be implemented in a printhead 104 to control jetting of multiple print fluids (e.g., multiple colors) from jetting channels 302. Previously, to jet two different print fluids, two driver circuits would be implemented in a printhead. One of the driver circuits would control the jetting channels for one of the print fluids, and the other driver circuit would control the jetting channels for the other print fluid. To jet four different print fluids, four driver circuits would be implemented. In the embodiments below, a single driver circuit 910 may be used to control jetting of multiple print fluids.

Figure 14:
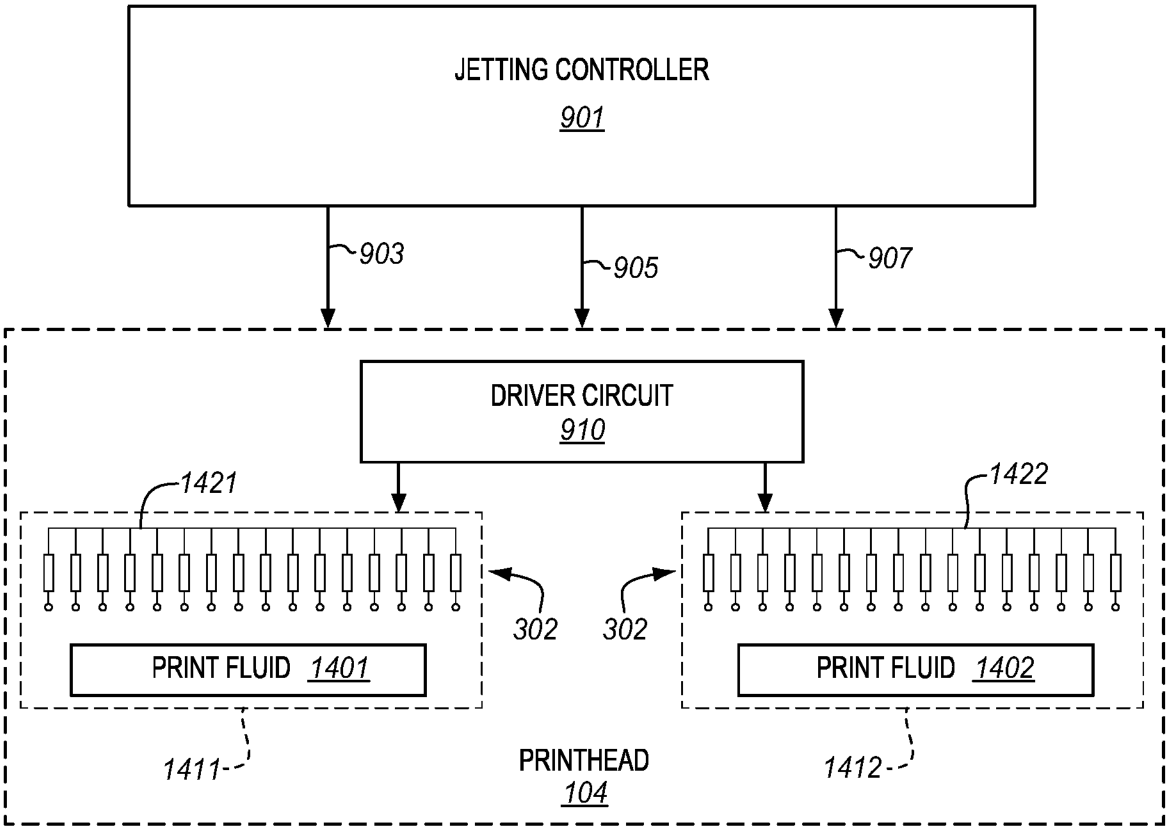
FIG. 14 is a schematic diagram of a printhead having a driver circuit for multiple print fluids in an illustrative embodiment.

FIG. 14 is a schematic diagram of a printhead 104 having a driver circuit 910 for multiple print fluids in an illustrative embodiment. Printhead 104 is shown as including a first subset 1411 of jetting channels 302, and a second subset 1412 of jetting channels 302. The first subset 1411 of jetting channels 302 is configured to jet a first print fluid 1401 (e.g., one color of ink). Thus, the jetting channels 302 in the first subset 1411 are fluidly coupled to a common manifold 1421 for the first print fluid 1401. The second subset 1412 of jetting channels 302 is configured to jet a second print fluid 1402 (e.g., another color of ink). Thus, the jetting channels 302 in the second subset 1412 are fluidly coupled to a common manifold 1422 for the second print fluid 1402.

Figure 15:
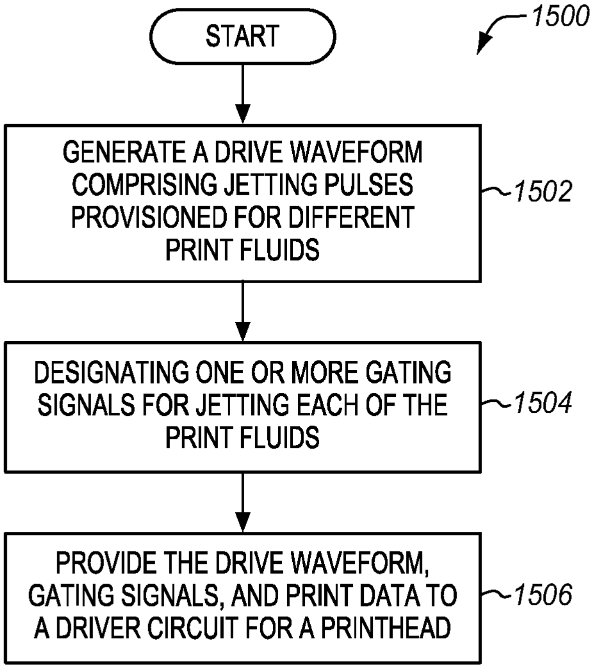
FIGS. 15-16 are flow charts illustrating a method of driving jetting channels for multiple print fluids in an illustrative embodiment.
Figure 16:
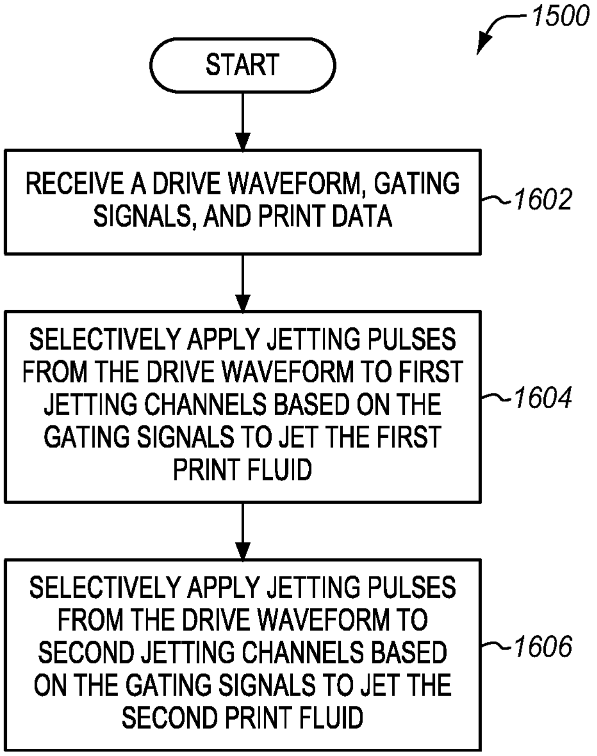

FIGS. 15-16 are flow charts illustrating a method 1500 of driving jetting channels for multiple print fluids in an illustrative embodiment. The steps of method 1500 will be described with reference to jetting controller 901 and driver circuit 910 in FIG. 9, but those skilled in the art will appreciate that method 1500 may be performed in other systems or circuits. Also, the steps of the flow charts described herein are not all inclusive and may include other steps not shown, and the steps may be performed in an alternative order.

In FIG. 15, drive waveform generator 902 generates a drive waveform 903 comprising jetting pulses that are provisioned, pre-determined, or selected for the different print fluids (step 1502). Different print fluids may jet differently from a jetting channel 302 in response to a jetting pulse. For example, a lighter-color ink (e.g., white) may jet differently than a darker color of ink (e.g., black) in response to the same jetting pulse. Thus, in one embodiment, the jetting pulses on the drive waveform 903 are each provisioned for a specific print fluid. In other words, when a jetting pulse is provisioned for a specific print fluid, the characteristics of the jetting pulse may be optimized for jetting that print fluid with the desired droplet properties (e.g., shape, size/mass, velocity, etc.).

Figure 17:
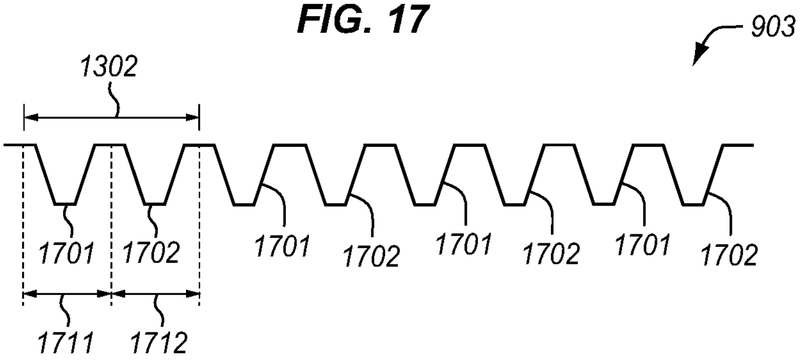
FIGS. 17-18 illustrate a drive waveform in an illustrative embodiment.

FIG. 17 illustrates drive waveform 903 in an illustrative embodiment. In this embodiment, drive waveform 903 includes jetting pulses 1701 that are provisioned for a first print fluid 1401, and jetting pulses 1702 that are provisioned for a second print fluid 1402. Within a jetting period 1302, drive waveform 903 is shown with one jetting pulse 1701 for the first print fluid 1401, and one jetting pulse 1702 for the second print fluid 1402. However, there may be multiple jetting pulses 1701 for the first print fluid 1401, and multiple jetting pulses 1702 for the second print fluid 1402 in the jetting period 1302 in other embodiments. Jetting pulse 1701 occupies a first time slot 1711 in the jetting period 1302, and jetting pulse 1702 occupies a second time slot 1712 in the jetting period 1302. For example, if the jetting period 1302 is 1/38,000 of a second, then time slots 1711-1712 may each be 1/76,000 of a second. Drive waveform 903 may include additional jetting pulses provisioned for additional print fluids in other embodiments.

Figure 18:
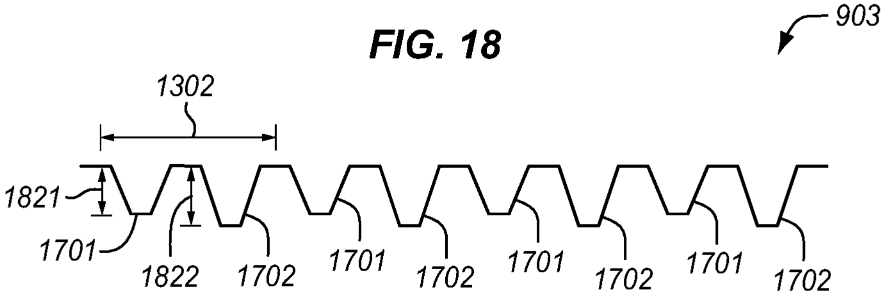

Jetting pulses 1701-1702 may have different characteristics optimized for their respective print fluids. FIG. 18 illustrates drive waveform 903 in another illustrative embodiment. As shown in this example, jetting pulses 1701-1702 may have different jetting amplitudes that are each provisioned based their respective print fluids. In this embodiment, jetting pulse 1701 has a jetting amplitude 1821 that is less than the jetting amplitude 1822 of jetting pulse 1702. However, jetting pulses 1701-1702 may have other different characteristics, such as fall time, rise time, pulse width, etc., that are optimized for a particular print fluid.

Figure 19:
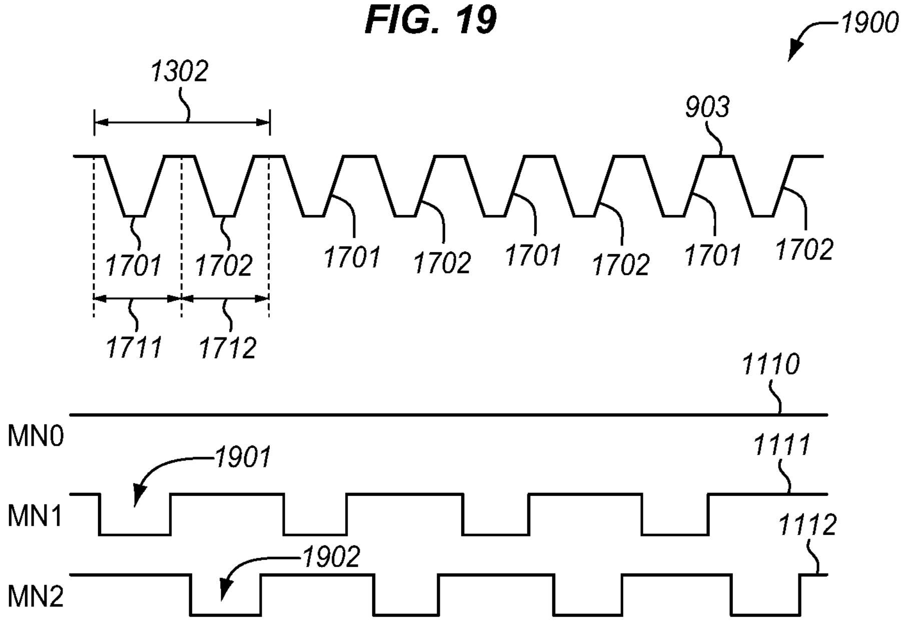
FIG. 19 is a signal diagram illustrating gating signals in an illustrative embodiment.

In FIG. 15, control signal generator 906 designates or assigns one or more gating signals 1110-1113 for jetting each of the print fluids (step 1504). As described above, a gating signal 1110-1113 is used to control the driver output signal ($V_{DO}$) to a jetting channel 302 (e.g., one or more jetting pulses, no jetting pulse, etc.). In the description in FIG. 13, the gating signals 1110-1113 were used to define greyscale levels in a jetting channel 302 for a single print fluid. In this embodiment, the gating signals 1110-1113 are used to control jetting of multiple print fluids. Thus, a gating signal (or more than one gating signal) is designated for jetting a particular print fluid. In a two-bit example, there are four gating signals 1110-1113 (MN0-MN3), and control signal generator 906 may assign one gating signal (e.g., MN1) to the first print fluid 1401, and another gating signal (e.g., MN2) to the second print fluid 1402. When a gating signal is assigned or designated to a print fluid, the gating signal is used exclusively for jetting that print fluid. For example, if gating signal MN1 is assigned to a first color of ink, then gating signal MN1 is used exclusively for jetting the first color of ink. If gating signal MN2 is assigned to a second color of ink, then gating signal MN2 is used exclusively for jetting the second color of ink. The gating signals 1110-1113 assigned to a print fluid for jetting represent "active" gating signals for jetting by a jetting channel 302 during a jetting period 1302. An active gating signal will allow the drive waveform 903 to pass to an actuator 316 of a jetting channel 302. Control signal generator 906 also defines one or more no or inactive gating signals (e.g., MN0) that do not allow the drive waveform 903 to pass to an actuator 316 of a jetting channel 302. Each gating signal 1110-1113, that is assigned to a particular print fluid, is configured or formatted with active time windows that correspond (in time) with one or more pulses of drive waveform 903. A gating signal 1110-1113 is a digital signal that has pulses which trigger passage of the drive waveform 903 to an actuator 316. These pulses that trigger passage of the drive waveform 903 are considered active time windows. For example, an active time window may be when a gating signal 1110-1113 is set to "LOW". FIG. 19 is a signal diagram 1900 illustrating gating signals 1110-1113 in an illustrative embodiment. Assume for this example that jetting pulse 1701 is provisioned for a first print fluid 1401, and gating signal 1111 (MN1) is designated for jetting the first print fluid 1401. Control signal generator 906 may configure gating signal 1111 with active time windows 1901 that correspond with the jetting pulses 1701 for the first print fluid 1401. Within a jetting period 1302, an active time window 1901 for gating signal 1111 corresponds with the time slot 1711 of jetting pulse 1701. Further assume for this example that jetting pulse 1702 is provisioned for a second print fluid 1402, and gating signal 1112 (MN2) is designated for jetting the second print fluid 1402. Control signal generator 906 may configure gating signal 1112 with active time windows 1902 that correspond with the jetting pulses 1702 for the second print fluid 1402. Within a jetting period 1302, an active time window 1902 for gating signal 1112 corresponds with the time slot 1712 of jetting pulse 1702.

In FIG. 15, jetting controller 901 sends, transmits, or provides the drive waveform 903, gating signals 1110-1113 (along with other control signals 907), and print data 905 to driver circuit 910 (step 1506). The gating signals 1110-1113 include one or more active gating signals designated for jetting the first print fluid 1401, and one or more active gating signals designated for jetting the second print fluid 1402. However, more gating signals for additional print fluids (e.g., a third print fluid, a fourth print fluid, etc.) may also be sent by jetting controller 901.

In FIG. 16, driver circuit 910 receives the drive waveform 903, gating signals 1110-1113, and print data 905 (step 1602). Assume for this example that of the gating signals 1110-1113 received from jetting controller 901, gating signal 1111 is an active gating signal designated for jetting the first print fluid 1401, and gating signal 1112 is an active gating signal designated for jetting the second print fluid 1402 as shown in FIG. 19. Driver circuit 910 then selectively applies the drive waveform 903 to the jetting channels 302 as follows. Driver circuit 910 selectively applies jetting pulses from drive waveform 903 to the first subset 1411 of jetting channels 302 based on active gating signal 1111 to jet the first print fluid 1401 (step 1604). For example, driver circuit 910 may select a gating signal for each of the jetting channels 302 of the first subset 1411 based on the print data for those jetting channels 302. When the selected gating signal is active gating signal 1111 and drive waveform 903 is configured as shown in FIG. 19, driver circuit 910 will apply a first jetting pulse 1701 from drive waveform 903 to that jetting channel 302, and will block the second jetting pulse 1702. When the selected gating signal is an inactive gating signal 1110, driver circuit 910 will block the drive waveform 903 from being applied to that jetting channel 302.

Driver circuit 910 selectively applies jetting pulses from drive waveform 903 to the second subset 1412 of jetting channels 302 based on active gating signal 1112 to jet the second print fluid 1402 (step 1606). For example, driver circuit 910 may select a gating signal for each of the jetting channels 302 of the second subset 1412 based on the print data for those jetting channels 302. When the selected gating signal is active gating signal 1112 and drive waveform 903 is configured as shown in FIG. 19, driver circuit 910 will apply a second jetting pulse 1702 from drive waveform 903 to that jetting channel 302, and will block the first jetting pulse 1701. When the selected gating signal is an inactive gating signal 1110, driver circuit 910 will block the drive waveform 903 from being applied to that jetting channel 302.

One technical benefit of the jetting control system 900 described above is that driver circuit 910 may be used for multiple print fluids in a printhead 104. A typical driver circuit 910 was used to drive jetting channels 302 of a single print fluid. However, a drive waveform 903 as described above may have different jetting pulses provisioned for different print fluids, and gating signals are assigned to specific print fluids. Thus, driver circuit 910 is able to use the gating signals to apply the print-fluid-specific jetting pulses to the appropriate jetting channels 302 to jet different print fluids.

Figure 20:
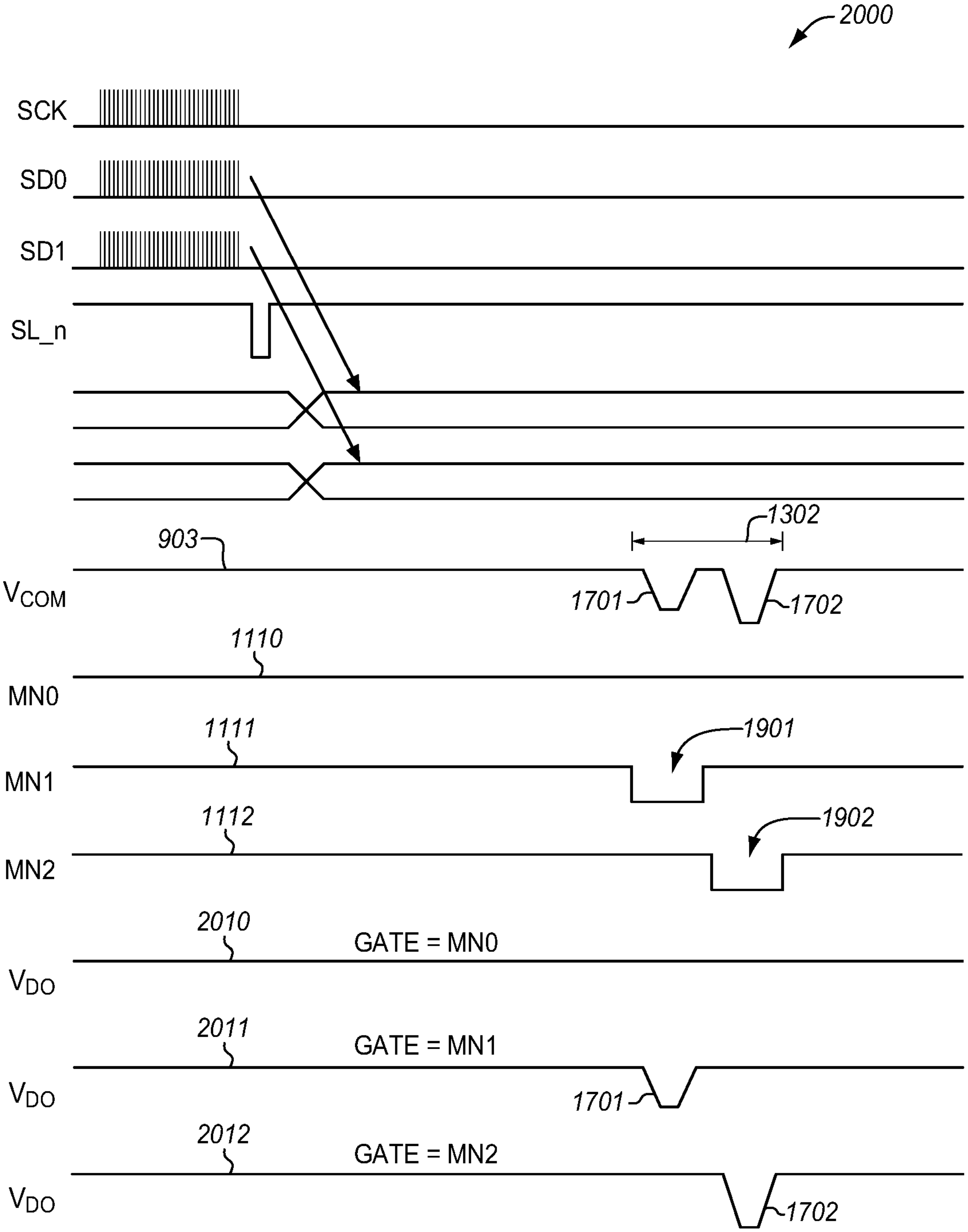
FIG. 20 is a signal diagram for a driver circuit jetting multiple print fluids in an illustrative embodiment.

The following provides a further description of how driver circuit 910 selectively applies jetting pulses to jetting channels 302 in one embodiment. FIG. 20 is a signal diagram 2000 for driver circuit 910 jetting multiple print fluids in an illustrative embodiment. Signal diagram 2000 shows drive waveform 903 (i.e., $V_{com}$) that includes a series or train of jetting pulses 1701-1702 for a jetting period 1302. Jetting pulse 1701 is provisioned for a first print fluid 1401, and jetting pulse 1702 is provisioned for a second print fluid 1402. In this embodiment, jetting pulse 1701 has a jetting amplitude that is less than the jetting amplitude of jetting pulse 1702. However, jetting pulses 1701-1702 may have other different characteristics that are optimized for a particular print fluid in other embodiments.

Signal diagram 2000 also shows gating signals 1110-1112. Gating signal 1110 (MN0) is an inactive gating signal that does not allow a jetting pulse 1701-1702 on drive waveform 903 to pass to an actuator 316 of a jetting channel 302. Gating signal 1111 (MN1) is an active gating signal designated for jetting the first print fluid 1401, and includes an active time window 1901 that corresponds with the jetting pulse 1701 for the first print fluid 1401. Gating signal 1112 (MN2) is an active gating signal designated for jetting the second print fluid 1402, and includes an active time window 1902 that corresponds with the jetting pulse 1702 for the second print fluid 1402. Other gating signals, such as MN3, may be ignored in this embodiment.

Figure 21:
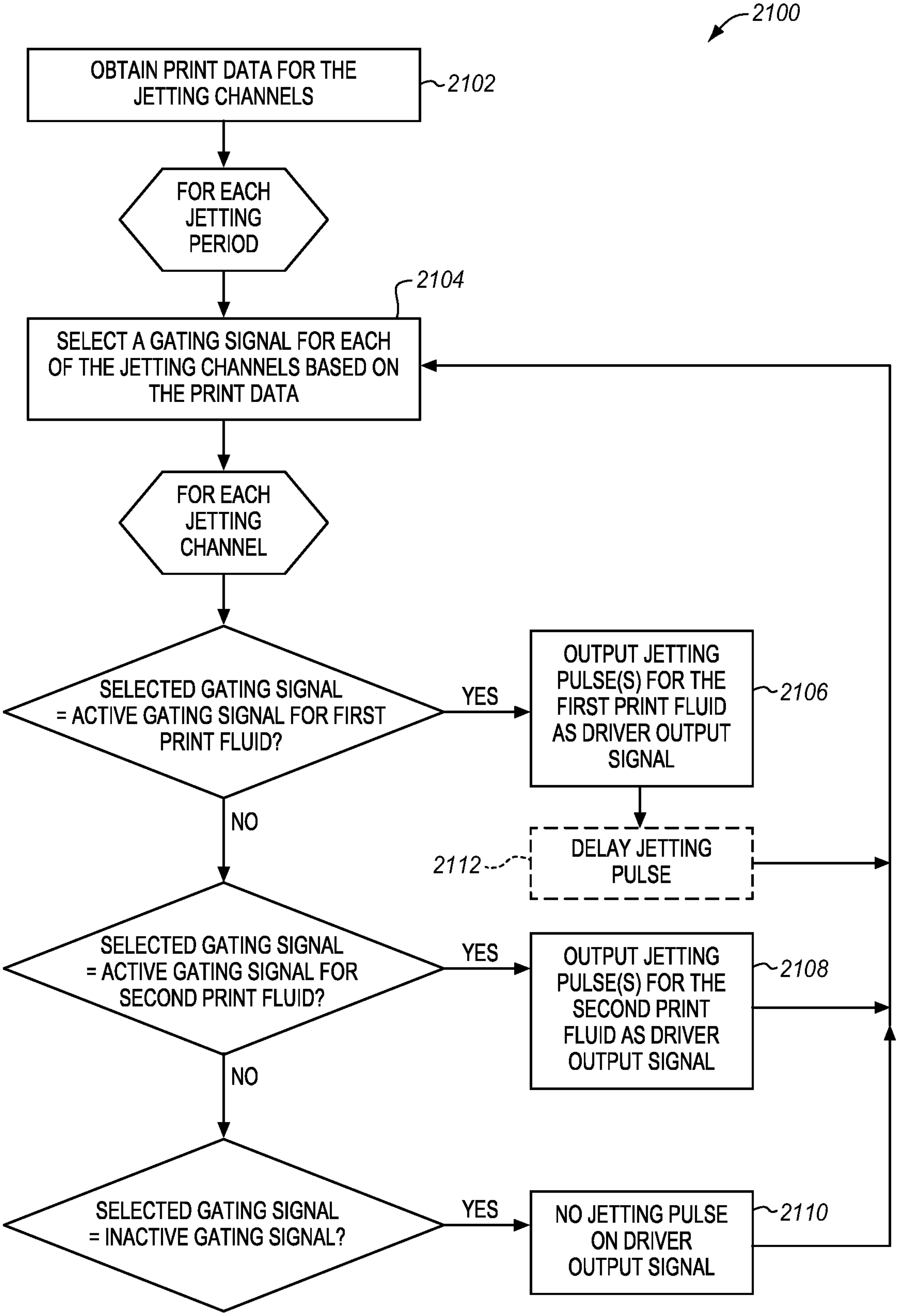
FIG. 21 is a flow chart illustrating a method of selectively applying jetting pulses from a drive waveform to jetting channels in an illustrative embodiment.
Figure 22:
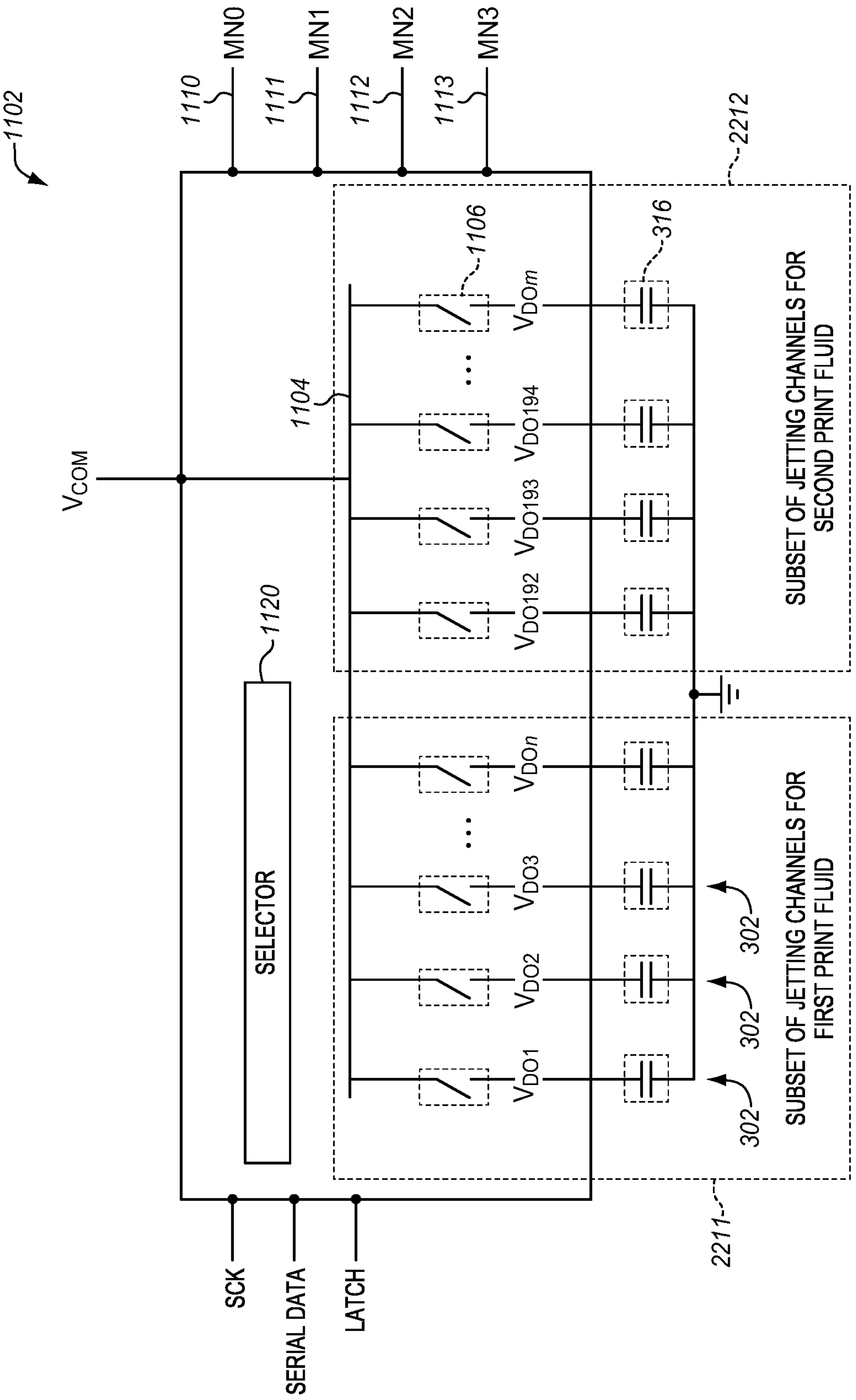
FIG. 22 is a schematic diagram of a switch driver of a driver circuit in an illustrative embodiment.

FIG. 21 is a flow chart illustrating a method 2100 of selectively applying jetting pulses from drive waveform 903 to jetting channels 302 in an illustrative embodiment. For a jetting period 1302 (as shown in FIG. 20), driver circuit 910 obtains the print data for the jetting channels 302 (step 2102), such as for the first subset 1411 of jetting channels 302 and the second subset 1412 of jetting channels 302. For each jetting period 1302, driver circuit 910 will use the print data to select gating signals for the individual jetting channels 302. FIG. 22 is a schematic diagram of switch driver 1102 of driver circuit 910 in an illustrative embodiment. As in FIG. 11, switch driver 1102 includes a plurality of switching elements 1106 each associated with an individual jetting channel 302. In this embodiment, a subset 2211 of the switching elements 1106 are associated with the first subset 1411 of jetting channels 302 for the first print fluid 1401 (see FIG. 14), and a subset 2212 of the switching elements 1106 are associated with the second subset 1412 of jetting channels 302 for the second print fluid 1402. The switching elements 1106 in subset 2211 are each communicatively (e.g., electrically) coupled to an actuator 316 of a jetting channel 302 configured to jet the first print fluid 1401. The switching elements 1106 in subset 2212 are each communicatively coupled to an actuator 316 of a jetting channel 302 configured to jet the second print fluid 1402. Each switching element 1106 is configured to selectively apply the drive waveform 903 to its associated actuator 316 based on the print data.

For the present jetting period 1302, driver circuit 910 (through selector 1120) selects a gating signal 1110-1112 for each of the jetting channels 302 based on the print data (step 2104 of FIG. 21). In the above example, gating signal 1110 is configured as an inactive gating signal (e.g., set to "HIGH"), gating signal 1111 is configured as an active gating signal designated for jetting the first print fluid 1401, and gating signal 1112 is configured as an active gating signal designated for jetting the second print fluid 1402. Thus, selector 1120 selects either inactive gating signal 1110 or active gating signal 1111 for the first subset 1411 of jetting channels 302 configured to jet the first print fluid 1401, and selects either inactive gating signal 1110 or active gating signal 1112 for the second subset 1412 of jetting channels 302 configured to jet the second print fluid 1402.

For each jetting channel 302 controlled by driver circuit 910, it may perform the following. When the selected gating signal 1110-1112 for a jetting channel 302 comprises the active gating signal 1111 designated for jetting the first print fluid 1401, driver circuit 910 outputs jetting pulse 1701 (or multiple instances of jetting pulse 1701) from drive waveform 903 as the driver output signal ($V_{DO}$) to the actuator 316 of the jetting channel 302 (step 2106), and blocks jetting pulse 1702. As shown in FIG. 20, the active gating signal 1111 (MN1) for the first print fluid 1401 is "LOW" for a time window 1901 that corresponds with jetting pulse 1701 of drive waveform 903. Thus, a switching element 1106 for this jetting channel 302 will be "ON" when the active gating signal 1111 is low, and the driver output signal 2011 will include jetting pulse 1701 and not jetting pulse 1702.

In FIG. 21, when the selected gating signal 1110-1112 for a jetting channel 302 comprises an active gating signal 1112 for the second print fluid 1402, driver circuit 910 outputs jetting pulse 1702 (or multiple instances of jetting pulse 1702) from drive waveform 903 as the driver output signal ($V_{DO}$) to the actuator 316 of the jetting channel 302 (step 2108), and blocks jetting pulse 1701. As shown in FIG. 20, the active gating signal 1112 (MN2) for the second print fluid 1402 is "LOW" for a time window 1902 that corresponds with jetting pulse 1702 of drive waveform 903. Thus, a switching element 1106 for this jetting channel 302 will be "ON" when the active gating signal 1112 is low, and the driver output signal 2012 will include jetting pulse 1702 and not jetting pulse 1701.

In FIG. 21, when the selected gating signal 1110-1112 for a jetting channel 302 comprises the inactive gating signal 1110, driver circuit 910 outputs no jetting pulse on the driver output signal ($V_{DO}$) to the actuator 316 of the jetting channel 302 (step 2110). As shown in FIG. 20, the inactive gating signal 1110 (MN0) is set at a constant voltage. Thus, a switching element 1106 for this jetting channel 302 will be "OFF", and the driver output signal 2010 will include no jetting pulse.

In looking at FIG. 20, jetting pulse 1701 leads jetting pulse 1702 in the jetting period 1302 of drive waveform 903. It may be desirable for jetting channels 302 for the first print fluid 1401 to jet concurrently with the jetting channels 302 for the second print fluid 1402. Thus, driver circuit 910 may delay the first jetting pulses 1702 applied to the first subset 1411 of jetting channels 302 (optional step 2112), in one embodiment. For example, driver circuit 910 may delay the first jetting pulse 1701 on driver output signal 2011 to align time-wise with the second jetting pulse 1702 on driver output signal 2012. By delaying a first jetting pulse 1701, jetting of the first print fluid 1401 from the first subset 1411 of jetting channels 302 is concurrent or substantially concurrent with jetting of the second print fluid 1402 from the second subset 1412 of jetting channels 302.

Figure 23:
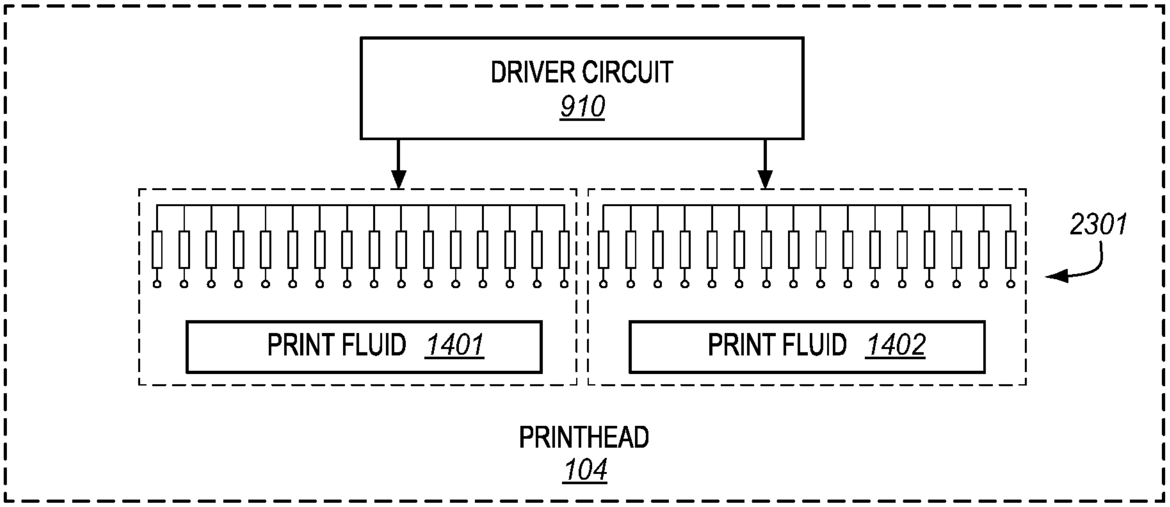
FIGS. 23-26 illustrate different configurations of a printhead in an illustrative embodiment.
Figure 24:
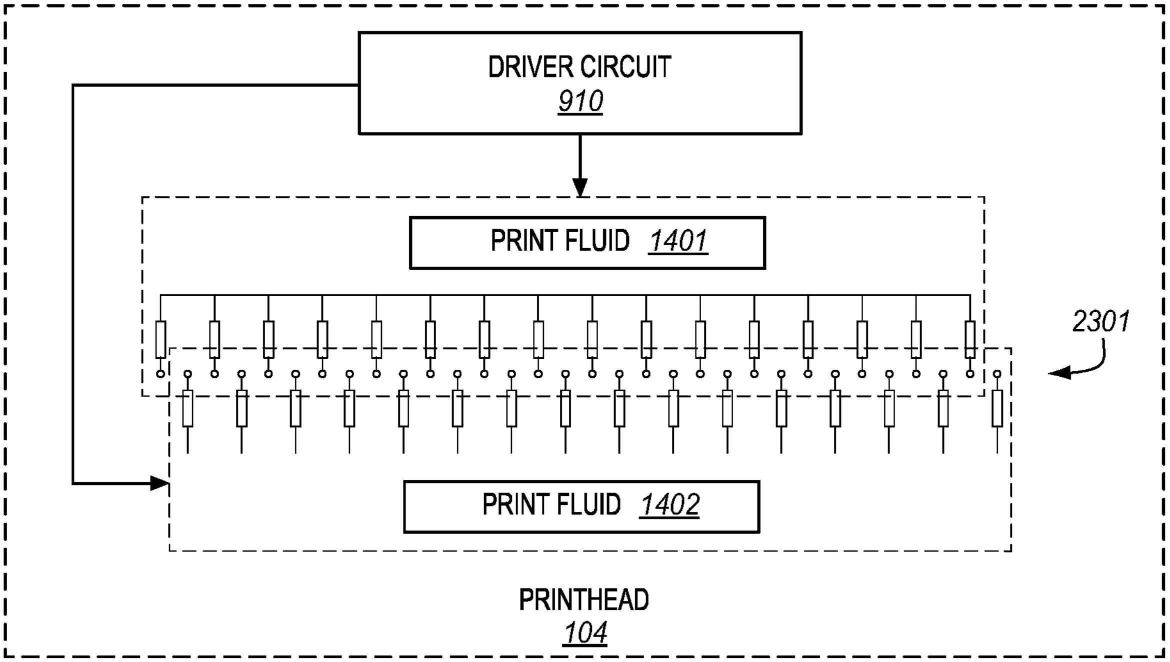
Figure 25:
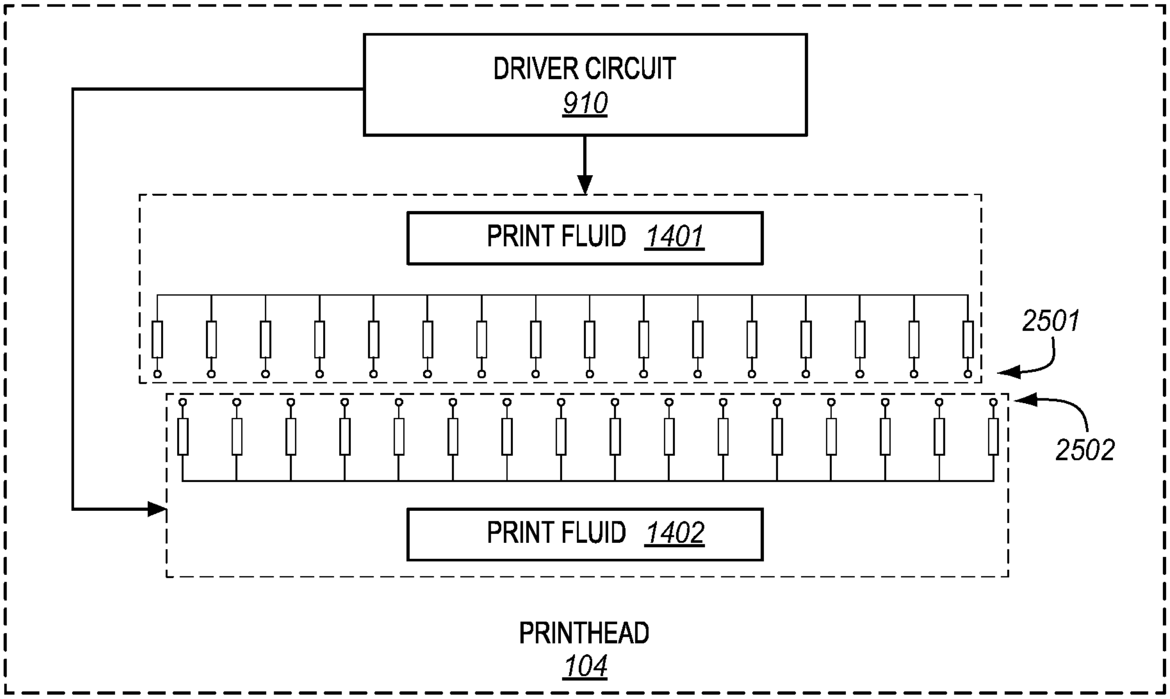

The above embodiment described a driver circuit 910 that drives jetting channels 302 for two different print fluids. The jetting channels 302 may be arranged in various ways. For example, the jetting channels 302 for the first print fluid 1401 and the jetting channels 302 for the second print fluid 1402 may form a single row 2301 of nozzles, as shown in FIGS. 23-24. Thus, driver circuit 910 is able to drive jetting channels 302 for two different print fluids arranged in a single row 2301 of nozzles. In another embodiment, the jetting channels 302 for the first print fluid 1401 may form at least part of a first row 2501 of nozzles, and the jetting channels 302 for the second print fluid 1402 may form at least part of a second row 2502 of nozzles, as shown in FIG. 25.

The above embodiments described a two-bit driver circuit 910. However, driver circuit 910 may comprise a three-bit driver, a four-bit driver, etc., in other embodiments. In a three-bit driver, for example, there may be eight gating signals. When a driver circuit 910 drives jetting channels 302 for two different print fluids and there are eight gating signals, more than one gating signal may be designated for jetting each of the print fluids. Thus, different greyscale levels may be produced for each of the print fluids in a similar manner as described in FIG. 13.

Figure 26:
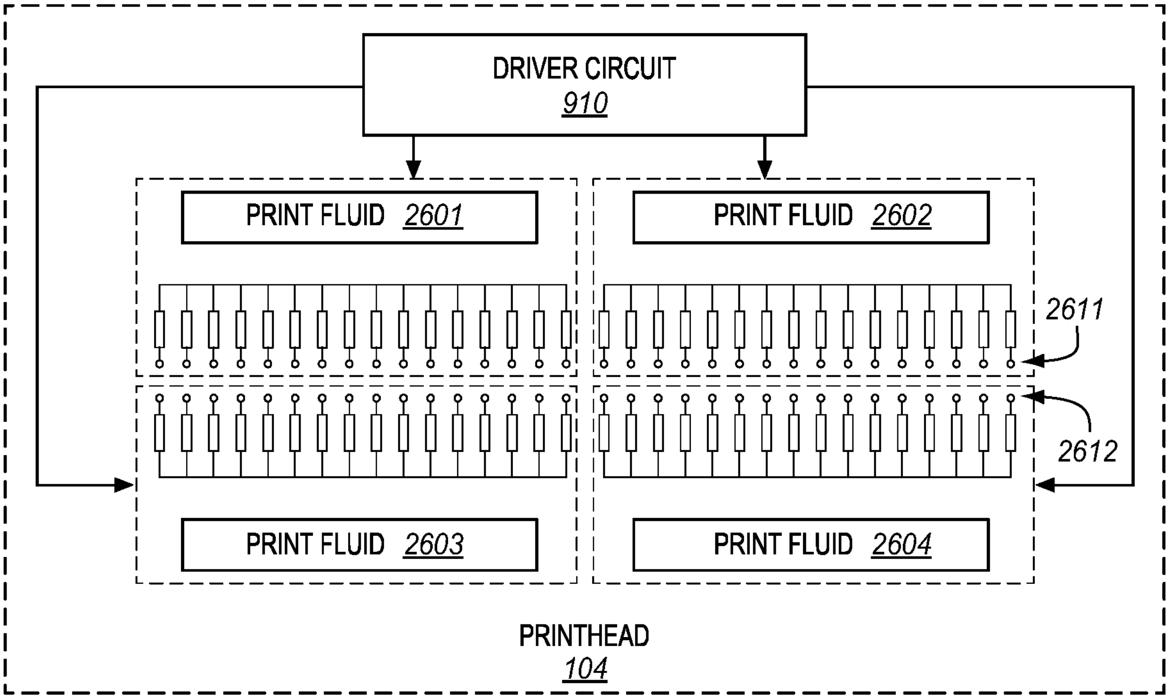
Figure 27:
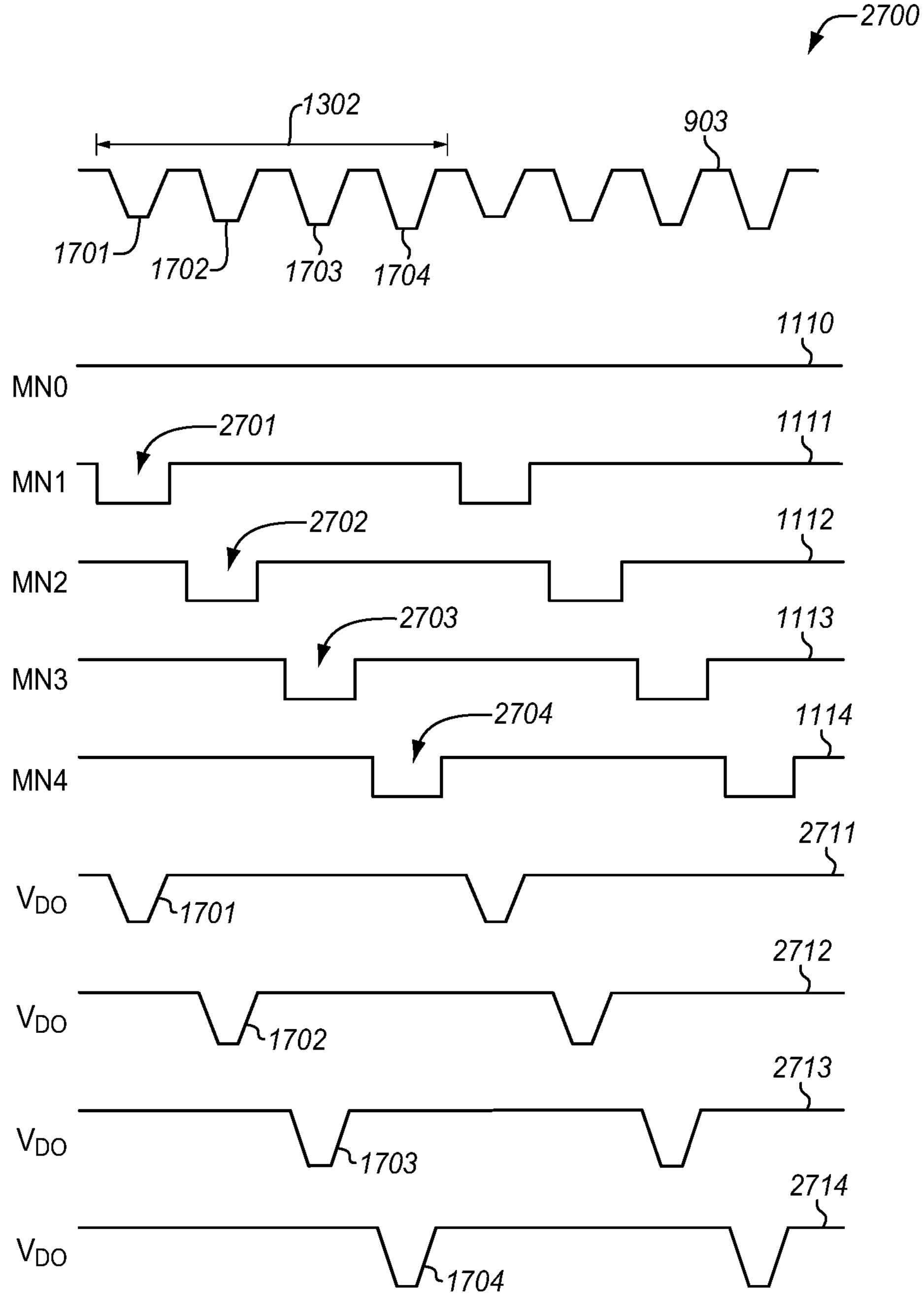
FIG. 27 is a signal diagram for a driver circuit jetting multiple print fluids in an illustrative embodiment.

Further, when a three-bit driver is implemented, driver circuit 910 may drive jetting channels 302 for four (or more) different print fluids 2601-2604 in two rows 2611-2612 of nozzles as shown in FIG. 26, in a single row of nozzles, or more rows of nozzles. FIG. 27 is a signal diagram 2700 for driver circuit 910 jetting multiple print fluids in an illustrative embodiment. Signal diagram 2700 shows drive waveform 903 (i.e., $V_{com}$) that includes a series or train of jetting pulses 1701-1704 for a jetting period 1302. Jetting pulse 1701 is provisioned for a first print fluid 2601, jetting pulse 1702 is provisioned for a second print fluid 2602, jetting pulse 1703 is provisioned for a third print fluid 2603, and jetting pulse 1704 is provisioned for a fourth print fluid 2604. In this embodiment, it may be assumed that jetting pulses 1701-1704 have different characteristics that are optimized for a particular print fluid.

Signal diagram 2700 also shows gating signals 1110-1114. Gating signal 1110 (MN0) is an inactive gating signal that does not allow a jetting pulse 1701-1704 on drive waveform 903 to pass to an actuator 316 of a jetting channel 302. Gating signal 1111 (MN1) is an active gating signal designated for jetting the first print fluid 2601, and includes an active time window 2701 that corresponds with the jetting pulse 1701 for the first print fluid 2601. Gating signal 1112 (MN2) is an active gating signal designated for jetting the second print fluid 2602, and includes an active time window 2702 that corresponds with the jetting pulse 1702 for the second print fluid 2602. Gating signal 1113 (MN3) is an active gating signal designated for jetting the third print fluid 2603, and includes an active time window 2703 that corresponds with the jetting pulse 1703 for the third print fluid 2603. Gating signal 1114 (MN4) is an active gating signal designated for jetting the fourth print fluid 2604, and includes an active time window 2704 that corresponds with the jetting pulse 1704 for the fourth print fluid 2604. Other gating signals, such as MN5-MN7, may be ignored in this embodiment.

For each jetting channel 302 controlled by driver circuit 910, it may perform the following. When the selected gating signal 1110-1114 for a jetting channel 302 comprises the active gating signal 1111 designated for jetting the first print fluid 2601, driver circuit 910 outputs jetting pulse 1701 (or multiple instances of jetting pulse 1701) from drive waveform 903 as the driver output signal 2711 ($V_{DO}$) to the actuator 316 of the jetting channel 302, and blocks the other jetting pulses 1702-1704. When the selected gating signal 1110-1114 for a jetting channel 302 comprises an active gating signal 1112 for the second print fluid 2602, driver circuit 910 outputs jetting pulse 1702 (or multiple instances of jetting pulse 1702) from drive waveform 903 as the driver output signal 2712 ($V_{DO}$) to the actuator 316 of the jetting channel 302, and blocks jetting pulses 1701 and 1703-1704. When the selected gating signal 1110-1114 for a jetting channel 302 comprises an active gating signal 1113 for the third print fluid 2603, driver circuit 910 outputs jetting pulse 1703 (or multiple instances of jetting pulse 1703) from drive waveform 903 as the driver output signal 2713 ($V_{DO}$) to the actuator 316 of the jetting channel 302, and blocks jetting pulses 1701-1702 and 1704. When the selected gating signal 1110-1114 for a jetting channel 302 comprises an active gating signal 1114 for the fourth print fluid 2604, driver circuit 910 outputs jetting pulse 1704 (or multiple instances of jetting pulse 1704) from drive waveform 903 as the driver output signal 2714 ($V_{DO}$) to the actuator 316 of the jetting channel 302, and blocks jetting pulses 1701-1703. When the selected gating signal 1110-1114 for a jetting channel 302 comprises the inactive gating signal 1110, driver circuit 910 outputs no jetting pulse on the driver output signal to the actuator 316 of the jetting channel 302.

When driving jetting channels 302 for eight or more different print fluids, additional driver circuits 910 may be implemented that each drive four of the different print fluids as described above.

In the above embodiments, the drive waveform 903 included jetting pulses provisioned for two, four, or more different print fluids. In other embodiments, a jetting pulse (or multiple jetting pulses) may be shared to jet different print fluids. However, one or more non-jetting pulses (also referred to as pre-pulses or tickle pulses) may be included on the drive waveform 903 along with the jetting pulses. A non-jetting pulse is a pulse having a pulse width and/or amplitude that does not cause jetting of a droplet from a jetting channel 302. A non-jetting pulse may cause a partial deformation or physical displacement of an actuator 316, but the displacement is not sufficient to eject a droplet from a nozzle 314. Although a non-jetting pulse does not cause jetting, when one or more non-jetting pulses are applied to an actuator 316 of a jetting channel 302 along with a jetting pulse, the non-jetting pulse can affect jetting from the jetting channel 302 in response to the jetting pulse. Thus, driver circuit 910 can control jetting of different print fluids using non-jetting pulses in conjunction with jetting pulses.

Figure 28:
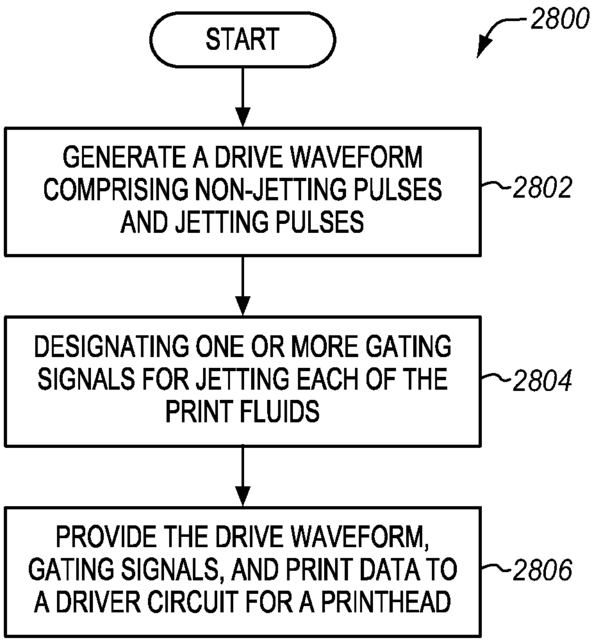
FIGS. 28-29 are flow charts illustrating a method of driving jetting channels for multiple print fluids in an illustrative embodiment.
Figure 29:
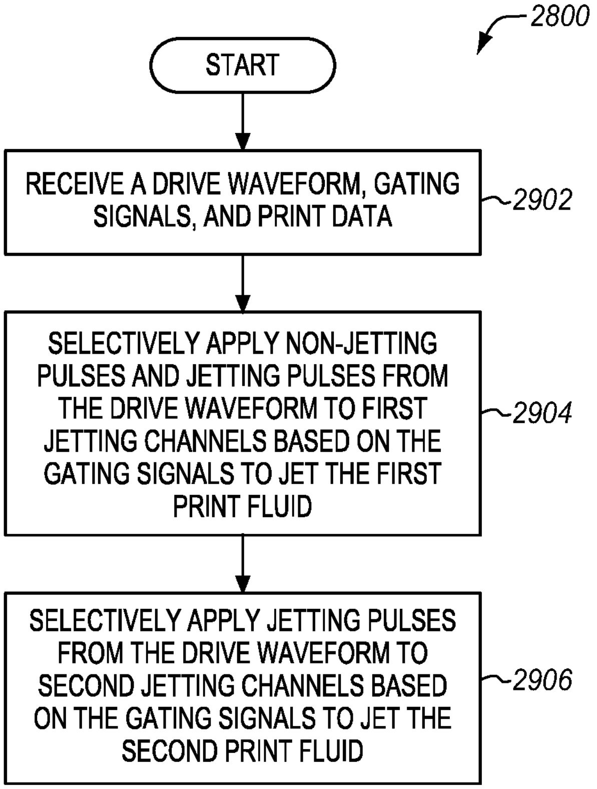
Figure 30:
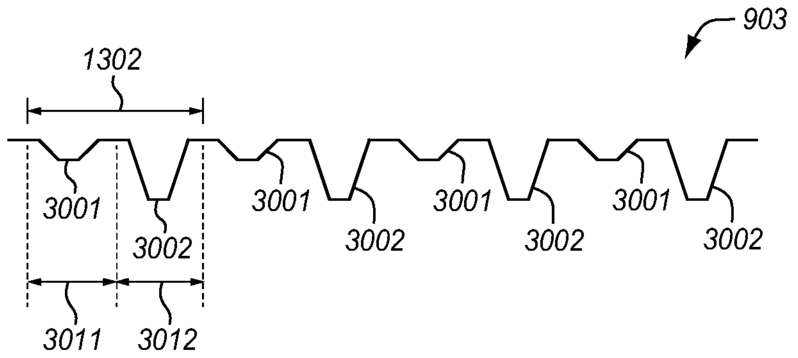
FIG. 30 illustrates a drive waveform in an illustrative embodiment.

FIGS. 28-29 are flow charts illustrating a method 2800 of driving jetting channels for multiple print fluids in an illustrative embodiment. Drive waveform generator 902 (see FIG. 9) generates a drive waveform 903 comprising non-jetting pulses and jetting pulses (step 2802). FIG. 30 illustrates drive waveform 903 in an illustrative embodiment. In this embodiment, drive waveform 903 includes non-jetting pulses 3001 and jetting pulses 3002. Within a jetting period 1302, drive waveform 903 is shown with one non-jetting pulse 3001 and one jetting pulse 3002. However, there may be multiple non-jetting pulses 3001, and multiple jetting pulses 3002 in the jetting period 1302 in other embodiments. Non-jetting pulse 3001 occupies a first time slot 3011 in the jetting period 1302, and jetting pulse 3002 occupies a second time slot 3012 in the jetting period 1302.

Figure 31:
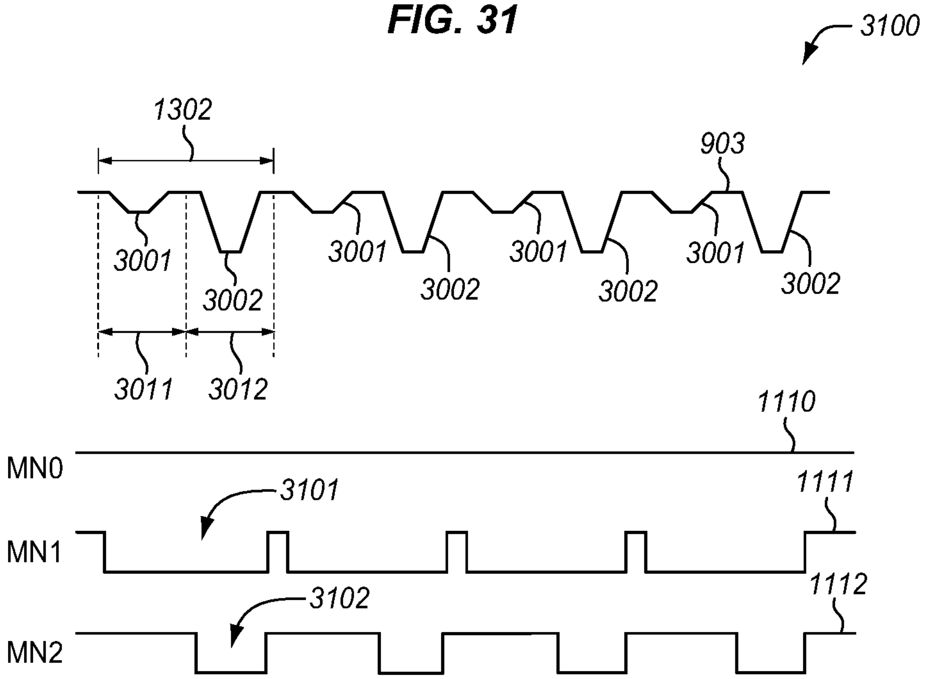
FIG. 31 is a signal diagram illustrating gating signals in an illustrative embodiment.

In FIG. 28, control signal generator 906 designates or assigns one or more gating signals 1110-1113 for jetting each of the print fluids (step 2804). As above, each gating signal 1110-1113, that is assigned to a particular print fluid, is configured or formatted with active time windows that correspond (in time) with one or more pulses of drive waveform 903. FIG. 31 is a signal diagram 3100 illustrating gating signals 1110-1112 in an illustrative embodiment. Assume for this example that gating signal 1111 (MN1) is designated for jetting the first print fluid 1401. Control signal generator 906 may configure gating signal 1111 with active time windows 3101 that correspond with the non-jetting pulses 3001 and the jetting pulses 3002. Further assume for this example that gating signal 1112 (MN2) is designated for jetting the second print fluid 1402. Control signal generator 906 may configure gating signal 1112 with active time windows 3102 that correspond with the jetting pulses 3002.

In FIG. 28, jetting controller 901 sends, transmits, or provides the drive waveform 903, gating signals 1110-1113 (along with other control signals 907), and print data 905 to driver circuit 910 (step 2806). The gating signals 1110-1113 include one or more active gating signals designated for jetting the first print fluid 1401, and one or more active gating signals designated for jetting the second print fluid 1402. However, more gating signals for additional print fluids (e.g., a third print fluid, a fourth print fluid, etc.) may also be sent by jetting controller 901.

In FIG. 29, driver circuit 910 receives the drive waveform 903, gating signals 1110-1113, and print data 905 (step 2902). Assume for this example that of the gating signals 1110-1113 received from jetting controller 901, gating signal 1111 is an active gating signal designated for jetting the first print fluid 1401, and gating signal 1112 is an active gating signal designated for jetting the second print fluid 1402 as shown in FIG. 31. Driver circuit 910 then selectively applies the drive waveform 903 to the jetting channels as follows. Driver circuit 910 selectively applies non-jetting pulses 3001 and jetting pulses 3002 from drive waveform 903 to the first subset 1411 of jetting channels 302 based on active gating signal 1111 to jet the first print fluid 1401 (step 2904). For example, driver circuit 910 may select a gating signal for each of the jetting channels 302 of the first subset 1411 based on the print data for those jetting channels 302. When the selected gating signal is active gating signal 1111 and drive waveform 903 is configured as shown in FIG. 31, driver circuit 910 will apply a non-jetting pulse 3001 and a jetting pulse 3002 from drive waveform 903 to that jetting channel 302. When the selected gating signal is an inactive gating signal 1110, driver circuit 910 will not apply the drive waveform 903 to that jetting channel 302.

Driver circuit 910 selectively applies jetting pulses 3002 from drive waveform 903 to the second subset 1412 of jetting channels 302 based on active gating signal 1112 to jet the second print fluid 1402 (step 2906). For example, driver circuit 910 may select a gating signal for each of the jetting channels 302 of the second subset 1412 based on the print data for those jetting channels 302. When the selected gating signal is active gating signal 1112 and drive waveform 903 is configured as shown in FIG. 31, driver circuit 910 will apply a jetting pulse 3002 from drive waveform 903 to that jetting channel 302. When the selected gating signal is an inactive gating signal 1110, driver circuit 910 will not apply the drive waveform 903 to that jetting channel 302.

One technical benefit of the jetting control system 900 described above is that driver circuit 910 may be used for multiple print fluids in a printhead 104. And, the jetting channels 302 for the different print fluids will jet concurrently or substantially concurrently because the same jetting pulse 3002 is applied to the jetting channels 302. Yet, the non-jetting pulse 3001 in the drive waveform 903 allows for different jetting characteristics (e.g., droplet velocity, mass, etc.) from jetting channels 302 of different print fluids even though a common jetting pulse 3002 is applied to jetting channels 302.

Figure 32:
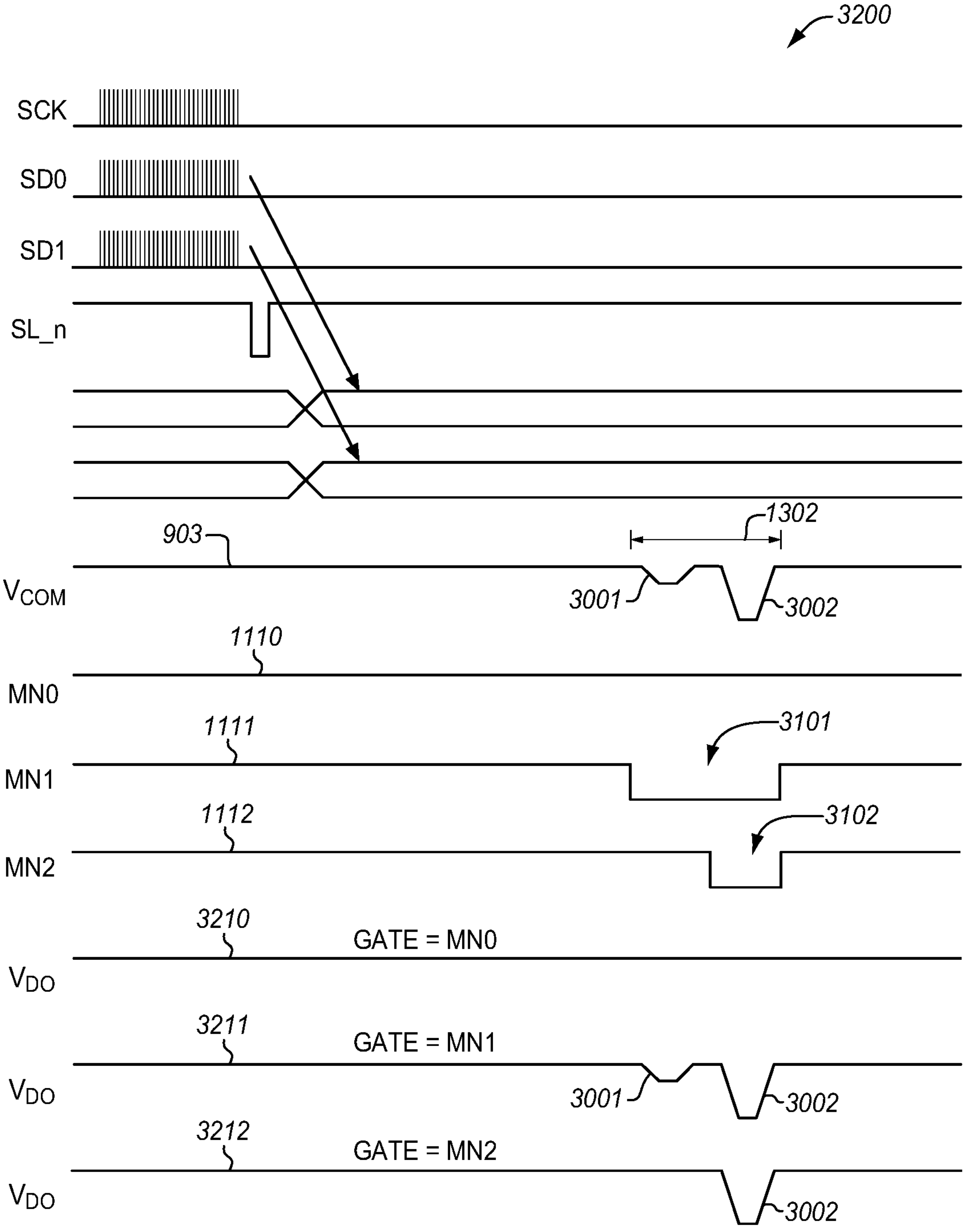
FIG. 32 is a signal diagram for a driver circuit jetting multiple print fluids in an illustrative embodiment.

The following provides a further description of how driver circuit 910 selectively applies non-jetting pulses and jetting pulses to jetting channels 302 in one embodiment. FIG. 32 is a signal diagram 3200 for driver circuit 910 jetting multiple print fluids in an illustrative embodiment. Signal diagram 3200 shows drive waveform 903 (i.e., $V_{com}$) that includes a series or train of pulses for a jetting period 1302. Non-jetting pulse 3001 leads jetting pulse 3002 in the jetting period 1302 of drive waveform 903. Signal diagram 3200 also shows gating signals 1110-1112. Gating signal 1110 (MN0) is an inactive gating signal that does not allow a pulse on drive waveform 903 to pass to an actuator 316 of a jetting channel 302. Gating signal 1111 (MN1) is an active gating signal designated for jetting the first print fluid 1401, and includes an active time window 3101 that corresponds with the non-jetting pulse 3001 and the jetting pulse 3002. Gating signal 1112 (MN2) is an active gating signal designated for jetting the second print fluid 1402, and includes an active time window 3102 that corresponds with the jetting pulse 3002. Other gating signals, such as MN3, may be ignored in this embodiment.

Figure 33:
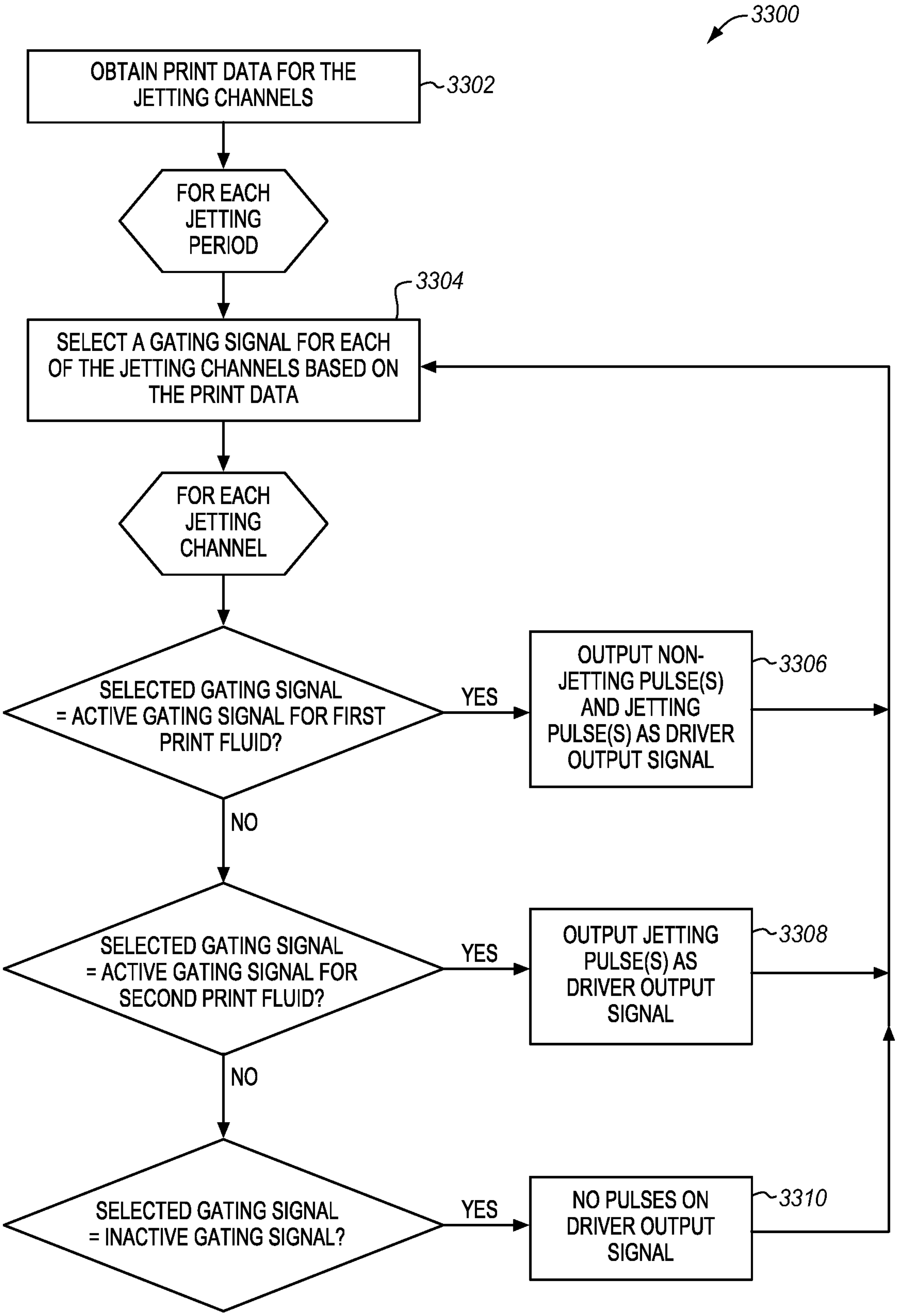
FIG. 33 is a flow chart illustrating a method of selectively applying pulses from a drive waveform to jetting channels in an illustrative embodiment.

FIG. 33 is a flow chart illustrating a method 3300 of selectively applying pulses from drive waveform 903 to jetting channels 302 in an illustrative embodiment. For a jetting period 1302 (as shown in FIG. 32), driver circuit 910 obtains the print data for the jetting channels 302 (step 3302), such as for the first subset 1411 of jetting channels 302 and the second subset 1412 of jetting channels 302. For each jetting period 1302, driver circuit 910 will use the print data to select gating signals for the individual jetting channels 302. For the present jetting period 1302, driver circuit 910 (through selector 1120 in FIG. 22) selects a gating signal 1110-1112 for each of the jetting channels 302 based on the print data (step 3304). In the above example, gating signal 1110 is configured as an inactive gating signal (e.g., set to "HIGH"), gating signal 1111 is configured as an active gating signal designated for jetting the first print fluid 1401, and gating signal 1112 is configured as an active gating signal designated for jetting the second print fluid 1402. Thus, selector 1120 selects either inactive gating signal 1110 or active gating signal 1111 for the first subset 1411 of jetting channels 302 configured to jet the first print fluid 1401, and selects either inactive gating signal 1110 or active gating signal 1112 for the second subset 1412 of jetting channels 302 configured to jet the second print fluid 1402.

For each jetting channel 302 controlled by driver circuit 910, it may perform the following. When the selected gating signal 1110-1112 for a jetting channel 302 comprises the active gating signal 1111 designated for jetting the first print fluid 1401, driver circuit 910 outputs non-jetting pulse 3001 (or multiple instances of non-jetting pulse 3001) and jetting pulse 3002 (or multiple instances of jetting pulse 3002) from drive waveform 903 as the driver output signal ($V_{DO}$) to the actuator 316 of the jetting channel 302 (step 3306). As shown in FIG. 32, the active gating signal 1111 (MN1) for the first print fluid 1401 is "LOW" for a time window 3101 that corresponds with a non-jetting pulse 3001 and a jetting pulse 3002 of drive waveform 903. Thus, a switching element 1106 for this jetting channel 302 will be "ON" when the active gating signal 1111 is low, and the driver output signal 3211 will include non-jetting pulse 3001 and jetting pulse 3002.

In FIG. 33, when the selected gating signal 1110-1112 for a jetting channel 302 comprises an active gating signal 1112 for the second print fluid 1402, driver circuit 910 outputs jetting pulse 3002 (or multiple instances of jetting pulse 3002) from drive waveform 903 as the driver output signal ($V_{DO}$) to the actuator 316 of the jetting channel 302 (step 3308), and blocks non-jetting pulse 3001. As shown in FIG.

32, the active gating signal 1112 (MN2) for the second print fluid 1402 is "LOW" for a time window 3102 that corresponds with a jetting pulse 3002 of drive waveform 903. Thus, a switching element 1106 for this jetting channel 302 will be "ON" when the active gating signal 1112 is low, and the driver output signal 3212 will include jetting pulse 3002 but will not include non-jetting pulse 3001.

In FIG. 33, when the selected gating signal 1110-1112 for a jetting channel 302 comprises the inactive gating signal 1110, driver circuit 910 outputs no pulses on the driver output signal ($V_{DO}$) to the actuator 316 of the jetting channel 302 (step 3310). As shown in FIG. 32, the inactive gating signal 1110 (MN0) is set at a constant voltage. Thus, a switching element 1106 for this jetting channel 302 will be "OFF", and the driver output signal 3210 will include no pulses from drive waveform 903.

Figure 34:
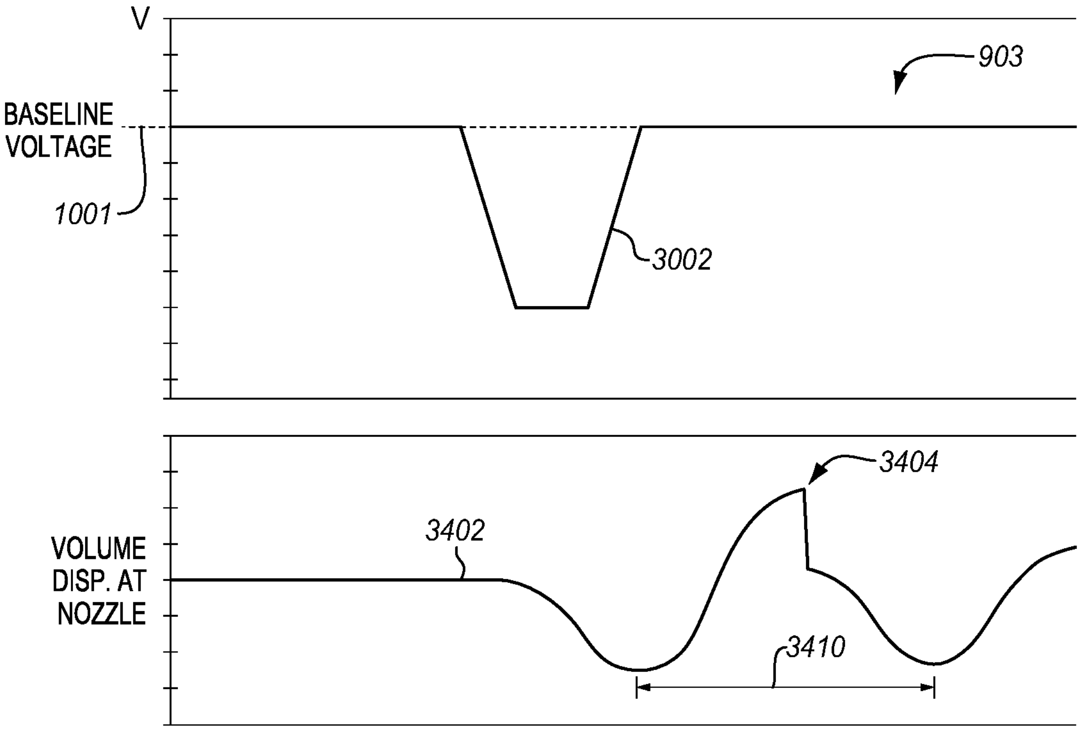
FIG. 34 illustrates the response of a jetting channel to a jetting pulse.

When a non-jetting pulse 3001 is applied to a jetting channel 302 preceding a jetting pulse 3002, the jetting characteristics can be altered. To illustrate this, FIG. 34 illustrates the response of a jetting channel 302 to a jetting pulse 3002. In this example, drive waveform 903 includes a jetting pulse 3002 that is applied to an actuator 316 of a jetting channel 302. Line 3402 represents volume displacement of a print fluid at a nozzle 314 of the jetting channel 302 in response to the jetting pulse 3002. When the actuator 316 displaces in response to jetting pulse 3002, pressure waves are created within the pressure chamber 312 that resonate or absorb at a characteristic frequency. This characteristic frequency is determined by the geometry of the pressure chamber 312 (and other structures of a jetting channel 302) and their associated fluidic properties, and is referred to as the resonant frequency or Helmholtz frequency of a jetting channel 302. The pressure waves within the pressure chamber 312 cause the print fluid to move at the nozzle 314. When the pressure or jetting energy is sufficient from the jetting pulse 3002, the print fluid will be ejected from the nozzle 314 as indicated at volume displacement peak 3404. FIG. 34 also illustrates the resonant cycle 3410 corresponding with the resonant frequency of the jetting channel 302 in response to jetting pulse 3002.

Figure 35:
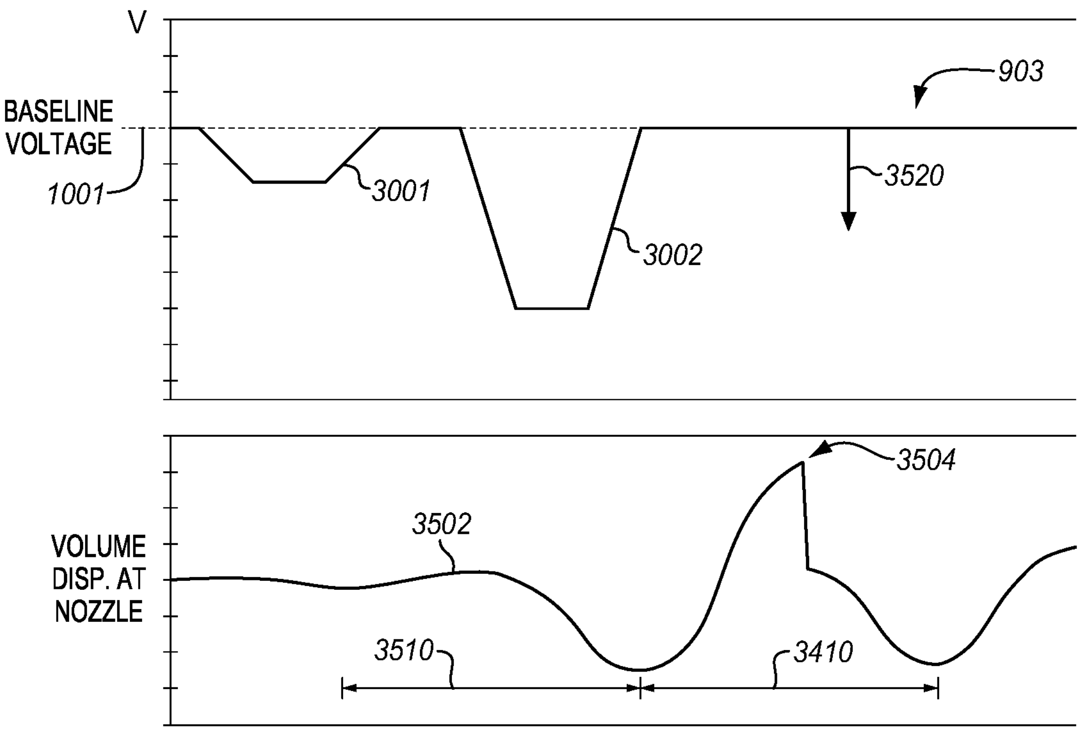
FIG. 35 illustrates the response of a jetting channel to a non-jetting pulse and a jetting pulse in an illustrative embodiment.

FIG. 35 illustrates the response of a jetting channel 302 to a non-jetting pulse 3001 and a jetting pulse 3002 in an illustrative embodiment. In this embodiment, drive waveform 903 includes a non-jetting pulse 3001 and jetting pulse 3002 that are applied to an actuator 316 of a jetting channel 302. Line 3502 represents volume displacement of a print fluid at a nozzle 314 of the jetting channel 302 in response to the non-jetting pulse 3001 and the jetting pulse 3002. Non-jetting pulse 3001 and jetting pulse 3002 are in the same voltage direction 3520. Non-jetting pulse 3001 and jetting pulse 3002 each change voltage levels by transitioning from a baseline voltage 1001 in a positive or negative voltage direction. In this embodiment, non-jetting pulse 3001 and jetting pulse 3002 both transition from the baseline voltage 1001 in a negative voltage direction (but may be in the positive voltage direction in other embodiments).

Non-jetting pulse 3001 also has in-phase timing with the resonant frequency of the jetting channel 302. In other words, the timing of non-jetting pulse 3001 on drive waveform 903 with respect to jetting pulse 3002 is such that pressure waves created by displacement of an actuator 316 in response to the non-jetting pulse 3001 are in-phase with pressure waves created by displacement of the actuator 316 in response to the jetting pulse 3002. FIG. 35 illustrates the non-jetting cycle 3510 of pressure waves within the jetting channel 302 in response to non-jetting pulse 3001. As is evident, pressure waves created by non-jetting pulse 3001 are in-phase with pressure waves created by jetting pulse 3002. A non-jetting pulse 3001 that is in-phase increases the jetting energy at the jetting channel 302, and increases droplet mass and velocity. Thus, the volume displacement peak 3504 is higher than when a jetting pulse 3002 is applied alone. In FIG. 32, when the active gating signal 1111 (MN1) for the first print fluid 1401 is selected, the driver output signal 3211 will include non-jetting pulse 3001 and jetting pulse 3002. When the active gating signal 1112 (MN2) for the second print fluid 1402 is selected, and the driver output signal 3212 will include jetting pulse 3002 but will not include non-jetting pulse 3001. Because the non-jetting pulse 3001 has the same voltage direction as the jetting pulse 3002 and is in-phase, the jetting energy at a jetting channel 302 for the first print fluid 1401 will be higher than the jetting energy at a jetting channel 302 for the second print fluid 1402.

Figure 36:
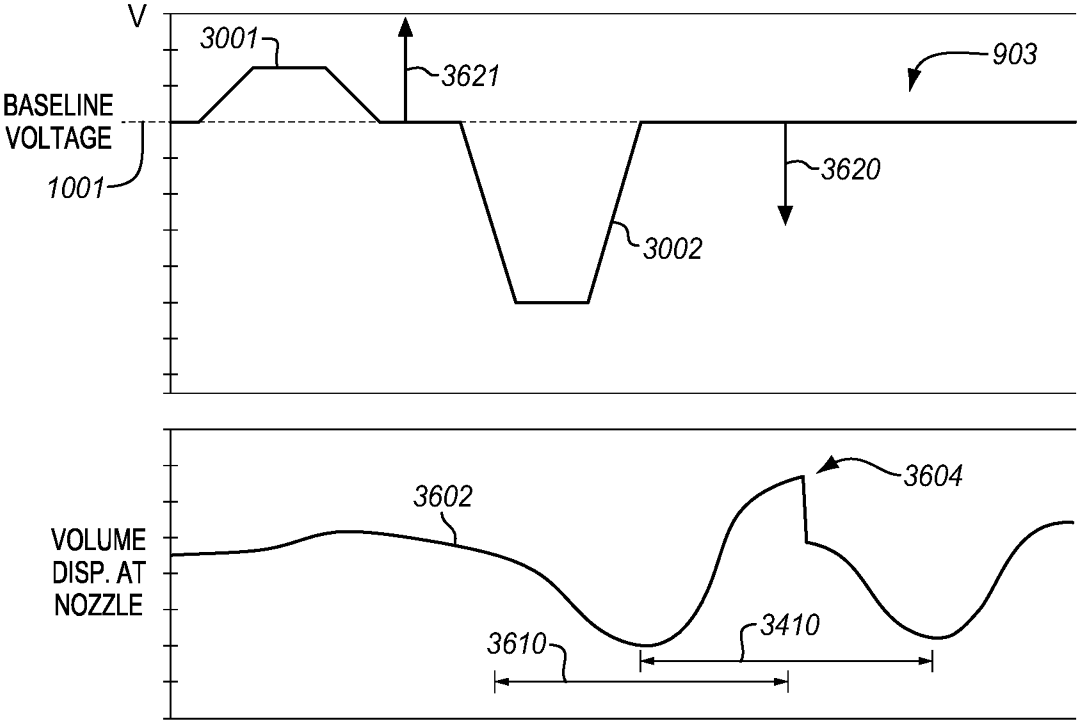
FIG. 36 illustrates the response of a jetting channel to a non-jetting pulse and a jetting pulse in an illustrative embodiment.

FIG. 36 illustrates the response of a jetting channel 302 to a non-jetting pulse 3001 and a jetting pulse 3002 in an illustrative embodiment. Line 3602 represents volume displacement of a print fluid at a nozzle 314 of the jetting channel 302 in response to the non-jetting pulse 3001 and the jetting pulse 3002. In this embodiment, non-jetting pulse 3001 and jetting pulse 3002 are in opposite voltage directions 3620-3621. For example, non-jetting pulse 3001 transitions from the baseline voltage 1001 in a positive voltage direction, and jetting pulse 3002 transitions from the baseline voltage 1001 in a negative voltage direction. Non-jetting pulse 3001 has out-of-phase timing with the resonant frequency of the jetting channel 302. In other words, the timing of non-jetting pulse 3001 on drive waveform 903 with respect to jetting pulse 3002 is such that pressure waves created by displacement of an actuator 316 in response to the non-jetting pulse 3001 are out-of-phase with pressure waves created by displacement of the actuator 316 in response to the jetting pulse 3002. FIG. 36 illustrates the non-jetting cycle 3610 of pressure waves within the jetting channel 302 in response to non-jetting pulse 3001. As is evident, pressure waves created by non-jetting pulse 3001 are out-of-phase with pressure waves created by jetting pulse 3002, such as by 180 degrees. A non-jetting pulse 3001 that is in the opposite voltage direction and is out-of-phase decreases the jetting energy at the jetting channel 302, and decreases droplet mass and velocity. Thus, the volume displacement peak 3604 is lower than when a jetting pulse 3002 is applied alone.

Figure 37:
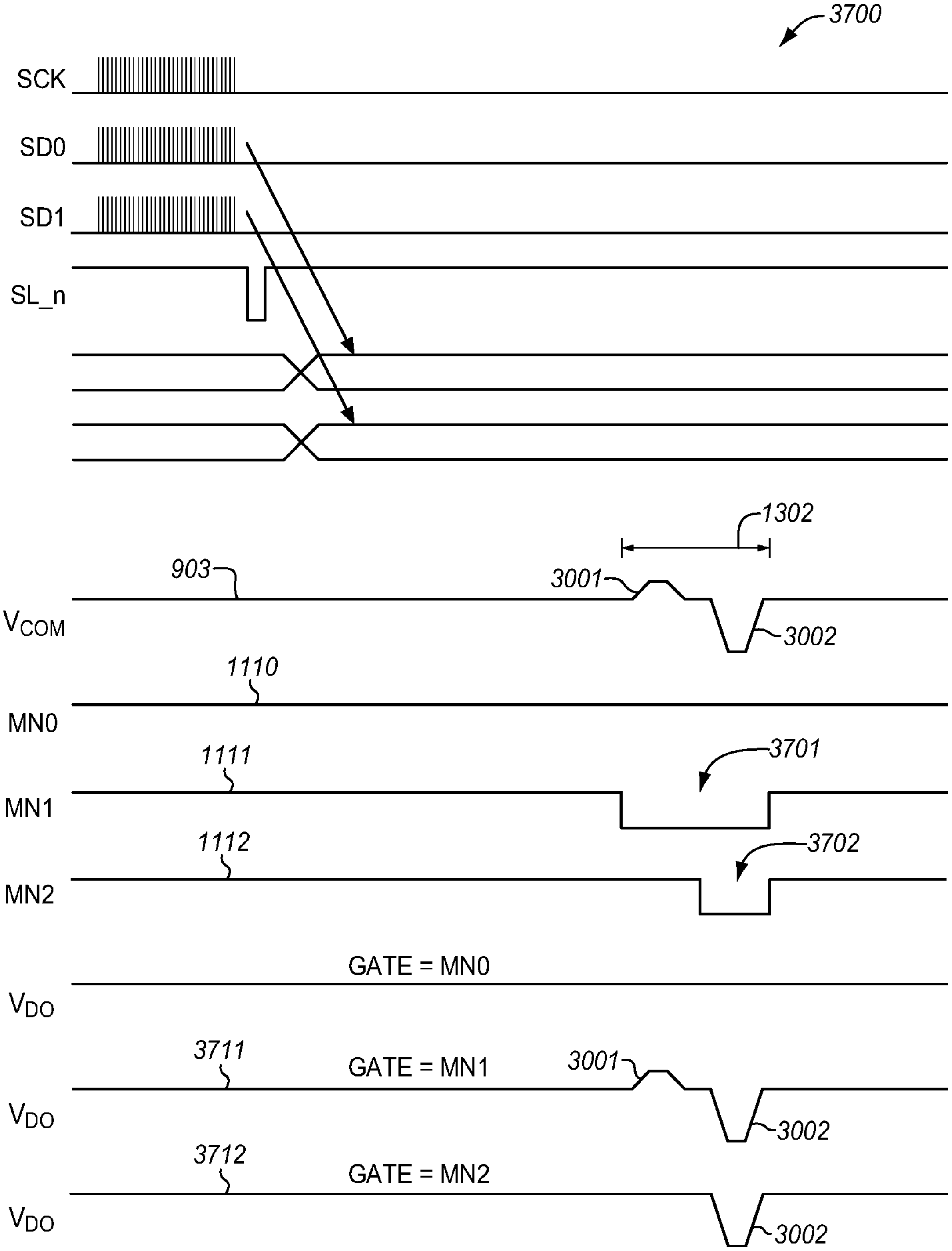
FIG. 37 is a signal diagram for a driver circuit jetting multiple print fluids in an illustrative embodiment.

FIG. 37 is a signal diagram 3700 for driver circuit 910 jetting multiple print fluids in an illustrative embodiment. Signal diagram 3700 shows drive waveform 903 (i.e., $V_{com}$) that includes a series or train of pulses for a jetting period 1302. Non-jetting pulse 3001 leads jetting pulse 3002 in the jetting period 1302 of drive waveform 903. Signal diagram 3700 also shows gating signals 1110-1112. Gating signal 1110 (MN0) is an inactive gating signal that does not allow a pulse on drive waveform 903 to pass to an actuator 316 of a jetting channel 302. Gating signal 1111 (MN1) is an active gating signal designated for jetting the first print fluid 1401, and includes an active time window 3701 that corresponds with the non-jetting pulse 3001 and the jetting pulse 3002. Gating signal 1112 (MN2) is an active gating signal designated for jetting the second print fluid 1402, and includes an active time window 3702 that corresponds with the jetting pulse 3002. Other gating signals, such as MN3, may be ignored in this embodiment. When the active gating signal 1111 (MN1) for the first print fluid 1401 is selected, the driver output signal 3711 will include non-jetting pulse 3001 and jetting pulse 3002. When the active gating signal 1112

(MN2) for the second print fluid 1402 is selected, and the driver output signal 3712 will include jetting pulse 3002 but will not include non-jetting pulse 3001. Because the non-jetting pulse 3001 has an opposite voltage direction than the jetting pulse 3002 and is out-of-phase, the jetting energy at a jetting channel 302 for the first print fluid 1401 will be lower than the jetting energy at a jetting channel 302 for the second print fluid 1402.

Figure 38:
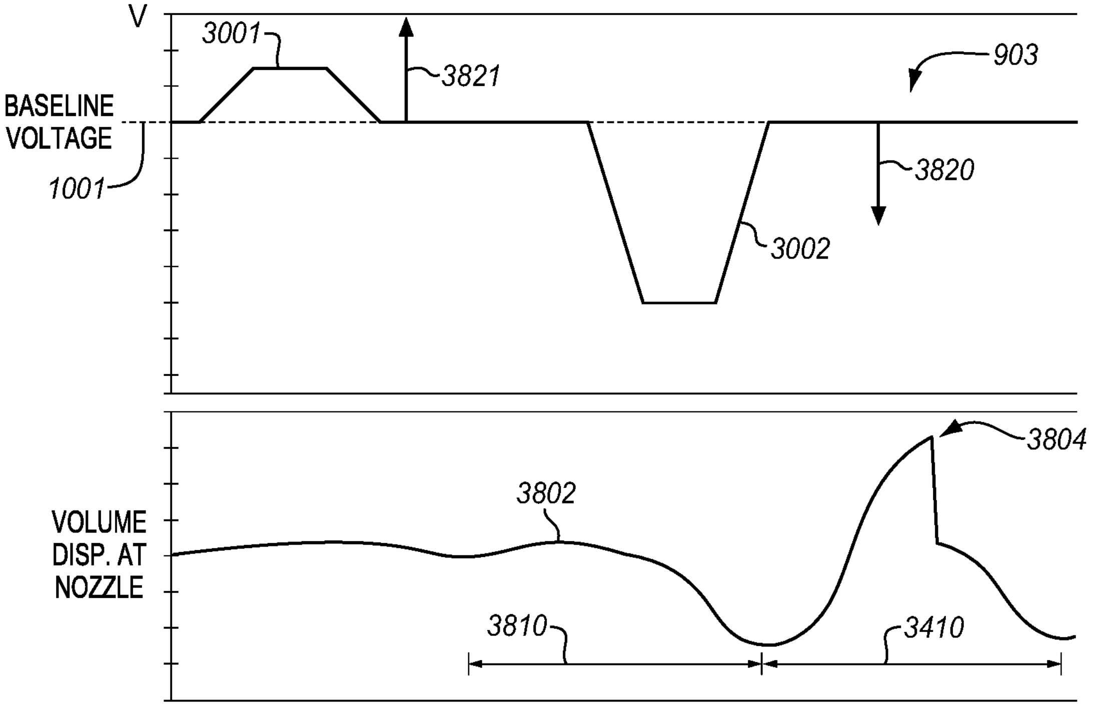
FIG. 38 illustrates the response of a jetting channel to a non-jetting pulse and a jetting pulse in an illustrative embodiment.

FIG. 38 illustrates the response of a jetting channel 302 to a non-jetting pulse 3001 and a jetting pulse 3002 in an illustrative embodiment. Line 3802 represents volume displacement of a print fluid at a nozzle 314 of the jetting channel 302 in response to the non-jetting pulse 3001 and the jetting pulse 3002. In this embodiment, non-jetting pulse 3001 and jetting pulse 3002 are in opposite voltage directions 3820-3821. Non-jetting pulse 3001 has in-phase timing with the resonant frequency of the jetting channel 302. FIG. 38 illustrates the non-jetting cycle 3810 of pressure waves within the jetting channel 302 in response to non-jetting pulse 3001. As is evident, pressure waves created by non-jetting pulse 3001 are in-phase with pressure waves created by jetting pulse 3002. A non-jetting pulse 3001 that is in the opposite voltage direction and in-phase increases the jetting energy at the jetting channel 302, and increases droplet mass and velocity. Thus, the volume displacement peak 3804 is higher than when a jetting pulse 3002 is applied alone.

Figure 39:
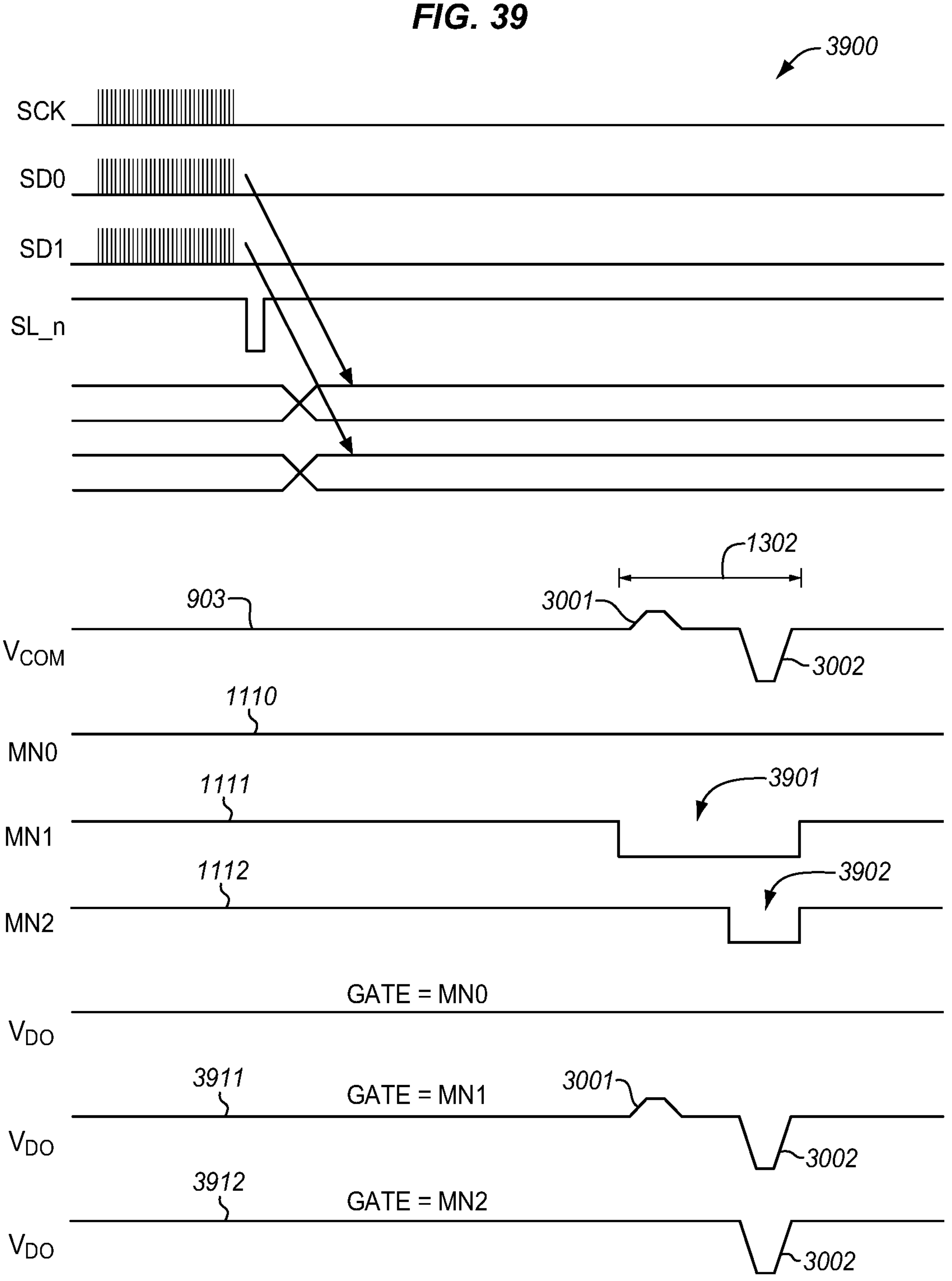
FIG. 39 is a signal diagram for a driver circuit jetting multiple print fluids in an illustrative embodiment.

FIG. 39 is a signal diagram 3900 for driver circuit 910 jetting multiple print fluids in an illustrative embodiment. Signal diagram 3900 shows drive waveform 903 (i.e., $V_{com}$) that includes a series or train of pulses for a jetting period 1302. Non-jetting pulse 3001 leads jetting pulse 3002 in the jetting period 1302 of drive waveform 903. Signal diagram 3900 also shows gating signals 1110-1112. Gating signal 1110 (MN0) is an inactive gating signal that does not allow a pulse on drive waveform 903 to pass to an actuator 316 of a jetting channel 302. Gating signal 1111 (MN1) is an active gating signal designated for jetting the first print fluid 1401, and includes an active time window 3901 that corresponds with the non-jetting pulse 3001 and the jetting pulse 3002. Gating signal 1112 (MN2) is an active gating signal designated for jetting the second print fluid 1402, and includes an active time window 3902 that corresponds with the jetting pulse 3002. Other gating signals, such as MN3, may be ignored in this embodiment. When the active gating signal 1111 (MN1) for the first print fluid 1401 is selected, the driver output signal 3911 will include non-jetting pulse 3001 and jetting pulse 3002. When the active gating signal 1112 (MN2) for the second print fluid 1402 is selected, and the driver output signal 3912 will include jetting pulse 3002 but will not include non-jetting pulse 3001. Because the non-jetting pulse 3001 has an opposite voltage direction than the jetting pulse 3002 and is in-phase, the jetting energy at a jetting channel 302 for the first print fluid 1401 will be higher than the jetting energy at a jetting channel 302 for the second print fluid 1402.

Figure 40:
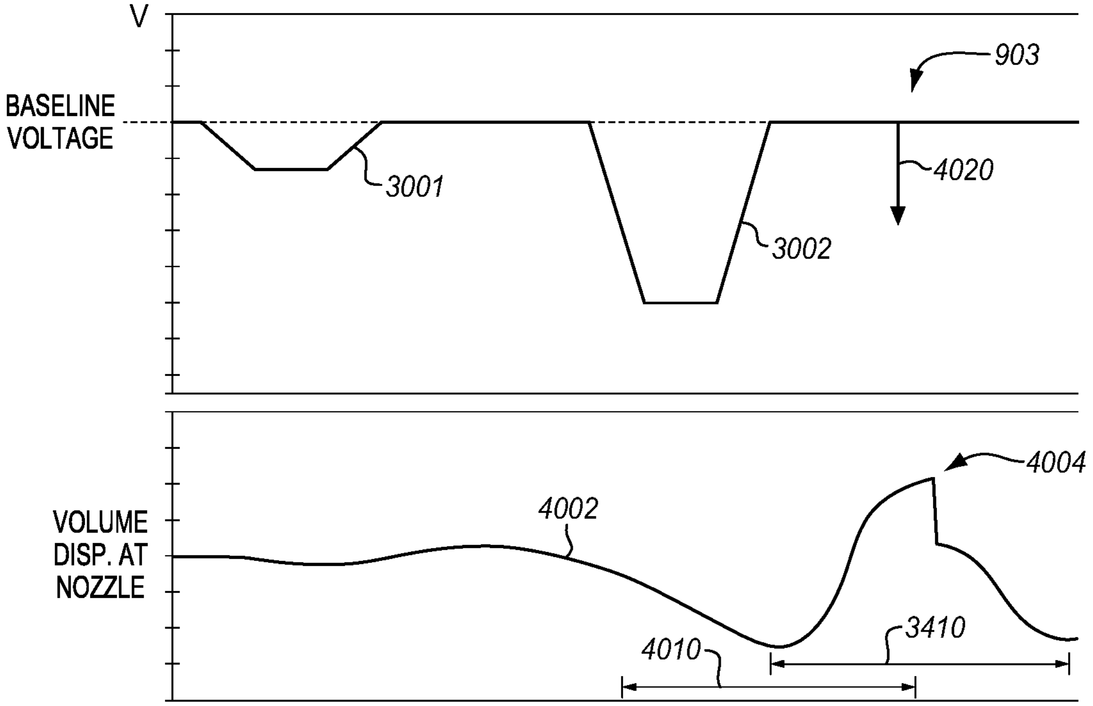
FIG. 40 illustrates the response of a jetting channel to a non-jetting pulse and a jetting pulse in an illustrative embodiment.

FIG. 40 illustrates the response of a jetting channel 302 to a non-jetting pulse 3001 and a jetting pulse 3002 in an illustrative embodiment. Line 4002 represents volume displacement of a print fluid at a nozzle 314 of the jetting channel in response to the non-jetting pulse 3001 and the jetting pulse 3002. In this embodiment, non-jetting pulse 3001 and jetting pulse 3002 are in the same voltage direction 4020. Non-jetting pulse 3001 has out-of-phase timing with the resonant frequency of the jetting channel 302. FIG. 40 illustrates the non-jetting cycle 4010 of pressure waves within the jetting channel 302 in response to non-jetting pulse 3001. As is evident, pressure waves created by non-jetting pulse 3001 are out-of-phase with pressure waves created by jetting pulse 3002, such as by 180 degrees. A non-jetting pulse 3001 in the same voltage direction and out-of-phase decreases the jetting energy at the jetting channel 302, and decreases droplet mass and velocity. Thus, the volume displacement peak 4004 is lower than when a jetting pulse 3002 is applied alone.

Figure 41:
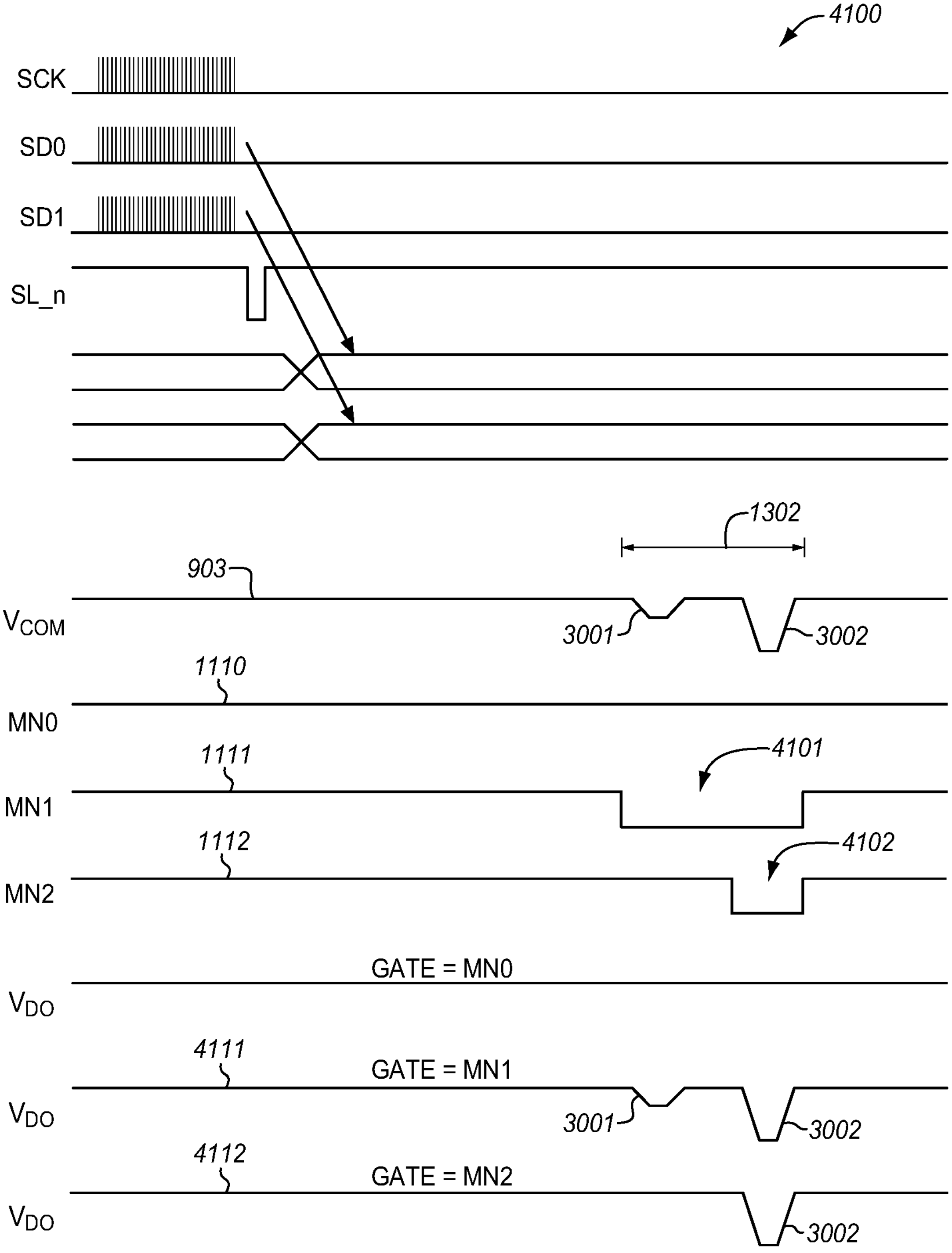
FIG. 41 is a signal diagram for a driver circuit jetting multiple print fluids in an illustrative embodiment.

FIG. 41 is a signal diagram 4100 for driver circuit 910 jetting multiple print fluids in an illustrative embodiment. Signal diagram 4100 shows drive waveform 903 (i.e., $V_{com}$) that includes a series or train of pulses for a jetting period 1302. Non-jetting pulse 3001 leads jetting pulse 3002 in the jetting period 1302 of drive waveform 903. Signal diagram 4100 also shows gating signals 1110-1112. Gating signal 1110 (MN0) is an inactive gating signal that does not allow a pulse on drive waveform 903 to pass to an actuator 316 of a jetting channel 302. Gating signal 1111 (MN1) is an active gating signal designated for jetting the first print fluid 1401, and includes an active time window 4101 that corresponds with the non-jetting pulse 3001 and the jetting pulse 3002. Gating signal 1112 (MN2) is an active gating signal designated for jetting the second print fluid 1402, and includes an active time window 4102 that corresponds with the jetting pulse 3002. Other gating signals, such as MN3, may be ignored in this embodiment. When the active gating signal 1111 (MN1) for the first print fluid 1401 is selected, the driver output signal 4111 will include non-jetting pulse 3001 and jetting pulse 3002. When the active gating signal 1112 (MN2) for the second print fluid 1402 is selected, and the driver output signal 4112 will include jetting pulse 3002 but will not include non-jetting pulse 3001. Because the non-jetting pulse 3001 has the same voltage direction as the jetting pulse 3002 and is out-of-phase, the jetting energy at a jetting channel 302 for the first print fluid 1401 will be less than the jetting energy at a jetting channel 302 for the second print fluid 1402.

The above embodiments described a two-bit driver circuit 910. However, driver circuit 910 may comprise a three-bit driver, a four-bit driver, etc., in other embodiments. In a three-bit driver, for example, there may be eight gating signals. When a driver circuit 910 drives jetting channels 302 for two different print fluids and there are eight gating signals, more than one gating signal may be designated for jetting each of the print fluids. Thus, different greyscale levels may be produced for each of the print fluids in a similar manner as described in FIG. 13.

Figure 42:
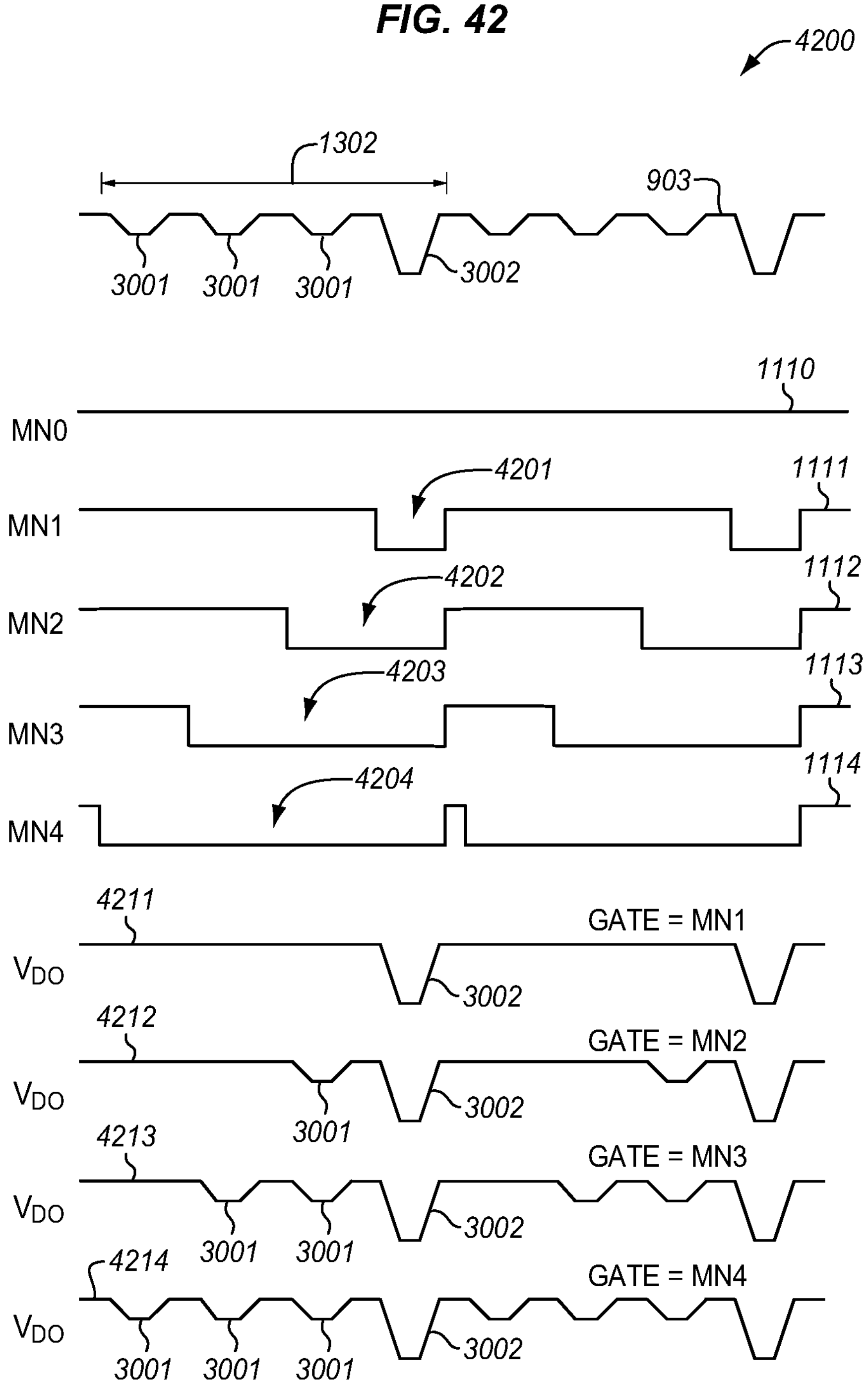
FIG. 42 is a signal diagram for a driver circuit jetting multiple print fluids in an illustrative embodiment.

Further, when a three-bit driver is implemented, driver circuit 910 may drive jetting channels 302 for four different print fluids 2601-2604 in two rows 2611-2612 of nozzles as shown in FIG. 26, in a single row of nozzles, or more rows of nozzles. FIG. 42 is a signal diagram 4200 for driver circuit 910 jetting multiple print fluids in an illustrative embodiment. Signal diagram 4200 shows drive waveform 903 (i.e., $V_{com}$) that includes a series or train of non-jetting pulses 3001 and jetting pulses 3002 for a jetting period 1302. In this embodiment, drive waveform 903 includes three non-jetting pulses 3001 followed by a jetting pulse 3002. It is assumed for this embodiment that each of the non-jetting pulses 3001 are in-phase. Signal diagram 4200 also shows gating signals 1110-1114. Gating signal 1110 (MN0) is an inactive gating signal that does not allow a pulse on drive waveform 903 to pass to an actuator 316 of a jetting channel 302. Gating signal 1111 (MN1) is an active gating signal designated for jetting the first print fluid 2601, and includes active time windows 4201 that correspond with the jetting pulse 3002. Gating signal 1112 (MN2) is an active gating signal designated for jetting the second print fluid 2602, and includes active time windows 4202 that correspond with one non-jetting pulse 3001 and the jetting pulse 3002. Gating signal 1113 (MN3) is an active gating signal designated for jetting the third print fluid 2603, and includes active time windows 4203 that correspond with two non-jetting pulses 3001 and the jetting pulse 3002. Gating signal 1114 (MN4) is an active gating signal designated for jetting the fourth print fluid 2604, and includes active time windows 4204 that correspond with three non-jetting pulses 3001 and the jetting pulse 3002. Other gating signals, such as MN5-MN7, may be ignored in this embodiment.

When the selected gating signal 1110-1114 for a jetting channel 302 comprises the active gating signal 1111 designated for jetting the first print fluid 2601, driver circuit 910 outputs jetting pulse 3001 from drive waveform 903 as the driver output signal 4211 ($V_{DO}$) to the actuator 316 of the jetting channel 302, and blocks the other pulses. When the selected gating signal 1110-1114 for a jetting channel 302 comprises an active gating signal 1112 for the second print fluid 2602, driver circuit 910 outputs one non-jetting pulse 3001 and the jetting pulse 3002 from drive waveform 903 as the driver output signal 4212 ($V_{DO}$) to the actuator 316 of the jetting channel 302, and blocks other pulses. The jetting energy at the jetting channel 302 will be increased compared to driver output signal 4211 due to non jetting pulse 3001. When the selected gating signal 1110-1114 for a jetting channel 302 comprises an active gating signal 1113 for the third print fluid 2603, driver circuit 910 outputs two non-jetting pulses 3001 and the jetting pulse 3002 from drive waveform 903 as the driver output signal 4213 ($V_{DO}$) to the actuator 316 of the jetting channel 302, and blocks other pulses. The jetting energy at the jetting channel 302 will be increased compared to driver output signal 4212 due to the two non-jetting pulses 3001. When the selected gating signal 1110-1114 for a jetting channel 302 comprises an active gating signal 1114 for the fourth print fluid 2604, driver circuit 910 outputs three non-jetting pulses 3001 and the jetting pulse 3002 from drive waveform 903 as the driver output signal 4214 ($V_{DO}$) to the actuator 316 of the jetting channel 302. The jetting energy at the jetting channel 302 will be increased compared to driver output signal 4213 due to the three non-jetting pulses 3001.

Figure 43:
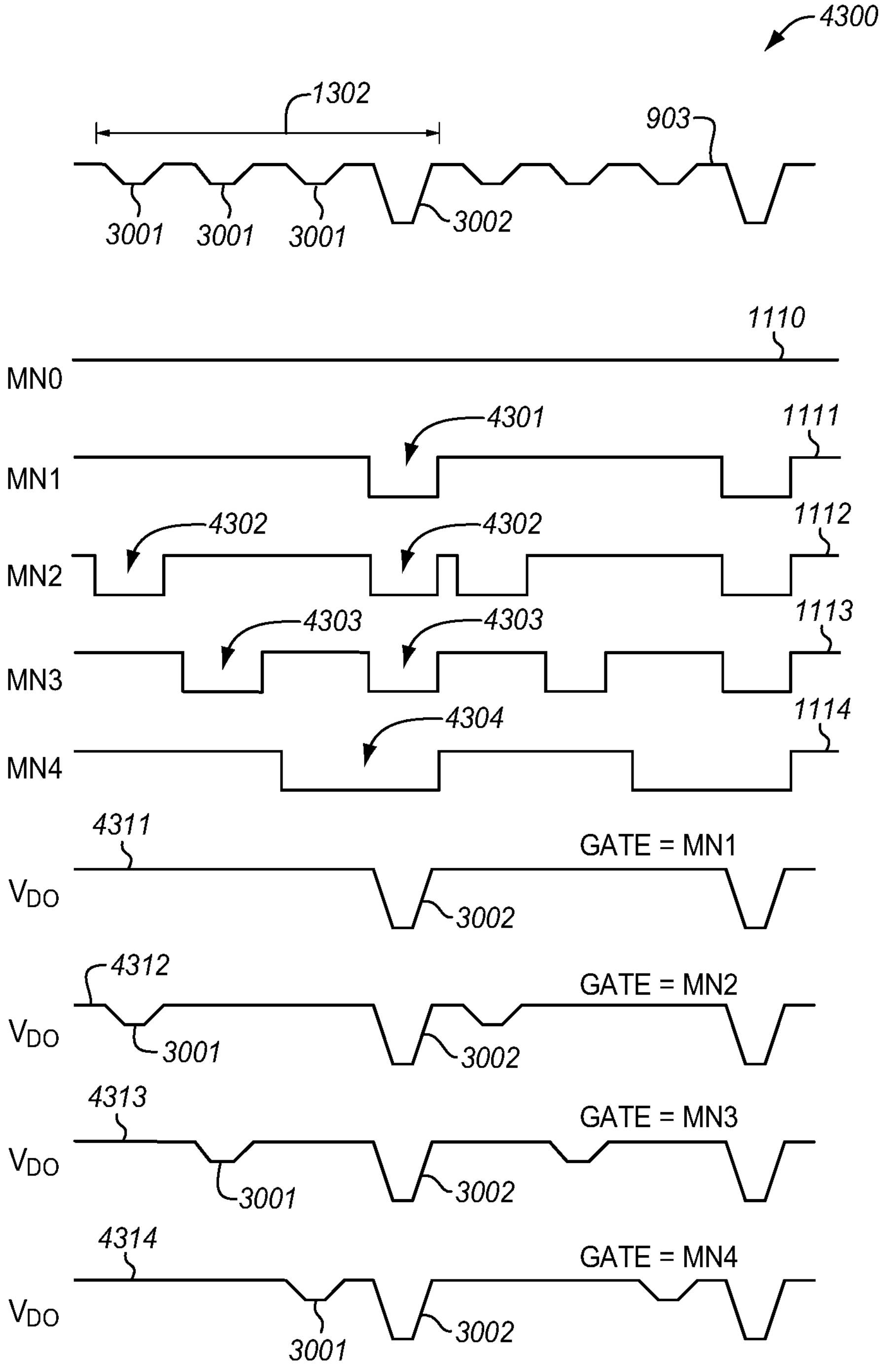
FIG. 43 is a signal diagram for a driver circuit jetting multiple print fluids in an illustrative embodiment.

FIG. 43 is a signal diagram 4300 for driver circuit 910 jetting multiple print fluids in an illustrative embodiment. Signal diagram 4300 shows drive waveform 903 (i.e., $V_{com}$) that includes train of non-jetting pulses 3001 and jetting pulses 3002 for a jetting period 1302. In this embodiment, drive waveform 903 includes a series of three non-jetting pulses 3001 followed by a jetting pulse 3002. It is assumed for this embodiment that each of the non jetting pulses 3001 are in-phase. Signal diagram 4300 also shows gating signals 1110-1114. Gating signal 1110 (MN0) is an inactive gating signal that does not allow a pulse on drive waveform 903 to pass to an actuator 316 of a jetting channel 302. Gating signal 1111 (MN1) is an active gating signal designated for jetting the first print fluid 2601, and includes active time windows 4301 that correspond with the jetting pulse 3002. Gating signal 1112 (MN2) is an active gating signal designated for jetting the second print fluid 2602, and includes active time windows 4302 that correspond with the first non-jetting pulse 3001 in the series and the jetting pulse 3002. Gating signal 1113 (MN3) is an active gating signal designated for jetting the third print fluid 2603, and includes active time windows 4303 that correspond with the second non-jetting pulse 3001 in the series and the jetting pulse 3002. Gating signal 1114 (MN4) is an active gating signal designated for jetting the fourth print fluid 2604, and includes active time windows 4304 that correspond with the third non-jetting pulse 3001 in the series (i.e., the non-jetting pulse 3001 preceding the jetting pulse 3002) and the jetting pulse 3002. Other gating signals, such as MN5-MN7, may be ignored in this embodiment.

When the selected gating signal 1110-1114 for a jetting channel 302 comprises the active gating signal 1111 designated for jetting the first print fluid 2601, driver circuit 910 outputs jetting pulse 3002 from drive waveform 903 as the driver output signal 4311 ($V_{DO}$) to the actuator 316 of the jetting channel 302, and blocks the other pulses. When the selected gating signal 1110-1114 for a jetting channel 302 comprises an active gating signal 1112 for the second print fluid 2602, driver circuit 910 outputs the first non-jetting pulse 3001 in the series and the jetting pulse 3002 from drive waveform 903 as the driver output signal 4312 ($V_{DO}$) to the actuator 316 of the jetting channel 302, and blocks other pulses. The jetting energy at the jetting channel 302 will be increased compared to driver output signal 4311. When the selected gating signal 1110-1114 for a jetting channel 302 comprises an active gating signal 1113 for the third print fluid 2603, driver circuit 910 outputs the second non-jetting pulse 3001 in the series and the jetting pulse 3002 from drive waveform 903 as the driver output signal 4313 ($V_{DO}$) to the actuator 316 of the jetting channel 302, and blocks other pulses. The energy caused by a non-jetting pulse 3001 will dissipate over time. Thus, the closer the non-jetting pulse 3001 to the jetting pulse 3002, the more the energy will be increased. The jetting energy therefore is increased in driver output signal 4313 compared to driver output signal 4312. When the selected gating signal 1110-1114 for a jetting channel 302 comprises an active gating signal 1114 for the fourth print fluid 2604, driver circuit 910 outputs the third non-jetting pulse 3001 in the series and the jetting pulse 3002 from drive waveform 903 as the driver output signal 4314 ($V_{DO}$) to the actuator 316 of the jetting channel 302. The jetting energy at the jetting channel 302 will be increased compared to driver output signal 4313.

Figure 44:
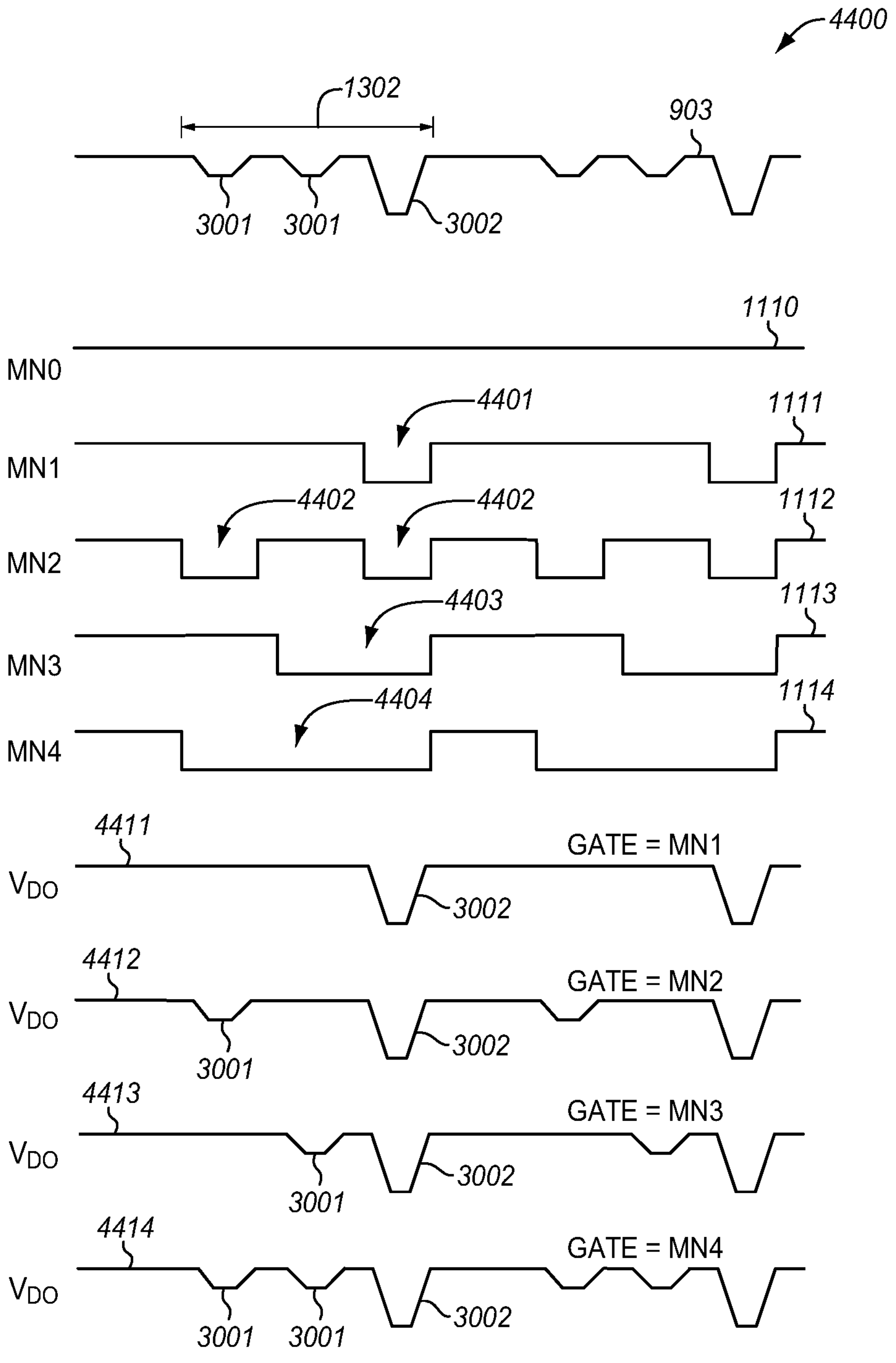
FIG. 44 is a signal diagram for a driver circuit jetting multiple print fluids in an illustrative embodiment.

FIG. 44 is a signal diagram 4400 for driver circuit 910 jetting multiple print fluids in an illustrative embodiment. Signal diagram 4400 shows drive waveform 903 (i.e., $V_{com}$) that includes train of non-jetting pulses 3001 and jetting pulses 3002 for a jetting period 1302. In this embodiment, drive waveform 903 includes a series of two non-jetting pulses 3001 followed by a jetting pulse 3002. It is assumed for this embodiment that each of the non-jetting pulses 3001 are in-phase. Signal diagram 4400 also shows gating signals 1110-1114. Gating signal 1110 (MN0) is an inactive gating signal that does not allow a pulse on drive waveform 903 to pass to an actuator 316 of a jetting channel 302. Gating signal 1111 (MN1) is an active gating signal designated for jetting the first print fluid 2601, and includes active time windows 4401 that correspond with the jetting pulse 3002. Gating signal 1112 (MN2) is an active gating signal designated for jetting the second print fluid 2602, and includes active time windows 4402 that correspond with the first non-jetting pulse 3001 in the series and the jetting pulse 3002. Gating signal 1113 (MN3) is an active gating signal designated for jetting the third print fluid 2603, and includes active time windows 4403 that correspond with the second non-jetting pulse 3001 in the series and the jetting pulse 3002. Gating signal 1114 (MN4) is an active gating signal designated for jetting the fourth print fluid 2604, and includes active time windows 4404 that correspond with both non-jetting pulses 3001 and the jetting pulse 3002. Other gating signals, such as MN5-MN7, may be ignored in this embodiment.

When the selected gating signal 1110-1114 for a jetting channel 302 comprises the active gating signal 1111 designated for jetting the first print fluid 2601, driver circuit 910 outputs jetting pulse 3002 from drive waveform 903 as the driver output signal 4411 ($V_{DO}$) to the actuator 316 of the jetting channel 302, and blocks the other pulses. When the selected gating signal 1110-1114 for a jetting channel 302 comprises an active gating signal 1112 for the second print fluid 2602, driver circuit 910 outputs the first non-jetting pulse 3001 in the series and the jetting pulse 3002 from drive waveform 903 as the driver output signal 4412 ($V_{DO}$) to the actuator 316 of the jetting channel 302, and blocks other pulses. The jetting energy at the jetting channel 302 will be increased compared to driver output signal 4411. When the selected gating signal 1110-1114 for a jetting channel 302 comprises an active gating signal 1113 for the third print fluid 2603, driver circuit 910 outputs the second non-jetting pulse 3001 in the series and the jetting pulse 3002 from drive waveform 903 as the driver output signal 4413 ($V_{DO}$) to the actuator 316 of the jetting channel 302, and blocks other pulses. The jetting energy is increased in driver output signal 4413 compared to driver output signal 4412. When the selected gating signal 1110-1114 for a jetting channel 302 comprises an active gating signal 1114 for the fourth print fluid 2604, driver circuit 910 outputs both non-jetting pulses 3001 and the jetting pulse 3002 from drive waveform 903 as the driver output signal 4414 ($V_{DO}$) to the actuator 316 of the jetting channel 302. The jetting energy at the jetting channel 302 will be increased compared to driver output signal 4413.

When driving jetting channels 302 for eight or more different print fluids, additional driver circuits 910 may be implemented that each drive four of the different print fluids.

Figure 45:
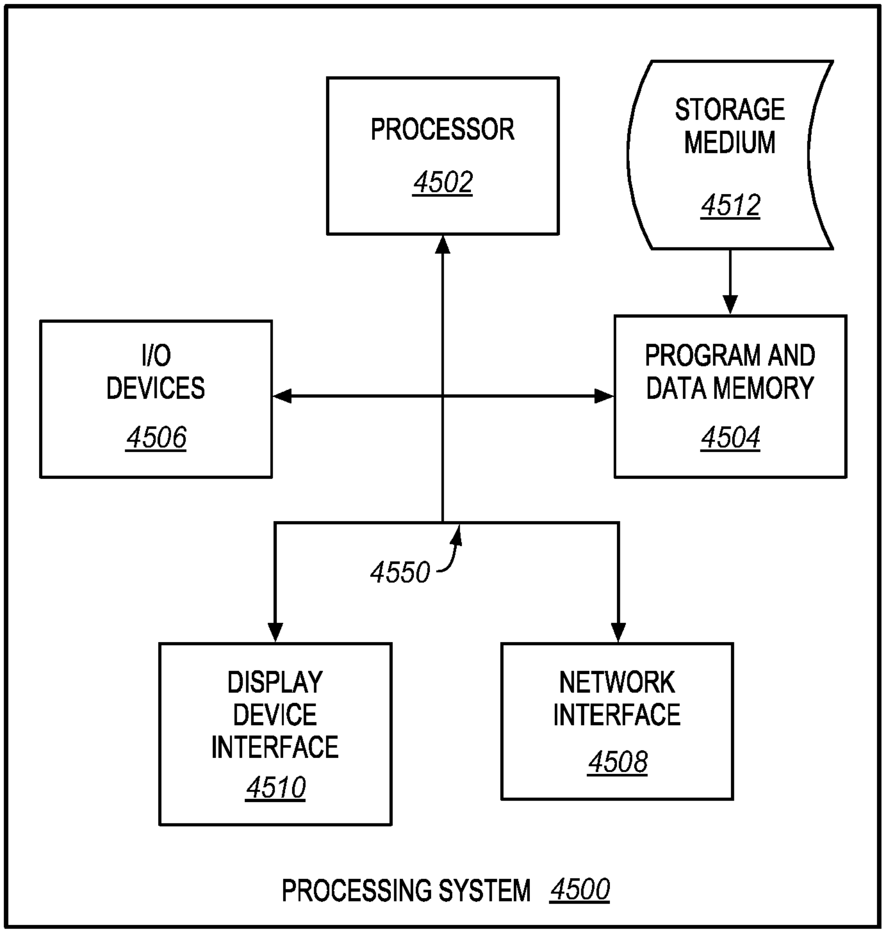
FIG. 45 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of jetting apparatus 100 to perform the various operations disclosed herein. FIG. 45 illustrates a processing system 4500 operable to execute a computer readable medium embodying programmed instructions to perform desired functions in an illustrative embodiment. Processing system 4500 is operable to perform the above operations by executing programmed instructions tangibly embodied on computer readable storage medium 4512. In this regard, embodiments of the invention can take the form of a computer program accessible via computer-readable medium 4512 providing program code for use by a computer or any other instruction execution system. For the purposes of this description, computer readable storage medium 4512 can be anything that can contain or store the program for use by the computer.

Computer readable storage medium 4512 can be an electronic, magnetic, optical, electromagnetic, infrared, or semiconductor device. Examples of computer readable storage medium 4512 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 4500, being suitable for storing and/or executing the program code, includes at least one processor 4502 coupled to program and data memory 4504 through a system bus 4550. Program and data memory 4504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 4506 (including but not limited to keyboards, displays, pointing devices, etc.) can be coupled either directly or through intervening I/O controllers. Network adapter interfaces 4508 may also be integrated with the system to enable processing system 4500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 4510 may be integrated with the system to interface to one or more display devices, such as printing systems and screens for presentation of data generated by processor 4502.

Although specific embodiments were described herein, the scope of the invention is not limited to those specific embodiments. The scope of the invention is defined by the following claims and any equivalents thereof

What is claimed is:

1. A jetting system, comprising:

a printhead comprising a plurality of jetting channels with nozzles of the jetting channels aligned in a row along a length of the printhead, wherein a first subset of two or more consecutive jetting channels in the row is configured to jet a first print fluid, and a second subset of two or more consecutive jetting channels in the row is configured to jet a second print fluid; and a jetting controller that includes at least one processor configured to:

generate a drive waveform comprising a plurality of print-fluid-specific jetting pulses provisioned for different print fluids, wherein the print-fluid-specific jetting pulses include first print-fluid-specific jetting pulses provisioned for jetting the first print fluid, and second print-fluid-specific jetting pulses provisioned for jetting the second print fluid, and wherein the first print-fluid-specific jetting pulses and the second print-fluid-specific jetting pulses are not shared between the different print fluids; and designate gating signals for jetting the first print fluid and the second print fluid;

the printhead further comprising:

a driver circuit configured to receive the drive waveform and the gating signals from the jetting controller, selectively apply the first print-fluid-specific jetting pulses from the drive waveform to actuators of the first subset based on the gating signals to jet the first print fluid from the first subset, and selectively apply the second print-fluid-specific jetting pulses from the drive waveform to the actuators of the second subset based on the gating signals to jet the second print fluid from the second subset.

2. The jetting system of claim 1, wherein:

characteristics of the first print-fluid-specific jetting pulses are optimized for jetting the first print fluid with desired droplet properties; and characteristics of the second print-fluid-specific jetting pulses are optimized for jetting the second print fluid with desired droplet properties.

3. The jetting system of claim 2, wherein:

the first print fluid and the second print fluid differ based on color.

4. The jetting system of claim 1 wherein:

the first print-fluid-specific jetting pulses provisioned for the first print fluid have a different amplitude than the second print-fluid-specific jetting pulses provisioned for the second print fluid.

5. The jetting system of claim 1, wherein:

the driver circuit comprises an integrated circuit fabricated on the printhead.

6. The jetting system of claim 1 wherein:

a jetting period of the drive waveform includes a first print-fluid-specific jetting pulse and a second print-fluid-specific jetting pulse; and for the jetting period, the driver circuit is configured to:

obtain print data for the first subset and the second subset;

select a gating signal from the gating signals for each of the first subset and the second subset based on the print data;

when the gating signal selected for a first jetting channel of the first subset comprises a first active gating signal, output the first print-fluid-specific jetting pulse from the drive waveform as a first driver output signal to the actuator of the first jetting channel, wherein the second print-fluid-specific jetting pulse is blocked from the first driver output signal based on the first active gating signal; and when the gating signal selected for a second jetting channel of the second subset comprises a second active gating signal, output the second print-fluid-specific jetting pulse from the drive waveform as a second driver output signal to the actuator of the second jetting channel, wherein the first print-fluid-specific jetting pulse is blocked from the second driver output signal based on the second active gating signal.

7. The jetting system of claim 6 wherein:

the first active gating signal includes an active time window that corresponds with the first print-fluid-specific jetting pulse; and the second active gating signal includes an active time window that corresponds with the second print-fluid-specific jetting pulse.

8. The jetting system of claim 6 wherein:

the first print-fluid-specific jetting pulse leads the second print-fluid-specific jetting pulse in the jetting period of the drive waveform; and the driver circuit is configured to delay the first print-fluid-specific jetting pulse on the first driver output signal to the actuator of the first jetting channel.

9. The jetting system of claim 1 wherein:

the actuators comprise piezoelectric actuators.

10. The jetting system of claim 1, wherein the printhead further comprises:

a first manifold configured to supply the first print fluid to the first subset; and a second manifold configured to supply the second print fluid to the second subset.

11. A method comprising:

controlling a printhead with a jetting controller, wherein the printhead comprises a plurality of jetting channels with nozzles of the jetting channels aligned in a row along a length of the printhead, wherein a first subset of two or more consecutive jetting channels in the row is configured to jet a first print fluid, and a second subset of two or more consecutive jetting channels in the row is configured to jet a second print fluid;

the controlling comprising:

generating a drive waveform comprising a plurality of print-fluid-specific jetting pulses provisioned for different print fluids, wherein the print-fluid-specific jetting pulses include first print-fluid-specific jetting pulses provisioned for jetting the first print fluid, and second print-fluid-specific jetting pulses provisioned for jetting the second print fluid, and wherein the first print-fluid-specific jetting pulses and the second print-fluid-specific jetting pulses are not shared between the different print fluids; and designating gating signals for jetting the first print fluid and the second print fluid;

receiving the drive waveform and the gating signals at the printhead from the jetting controller;

selectively applying the first print-fluid-specific jetting pulses from the drive waveform to actuators of the first subset based on the gating signals to jet the first print fluid from the first subset; and selectively applying the second print-fluid-specific jetting pulses from the drive waveform to the actuators of the second subset based on the gating signals to jet the second print fluid from the second subset.

12. The method of claim 11, wherein:

characteristics of the first print-fluid-specific jetting pulses are optimized for jetting the first print fluid with desired droplet properties; and characteristics of the second print-fluid-specific jetting pulses are optimized for jetting the second print fluid with desired droplet properties.

13. The method of claim 12, wherein:

the first print fluid and the second print fluid differ based on color.

14. The method of claim 11 wherein:

the first print-fluid-specific jetting pulses provisioned for the first print fluid have a different amplitude than the second print-fluid-specific jetting pulses provisioned for the second print fluid.

15. The method of claim 11, wherein:

a jetting period of the drive waveform includes a first print-fluid-specific jetting pulse and a second print-fluid-specific jetting pulse; and for the jetting period, the selectively applying comprises:

obtaining print data for the first subset and the second subset;

selecting a gating signal from the gating signals for each of the first subset and the second subset based on the print data;

when the gating signal selected for a first jetting channel of the first subset comprises a first active gating signal, outputting the first print-fluid-specific jetting pulse from the drive waveform as a first driver output signal to the actuator of the first jetting channel, wherein the second print-fluid-specific jetting pulse is blocked from the first driver output signal based on the first active gating signal; and when the gating signal selected for a second jetting channel of the second subset comprises a second active gating signal, outputting the second print-fluid-specific jetting pulse from the drive waveform as a second driver output signal to the actuator of the second jetting channel, wherein the first print-fluid-specific jetting pulse is blocked from the second driver output signal based on the second active gating signal.

16. The method of claim 15 wherein:

the first active gating signal includes an active time window that corresponds with the first print-fluid-specific jetting pulse; and the second active gating signal includes an active time window that corresponds with the second print-fluid-specific jetting pulse.

17. The method of claim 15 wherein:

the first print-fluid-specific jetting pulse leads the second print-fluid-specific jetting pulse in the jetting period of the drive waveform, and further comprising:

delaying the first print-fluid-specific jetting pulse on the first driver output signal to the actuator of the first jetting channel.

18. The method of claim 11, further comprising:

conveying the first print fluid to the first subset from a first manifold of the printhead; and conveying the second print fluid to the second subset from a second manifold of the printhead.

19. A jetting system, comprising:

a printhead comprising a plurality of jetting channels with nozzles of the jetting channels aligned in a first row along a length of the printhead, wherein a first subset of two or more consecutive jetting channels in the first row is configured to jet a first print fluid, and a second subset of two or more consecutive jetting channels in the first row is configured to jet a second print fluid; and a jetting controller that includes at least one processor configured to:

generate a drive waveform comprising a plurality of print-fluid-specific jetting pulses provisioned for different print fluids, wherein the print-fluid-specific jetting pulses include first print-fluid-specific jetting pulses provisioned for jetting the first print fluid, and second print-fluid-specific jetting pulses provisioned for jetting the second print fluid, and wherein the first print-fluid-specific jetting pulses and the second print-fluid-specific jetting pulses are not shared between the different print fluids; and designate gating signals for jetting the first print fluid and the second print fluid;

the printhead further comprising:

a driver circuit configured to receive the drive waveform and the gating signals from the jetting controller, selectively apply the first print-fluid-specific jetting pulses from the drive waveform to actuators of the first subset based on the gating signals to jet the first print fluid from the first subset, and selectively apply the second print-fluid-specific jetting pulses from the drive waveform to the actuators of the second subset based on the gating signals to jet the second print fluid from the second subset.

20. The jetting system of claim 19, wherein:

nozzles of the jetting channels are further aligned in a second row along the length of the printhead, wherein a third subset of two or more consecutive jetting channels in the second row is configured to jet a third print fluid, and a fourth subset of two or more consecutive jetting channels in the second row is configured to jet a fourth print fluid;

the at least one processor of the jetting controller is further configured to:

generate the drive waveform comprising the plurality of print-fluid-specific jetting pulses including third print-fluid-specific jetting pulses provisioned for jetting the third print fluid, and fourth print-fluid-specific jetting pulses provisioned for jetting the fourth print fluid, and wherein the third print-fluid-specific jetting pulses and the fourth print-fluid-specific jetting pulses are not shared between the different print fluids; and designate the gating signals for jetting the third print fluid and the fourth print fluid; and the driver circuit is further configured to selectively apply the third print-fluid-specific jetting pulses from the drive waveform to the actuators of the third subset based on the gating signals to jet the third print fluid from the third subset, and selectively apply the fourth print-fluid-specific jetting pulses from the drive waveform to the actuators of the fourth subset based on the gating signals to jet the fourth print fluid from the fourth subset.

21. The jetting system of claim 20, wherein:

characteristics of the first print-fluid-specific jetting pulses are optimized for jetting the first print fluid with desired droplet properties;

characteristics of the second print-fluid-specific jetting pulses are optimized for jetting the second print fluid with desired droplet properties;

characteristics of the third print-fluid-specific jetting pulses are optimized for jetting the third print fluid with desired droplet properties; and characteristics of the fourth print-fluid-specific jetting pulses are optimized for jetting the fourth print fluid with desired droplet properties.

22. The jetting system of claim 20, wherein the printhead further comprises:

a first manifold configured to supply the first print fluid to the first subset;

a second manifold configured to supply the second print fluid to the second subset;

a third manifold configured to supply the third print fluid to the third subset; and a fourth manifold configured to supply the fourth print fluid to the fourth subset.

* * * * *